(12) United States Patent
Publicover et al.

(10) Patent No.: US 9,823,744 B2
(45) Date of Patent: *Nov. 21, 2017

(54) SYSTEMS AND METHODS FOR BIOMECHANICALLY-BASED EYE SIGNALS FOR INTERACTING WITH REAL AND VIRTUAL OBJECTS

(71) Applicant: Google Inc., Mountain View, CA (US)

(72) Inventors: Nelson George Publicover, Reno, NV (US); Lewis James Marggraff, Lafayette, CA (US); Eliot Francis Drake, Reno, NV (US); Spencer James Connaughton, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,617

(22) Filed: Nov. 2, 2015

(65) Prior Publication Data

US 2016/0085302 A1      Mar. 24, 2016

Related U.S. Application Data

(63) Continuation of application No. 14/708,234, filed on May 9, 2015.
(Continued)

(51) Int. Cl.
*G09G 5/00* (2006.01)
*G06F 3/01* (2006.01)
(Continued)

(52) U.S. Cl.
CPC ......... *G06F 3/013* (2013.01); *G02B 27/0093* (2013.01); *G02B 27/017* (2013.01);
(Continued)

(58) Field of Classification Search
CPC ..... A61B 3/113; G05F 3/012; G06T 2200/24; G02B 27/0093; G06F 1/163
See application file for complete search history.

(56) References Cited

U.S. PATENT DOCUMENTS

| 3,798,599 A | 3/1974 | Kafafian |
| 3,863,243 A | 1/1975 | Skolnick et al. |

(Continued)

FOREIGN PATENT DOCUMENTS

| EP | 0 679 984 | 4/1995 |
| EP | 0 984 347 | 8/1998 |

(Continued)

OTHER PUBLICATIONS

Korean Intellectual Property Office, Written Opinion of the International Searching Authority for corresponding International Application No. PCT/US2015/030050, Mar. 31, 2016, 3 pages.

(Continued)

*Primary Examiner* — Weiming He

(57) ABSTRACT

Systems and methods are provided for discerning the intent of a device wearer primarily based on movements of the eyes. The system can be included within unobtrusive headwear that performs eye tracking and controls screen display. The system can also utilize remote eye tracking camera(s), remote displays and/or other ancillary inputs. Screen layout is optimized to facilitate the formation and reliable detection of rapid eye signals. The detection of eye signals is based on tracking physiological movements of the eye that are under voluntary control by the device wearer. The detection of eye signals results in actions that are compatible with wearable computing and a wide range of display devices.

28 Claims, 27 Drawing Sheets

Related U.S. Application Data

(60) Provisional application No. 61/991,435, filed on May 9, 2014, provisional application No. 62/023,940, filed on Jul. 13, 2014, provisional application No. 62/027,774, filed on Jul. 22, 2014, provisional application No. 62/027,777, filed on Jul. 22, 2014, provisional application No. 62/038,984, filed on Aug. 19, 2014, provisional application No. 62/039,001, filed on Aug. 19, 2014, provisional application No. 62/046,072, filed on Sep. 4, 2014, provisional application No. 62/074,920, filed on Nov. 4, 2014, provisional application No. 62/074,927, filed on Nov. 4, 2014.

(51) Int. Cl.

| | | |
|---|---|---|
| *H04N 5/232* | (2006.01) | |
| *H04N 5/247* | (2006.01) | |
| *G06K 9/00* | (2006.01) | |
| *G06F 21/32* | (2013.01) | |
| *H04L 29/06* | (2006.01) | |
| *H04W 12/06* | (2009.01) | |
| *G02B 27/01* | (2006.01) | |
| *G06F 3/0481* | (2013.01) | |
| *G06T 19/00* | (2011.01) | |
| *G02B 27/00* | (2006.01) | |
| *G06F 3/0482* | (2013.01) | |
| *G06F 3/03* | (2006.01) | |

(52) U.S. Cl.
CPC ......... *G02B 27/0172* (2013.01); *G06F 3/012* (2013.01); *G06F 3/017* (2013.01); *G06F 3/0304* (2013.01); *G06F 3/0482* (2013.01); *G06F 3/04817* (2013.01); *G06F 21/32* (2013.01); *G06K 9/00617* (2013.01); *G06T 19/006* (2013.01); *H04L 63/0861* (2013.01); *H04N 5/23229* (2013.01); *H04N 5/247* (2013.01); *H04W 12/06* (2013.01); *G02B 2027/014* (2013.01); *G02B 2027/0138* (2013.01); *G02B 2027/0178* (2013.01); *G06F 2203/011* (2013.01)

(56) References Cited

U.S. PATENT DOCUMENTS

| | | | |
|---|---|---|---|
| 4,359,724 A | 11/1982 | Zimmerman et al. | |
| 4,815,839 A | 3/1989 | Waldorf | |
| 4,850,691 A | 7/1989 | Gardner et al. | |
| 4,953,111 A | 8/1990 | Yamamoto et al. | |
| 5,214,456 A | 5/1993 | Gersten | |
| 5,345,281 A | 9/1994 | Taboada et al. | |
| 5,402,109 A | 3/1995 | Mannik | |
| 5,469,143 A | 11/1995 | Cooper | |
| 5,481,622 A | 1/1996 | Gerhardt et al. | |
| 5,517,021 A | 5/1996 | Kaufman et al. | |
| 5,566,067 A | 10/1996 | Hobson et al. | |
| 5,570,698 A | 11/1996 | Liang et al. | |
| 5,682,144 A | 10/1997 | Mannik | |
| 5,689,241 A | 11/1997 | Clarke, Sr. et al. | |
| 5,748,113 A | 5/1998 | Torch | |
| 5,844,544 A | 12/1998 | Kahn et al. | |
| 5,867,587 A | 2/1999 | Aboutalib et al. | |
| 5,886,683 A | 3/1999 | Tognazzini | |
| 5,912,721 A | 6/1999 | Yamaguchi et al. | |
| 6,003,991 A | 12/1999 | Viirre | |
| 6,087,941 A | 7/2000 | Ferraz | |
| 6,097,295 A | 8/2000 | Griesinger et al. | |
| 6,102,870 A | 8/2000 | Edwards | |
| 6,163,281 A | 12/2000 | Torch | |
| 6,204,828 B1 | 3/2001 | Amir et al. | |
| 6,243,076 B1 | 6/2001 | Hatfield | |
| 6,246,344 B1 | 6/2001 | Torch | |
| 6,260,968 B1 | 7/2001 | Stark et al. | |
| 6,323,884 B1 | 11/2001 | Bird et al. | |
| 6,334,683 B2 | 1/2002 | Apple et al. | |
| 6,346,929 B1 | 2/2002 | Fukushima | |
| 6,456,262 B1 | 9/2002 | Bell | |
| 6,526,159 B1 | 2/2003 | Nickerson | |
| 6,542,081 B2 | 4/2003 | Torch | |
| 6,577,329 B1 | 6/2003 | Flickner et al. | |
| 6,608,615 B1 | 8/2003 | Martins | |
| 6,867,752 B1 | 3/2005 | Yamazaki et al. | |
| 6,919,907 B2 | 7/2005 | Berstis | |
| 6,932,090 B1 | 8/2005 | Reschke et al. | |
| 7,029,121 B2 | 4/2006 | Edwards | |
| 7,071,831 B2 | 7/2006 | Johns | |
| 7,245,273 B2 | 7/2007 | Eberl et al. | |
| 7,365,738 B2 | 4/2008 | Molander et al. | |
| 7,429,108 B2 | 9/2008 | Rosenberg | |
| 7,515,054 B2 | 4/2009 | Torch | |
| 7,561,143 B1 | 7/2009 | Milekic | |
| 7,760,910 B2 | 7/2010 | Johnson et al. | |
| 7,850,306 B2 | 12/2010 | Uusitalo et al. | |
| 7,881,493 B1 | 2/2011 | Edwards et al. | |
| 8,120,577 B2 | 2/2012 | Bouvin et al. | |
| 8,185,845 B2 | 5/2012 | Bjorklund et al. | |
| 8,311,267 B2 | 11/2012 | Miyake et al. | |
| 8,339,446 B2 | 12/2012 | Blixt et al. | |
| 8,382,285 B2 | 2/2013 | Eberl et al. | |
| 8,462,949 B2 | 6/2013 | Anderson et al. | |
| 8,564,533 B2 | 10/2013 | Yuan | |
| 8,593,375 B2 | 11/2013 | Maltz | |
| 8,643,680 B2 | 2/2014 | Baldwin et al. | |
| 2001/0028309 A1 | 10/2001 | Torch | |
| 2003/0038754 A1 | 2/2003 | Goldstein et al. | |
| 2004/0061680 A1 | 4/2004 | Taboada | |
| 2005/0007552 A1 | 1/2005 | Fergason et al. | |
| 2005/0047629 A1 | 3/2005 | Farrell et al. | |
| 2005/0243054 A1 | 11/2005 | Beymer et al. | |
| 2006/0217816 A1 | 9/2006 | Pesaran et al. | |
| 2009/0125849 A1 | 5/2009 | Bouvin et al. | |
| 2009/0289895 A1* | 11/2009 | Nakada | G06F 3/015 345/157 |
| 2010/0045596 A1 | 2/2010 | De Leon | |
| 2011/0175932 A1 | 7/2011 | Yu et al. | |
| 2011/0211056 A1 | 9/2011 | Publicover et al. | |
| 2012/0081666 A1 | 4/2012 | Kiderman et al. | |
| 2012/0105486 A1 | 5/2012 | Lankford et al. | |
| 2012/0154557 A1 | 6/2012 | Perez et al. | |
| 2012/0272179 A1 | 10/2012 | Stafford | |
| 2012/0293773 A1 | 11/2012 | Publicover et al. | |
| 2012/0294478 A1 | 11/2012 | Publicover et al. | |
| 2013/0114850 A1 | 5/2013 | Publicover et al. | |
| 2013/0135196 A1 | 5/2013 | Park et al. | |
| 2013/0176533 A1 | 7/2013 | Raffle et al. | |
| 2013/0207887 A1 | 8/2013 | Raffle et al. | |
| 2013/0293844 A1* | 11/2013 | Gross | A61B 3/0025 351/209 |
| 2013/0336547 A1 | 12/2013 | Komogortsev | |
| 2014/0002352 A1 | 1/2014 | Jacob et al. | |
| 2014/0062853 A1 | 3/2014 | Chaundhri et al. | |
| 2014/0092006 A1 | 4/2014 | Boelter et al. | |
| 2014/0096077 A1 | 4/2014 | Jacob et al. | |
| 2014/0139652 A1 | 5/2014 | Alden et al. | |
| 2014/0184775 A1 | 7/2014 | Drake et al. | |
| 2014/0204029 A1 | 7/2014 | Lopez et al. | |
| 2014/0232638 A1 | 8/2014 | Choi et al. | |
| 2014/0237366 A1 | 8/2014 | Poulos | |
| 2014/0240220 A1 | 8/2014 | Yoon et al. | |
| 2014/0247210 A1* | 9/2014 | Henderek | G06F 3/02 345/156 |
| 2014/0285641 A1 | 9/2014 | Kato et al. | |
| 2014/0289833 A1 | 9/2014 | Briceno | |
| 2014/0289834 A1 | 9/2014 | Lindemann | |
| 2014/0362346 A1 | 12/2014 | Leinonen et al. | |
| 2014/0380230 A1* | 12/2014 | Venable | G06F 3/013 715/781 |
| 2015/0212576 A1 | 7/2015 | Ambrus et al. | |

(56) References Cited

U.S. PATENT DOCUMENTS

2015/0220157 A1 8/2015 Marggraff et al.
2015/0324568 A1 11/2015 Publicover et al.
2017/0123492 A1 5/2017 Publicover et al.

FOREIGN PATENT DOCUMENTS

| EP | 0989722 | 3/2000 |
|----|---------|--------|
| EP | 2679147 | 12/2013 |
| WO | 2006092022 | 9/2006 |
| WO | 2011006760 | 1/2011 |
| WO | 2013060826 A1 | 5/2013 |
| WO | 2014111924 | 7/2014 |
| WO | 2015172124 | 12/2015 |
| WO | 2016018487 | 4/2016 |

OTHER PUBLICATIONS

Korean Intellectual Property Office, International Search Report for corresponding International Application No. PCT/US2015/030050, Mar. 31, 2016, 25 pages.
Dario D. Salvucci, "Inferring intent in eye-based interfaces: tracing eye movements with process models", Proceedings of the SIGCHI conference on Human Factors in Computing Systems, May 15-20, 1999, p. 254-261.
International Preliminary Report on Patentability correlating to PCT/US2015/030047 (EYE-025 WO), dated Nov. 15, 2016, 6 pages.
Notice of Allowance dated Apr. 5, 2017 for U.S. Appl. No. 14/708,229, 10 pages.

* cited by examiner time ns and Methods for
Biomechanically-Based Eye Signals
for Interacting with Real and
Virtual Objects

RELATED APPLICATION DATA

The present application is a continuation of co-pending application Ser. No. 14/708,234, filed May 9, 2015, which claims benefit of provisional application Ser. Nos. 61/991,435, filed May 9, 2014, 62/023,940, filed Jul. 13, 2014, 62/027,774, filed Jul. 22, 2014, 62/027,777, filed Jul. 22, 2014, 62/038,984, filed Aug. 19, 2014, 62/039,001, filed Aug. 19, 2014, 62/046,072, filed Sep. 4, 2014, 62/074,920, filed Nov. 4, 2014, and 62/074,927, filed Nov. 4, 2014, the entire disclosures of which are expressly incorporated by reference herein.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

FIELD OF THE INVENTION

The present invention relates generally to systems and methods for Discerning the Intent of a User (DIU) and subsequently controlling and interacting with computing and other devices primarily using one's eyes with optional ancillary input support. The system utilizes techniques within the fields of Human-Machine Interfaces (HMIs), wearable computing, human physiology, image processing, and deep learning. DIU can be implemented within unobtrusive eye-tracking headwear and/or remote eye-tracking hardware that can optionally be associated with head-mounted displays (HMD), remote displays, and/or other wearable sensors or actuators. The system may provide a user with an easy-to-use, intuitive, and flexible input mechanism to control and interact with local or remote computing devices.

BACKGROUND

Computer mice, joysticks, and other manual tracking devices are ubiquitous tools for specifying positional information during human-machine interactions. With the advent of wearable computing, such bulky and obtrusive devices that, for example, generally require stationary surfaces for proper operation, are incompatible with the portable nature of apparatus that are designed to be worn on the body.

Wearable display devices include virtual reality (VR) displays such as those manufactured by Sony, Samsung, Oculus, Carl Zeiss; head mounted displays (HMDs) such as those produced by Google (e.g., Glass®) and Vuzix; augmented reality (AR) displays such as those manufactured by Microsoft, Vuzix, and DigiLens; and similar devices. Eye tracking can be used to view such displays and to specify positional information. However, the eyes are also used extensively during normal human activities.

Thus, a challenge when using eye position as an input data stream for interaction and control is to discern the intent of a user (DIU) based on eye movements. One of the goals of the systems and methods herein is to distinguish between movements of the eye that are associated with normal daily activities versus conscious or voluntary movements, herein referred to as "eye signals," that are intended to interact with, and control, a smart device. A smart device is an electronic device, generally connected to other devices or networks via different wireless protocols such as Bluetooth, NFC, Wi-Fi, 3G, etc., that can operate to some extent interactively and autonomously.

Eye signal tracking can be considered to be a component within the field of machine vision that enables humans to communicate with machines. Eye signals are distinct from "gesture" controls since they must be discerned from the continual movements of the eye that are associated with daily living. In addition, eye signals can be affected by the user's environment (e.g., sunlight versus darkness), distractions, fatigue, mental state, cognitive load, sickness, drugs, and so on.

Eye signals can be used to either replace or supplement gesture-based HMI. Currently, the most common form of gesture controls involves tracking the face, hand, or one or more fingers. Other examples of HMI gesture control involve the monitoring of both hands, gait, overall body movements, legs, bracelets, fingers, rings, pens, and the like. The term "gesture control" has also been applied to interpret movements directed at touch screens, tablets, and other motion- or touch-sensing surfaces. In almost all cases when using these devices, gestures can be made that are under voluntary (i.e., conscious) control and that are distinct from normal daily activities.

Eye signal tracking using one or both eyes involves specific neural pathways and motor controls. Six muscles (superior rectus, inferior rectus, lateral rectus, medial rectus, superior oblique, and inferior oblique) control all forms of eye movement. In addition, the levator palpebrae superioris muscle controls movement of the eyelid. These muscles are innervated by three nerves (oculomotor, abducens, and trochlear) with nuclei in the brain stem. The structure of the eye including muscle attachment points coupled with the neural control of eye movements place anatomical and physiological bounds (e.g., range of motion in horizontal, vertical, and rotational axes; maximum velocities in each dimension; ability to remain stationary; movement precision; etc.) on eye movements.

Eye movements are classified as elevation, incyclotorsion, adduction, depression, extorsion, intorsion, and/or abduction. Unless blind, the eyes are considered an essential sense to conduct normal daily activities. Thus, algorithms that interpret eye signals must discern the intent of a user during eye movements (i.e., whether a movement is a part of an eye signal or serving some other function).

In addition, it is crucial to take into account the cognitive processing that is specific to eye movements. It is relatively easy, for example, for most individuals to generate circular motions with a hand without any cues or guidance. This is in sharp contrast to the ability to control one's eyes. Using one or both eyes without visual cues, it is difficult to generate more than a few circular rotations and it is even more difficult, for example, to control the radius of such movements without providing reference visual targets to track. Voluntary eye movements in the absence of looking at real or virtual visual cues are difficult and generally produce an uncomfortable feeling. Simply being told to "look away" without direction regarding where to look can easily create anxiety.

Thus, telling a device wearer to simply "look away" from an object without providing an alternate gaze point results in an action that can generally be performed, but is uncomfortable and not consistently repeatable. Looking away, for example, in a predominantly nearby (e.g., indoors) environment is likely to produce a very difference series of eye movements compared with looking away in a more expansive (e.g., outdoor) environment. Even when instructed to "look away" in a specific direction (e.g., left, right, up, down) and/or returning to viewing the original location, such eye movements are not consistent without visual cues. Unlike existing eye-tracking control devices, visual cues should ideally be at specific gaze locations in order to take advantage of physiological mechanisms such as memory-guided saccadic eye movements.

On the other hand, the eye and visual cortex are exquisitely designed to track real or virtual objects as they move about in different patterns. It is easy for most individuals to track a reference object (e.g., a ball or an image of a cursor) moving in a circular pattern. By following such visual references or cues (at gaze locations that are known to a device), it is possible to produce almost any pattern of movement using the eyes.

Along similar lines, a "swipe" or "sweep" motion of a finger or hand gesture is one gesture type used for machine control. If one attempts to "sweep" with one's eyes, unless eyes move in conjunction with real or virtual objects, one has little or no perception of any objects within the sweep pathway and one loses the ability to view what happened at the location where the sweep was initiated. It is also difficult to distinguish between an intentional eye sweep and a momentary glance or saccade to an object that might have attracted attention, for example, within the peripheral visual field of the device user.

Added to this, viewing of the eye is often obscured during normal function by eyelids and lashes. Furthermore, eye blinks in which the eyelid completely blocks viewing of the position of the eye must occur periodically for sustained function in order to maintain lubrication and the aqueous environment of the surface of the eye. Blink durations (normally lasting from 0.3 to 0.4 seconds) and velocities can be affected by fatigue, attentions, injury, medications, drugs, alcohol, and disease. Blinks can obscure an individual's vision and the viewing of the eye for up to 10% of the time.

Thus, new paradigms are required to discern intent from eye movements while retaining the ability of individuals to visualize and interact with their environment.

SUMMARY

In view of the foregoing, systems and methods are provided herein for substantially continuously discerning the various intents or operational objectives of one or more users, based substantively on purposeful movements of one or more eyes.

In one aspect, an exemplary computer-implemented method may involve: projecting reference light onto one or both eyes, monitoring changes in the reflection of reference light, processing image data of the eyes and/or light to determine eye positions or movements, filtering the eye position or movement data against contextual, physiological, anatomical, and/or neurological criteria, deriving from the filtered eye position or movement data an eye signal indicative of a user's operational intent or purpose, associating said eye signal with an application or interactive device, correlating said eye signal with one or more control instructions to operatively control the associated application or device, communicating the eye signal or control instruction to the associated application or device, and causing the application or device to execute the appropriate instruction or function per the user's intent.

In another aspect, an exemplary system may include one or more cameras or at least one sensor to monitor changes in the reflection of light, and one or more processing units, and non-transitory computer-readable medium and program instructions stored on the non-transitory computer-readable medium. The program instructions may be executable by at least one processor to project reference light onto one or both eyes, monitor changes in the reflection of reference and/or ambient light, process measured data of the eyes and/or light to determine eye position or movement, filter the eye position or movement data against contextual, physiological, anatomical, and/or neurological criteria, derive from the filtered eye position or movement data an eye signal indicative of a user's operational intent or purpose, associate said eye signal with an application or device, correlate said eye signal with one or more control instructions to operatively control the associated application or device, communicate the eye signal or control instruction to the associated application or device, and cause the application or device to execute the appropriate instruction or function per the user's intent.

An alternate embodiment may include one or more illumination sources, cameras, or other sensors disposed onto, or embedded within one or more portable devices (phone, tablet, web camera, laptop, camera, video camera, nomadic device, electronic accessory components etc.) or wearable devices (e.g., glasses, watch, hat, jewelry, clothing, personal accessories, etc.), or may be similarly incorporated into other electronic devices (e.g., computer, security system, home automation, power management systems, ATM, display, television, refrigerator, identity authentication device, electronic card reader, terminal device, process logic controller, network router, wireless access point, cash register, dispensing machine, etc.), conveyances (e.g., vehicle console/dashboard, instrument cluster, infotainment system, mirrors, seats, steering wheel, doors, purpose based devices that are operatively coupled for limited duration and/or specific functions, etc.) or other structures in the environment (e.g., signs, window display, kiosk, door, lighting, communication systems, interactive rides, console games, sporting venue, etc.) and positioned remotely in general proximity of one or more users so as to illuminate or deposit reference light images, ambient light, or structured light onto one or both eyes of the one or more users, one or more cameras or at least one sensor to monitor changes in the reflection of the light, and one or more processing units, and non-transitory computer-readable medium and program instructions stored on the non-transitory computer-readable medium. The program instructions may be executable by at least one processor to project reference light onto one or both eyes, monitor changes in the reflection of light, process image data of the eyes and/or light to determine eye positions or movements, filter the eye position or movement data against contextual, physiological, anatomical, and/or neurological criteria, derive from the filtered eye position or movement data an eye signal indicative of a user's operational intent or purpose, associate said eye signal with an application or interactive device, correlate said eye signal with one or more control instructions to operatively control the associated application or device, communicate the eye signal or control instruction to the associated application or device, and cause the application or device to execute the appropriate instruction or function per the user's intent.

In another embodiment, a system may include an eye tracking apparatus such as contact lenses disposed onto the surface of one or more eyes, or biomechanical or bioelectrical sensors implanted within the eye, eye-socket, or attached to the optical nerve and/or muscles to track eye position and movement. The sensors may be operatively coupled to one or more processors, and may include non-transitory computer-readable medium and program instructions stored on the non-transitory computer-readable medium. The program instructions may be executable by at least one processor to: receive eye position or movement data from one or more biomechanical sensors, filter the eye position or movement data against contextual, physiological, anatomical, and/or neurological criteria, derive from the filtered eye position or movement data an eye signal indicative of a user's operational intent or purpose, associate said eye signal with an application or interactive device, correlate said eye signal with one or more control instructions to operatively control the associated application or device, communicate the eye signal or control instruction to the associated application or device, and cause the application or device to execute the appropriate instruction or function per the user's intent.

In accordance with another embodiment, a method is provided for providing a graphical user interface based on movement of a user's eye relative to an electronic display using a detector that includes identifying when the gaze of the eye is directed at an object on the display; identifying a movement of the eye from the object towards a target location including a first icon on the display corresponding to an action; replacing the first icon with a second icon corresponding to the object at the target location; confirming that the gaze of the eye lands at the target location after the movement; and performing the action on the object.

In accordance with yet another embodiment, a system is provided for providing a graphical user interface based on movement of a user's eye that includes a detector configured to monitor movement of a user's eye; an electronic display; and a processing unit operatively coupled to the detector and electronic display to identify when the gaze of the eye is directed at an object on the display; identify a saccadic movement of the eye from the object towards a target location including a first icon on the display corresponding to an action; replace the first icon with second icon corresponding to the object at the target location; confirm that the gaze of the eye lands at the target location after the saccadic movement; and perform the action on the object.

In accordance with still another embodiment, a method is provided for providing a graphical user interface based on movement of a user's eye relative to an electronic display using a detector that includes identifying a first movement of the eye towards a first target location including a first icon on the display corresponding; replacing the first icon on the display with a plurality of second icons at a plurality of second locations different than the first location; confirming that the gaze of the eye lands at the first target location after the first movement; and thereafter monitoring the eye to identify whether the eye performs a second movement towards one of the plurality of second target locations.

In accordance with yet another embodiment, a system is provided for providing a graphical user interface based on movement of a user's eye that includes a detector configured to monitor movement of a user's eye; an electronic display; and a processing unit operatively coupled to the detector and electronic display to identify a first movement of the eye towards a first target location including a first icon on the display corresponding; replace the first icon on the display with a plurality of second icons at a plurality of second locations different than the first location; confirm that the gaze of the eye lands at the first target location after the first saccadic movement; and thereafter monitor the eye to identify whether the eye performs a second movement towards one of the plurality of second target locations.

In another embodiment, switchable Bragg gratings or other light-steering mechanisms such as MEMS (microelectromechanical systems) mirrors may be used to control the location of light directed toward the eye and/or conversely spatially select light that has been gathered from the eye, thus allowing for a reduced number of illumination and/or detection sources, including a single source (e.g., light-emitting diode) and/or detector (e.g., photodiode) to acquire images.

In another embodiment, illumination and acquisition of eye image data may be captured using reflections from so-called "hot mirrors," Fraunhoffer lenses, and/or holographic lenses or other optical components.

In further embodiments, the physiological principle of the "gap effect" may be used to remove one or more objects from the visual field to generally reduce the cognitive processing required to perceive an object and allows the "release" of the user's eye and more rapid movements toward subsequent targets.

In further embodiments, particularly when a target is the destination for an eye signal action, an image or "thumbnail" of a previously viewed or "familiar" object or region of a screen can be displayed at the target destination.

In yet further embodiments, the display or displays associated with the eye signal "language" may include steps to either attract eye movement toward likely intended target locations or conversely to introduce targets using methods that are designed not to attract user attention.

In further embodiments, the physiological principle of "change blindness" may be used to cause visual changes to a display or interactive device that are introduced slowly or at times when an observer is not looking so as not to attract attention.

In another embodiment, a display controlled by the device may alter target details within the perifoveal and/or peripheral region of the field-of-view wherein new targets may be introduced slowly or during times when an observer is "blind" such as during the rapid portion of a saccadic eye movement.

In further embodiments, a new target can be introduced using techniques controlling, for example, luminance, transparency, color and/or movement of one or more objects that attract attention when graphics visually "yell" to a user and may include guiding a user's visual attention within gaming environments, by redirecting a user's eyes toward advertisements, or may teach via directed exposure to key methods or procedures.

In further embodiments, systems may comprise a binocular device, simultaneously measuring the position of both eyes of a device wearer wherein measurements from both eyes can be used to determine eye vergence or the movement of both eyes in opposite directions to maintain a single, binocular view of a scene at different distances from the observer.

In yet further embodiments, an object or objects may be presented and subsequently selected via multiple two-dimensional display planes that appear at different distances from the device wearer.

In further embodiments, a "continuous activation" eye signal may include or exclude eye movement components that are based on the context of a particular eye signal or sequence of eye signals wherein a collection of objects may be associated with a particular action.

In another embodiment, eye signals may be combined with other modalities to convey user intent, for example, with voluntary head movement (e.g., head nods) or other modalities including hand gestures, movements by other body parts, voice, switch activation, facial expressions, and so on.

In yet other embodiments, tracked eye movements and geometries (e.g. pupil dilation, anti-saccades) may be combined with information about the real or virtual objects being viewed by a user to discern the physiological and/or emotional states of an individual in a substantially continuous fashion.

In other embodiments, algorithmic filters may evaluate eye movements (e.g. timing, direction, saccadic sequence, and the like) to determine the presence of stereotypic eye movement patterns that may be used to discern certain types of activities being performed (e.g., reading, inspection).

In yet further embodiments, a "procedural adherence" process may be used to recognize, geo-locate, time-stamp, annotate, and/or archive objects or actions in order to identify and verify a status of various objects (e.g., valves, doors, switches, lights, indicators) or specific locations (e.g., indicated by observable signage, QR (i.e., quick response) codes, barcodes, uniquely shaped objects) within the environment, thus allowing a user to verify the various steps within a particular list, prescribed sequence, or checklist are surveyed and fulfilled to completion or to a degree of completion.

In other embodiments, variable video frame rates can be used to display content based on eye movements, wherein video rates may be reduced to conserve power and computing resources, or the video rate may be increased to enable methods such as the "gap effect" wherein grammatical elements may be activated rapidly and/or removing target elements from the display, thus eliminating the necessity for corrective saccades and/or the allowance of new targets to be chosen more rapidly.

In other embodiments, prediction may be used to analyze eye movements, for example a "saccadic launch," which is the ballistic initiation of a purposeful eye movement and may be measured for speed and direction, in order to calculate the time and eventual location the saccade will "land" thus allowing control over cameras and other processing resources.

In further embodiments, detailed eye tracking may be reduced or temporarily eliminated, for example, during a blink, during the mid-portion of a saccade, or when the eyes are not directed at a display or toward any interactive objects thus allowing for reduced power consumption, enhanced safety, or enabling other devices.

In further embodiments, the transparency, luminance or other characteristics of displays may be altered and various objects viewed by a user may be matched in size, shape, color, and/or movement, allowing tracking of real or virtual objects in the real or virtual environment on one or more wearable or remote display devices, including substantially continuous transitions within display devices between the real and virtual worlds.

In further embodiments, eye signals may be used to focus display resources on only the content within approximately the foveal region of an observer's field-of-view by controlling the resolution, content, and/or other properties of one or more displays.

In further embodiments, machine learning techniques, including "deep learning," may convert eye movement patterns and other inputs into predicted or anticipated eye locations and adapt user displays accordingly, allowing for system adaption to the anatomical and physiological capabilities and limitations of individual users.

In further embodiments, memory-guided saccadic eye movement techniques may be used to dynamically control the rate of presentation of materials and objects within a display, in a self-adapting fashion, based on content and user experience, thus allowing eye signals to ultimately be performed much more rapidly.

Aspects and applications of the systems and methods presented here are described below in the drawings and detailed description of the exemplary embodiments. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define terms or features herein. To the contrary, if the provisions of 35 U.S.C. §112, ¶6 are sought to be invoked to define features of the claims, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed features, it is intended that the features not be limited only to the specific structure, material, or acts that are described in the exemplary embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently exemplary embodiments are illustrated in the accompanying drawings, in which.

DETAILED DESCRIPTION OF THE EXEMPLARY EMBODIMENTS

Figure 1A:
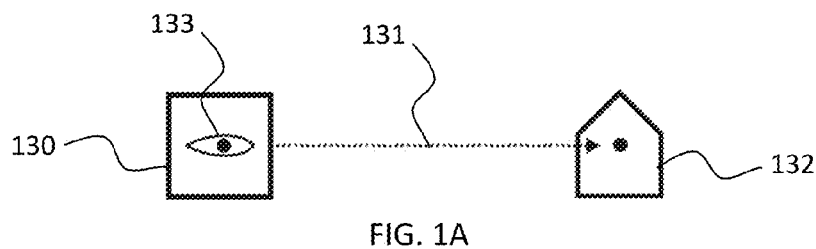
FIGS. 1A-1E illustrate a series of eye movements that include employing the "gap effect" to rapidly perform a 1-of-2 selection.

In the following description, and for the purposes of explanation, numerous specific details are set forth in order to provide a thorough understanding of the various aspects of the exemplary embodiments. It will be understood, however, by those skilled in the relevant arts, that the apparatus, systems, and methods herein may be practiced without these specific details. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments.

Systems and methods are provided herein for substantially continuously discerning the intent of a device wearer based substantively on movements of one or both eyes. One aspect of the systems and methods herein is taking into specific account the anatomy and physiology of eye movements as well as the handling of visual information in the various pathways within the central nervous system (including the brain) that process and respond to scenes within the visual field.

DEVICE ASPECTS AND EXAMPLES

As an example of a device, an apparatus can be unobtrusively positioned remotely or mounted on headwear for viewing one or both eyes. The apparatus can also, for example, be embedded within, or attached to, common eyeglass frames or within so-called wearable computing devices such as those known as Google Glass® (Google Inc.) or remote eye tracking devices such as those produced by SensoMotoric Instruments (SMI). Additionally or alternatively, the apparatus for tracking eye-movement may be contained within or operated in conjunction with contact lenses. Further, the apparatus may be implanted within the eye, eye-socket, or be attached to the optical nerve and/or muscles to track movement.

As additional examples, the apparatus may be embedded within a smart phone, tablet, computer, smart watch, or any other remote object or location including computers, displays, automobile dashboards, signage, or wearable devices worn by other people. In these cases, imaging of the eyes is generally performed at greater distances from the eyes compared with head-mounted wearable devices. One or more cameras or sensing devices are used to monitor eye movements from such distances at times when the user is looking in the general direction of the device.

Wearable and/or remotely located devices generally require secure communications, especially when transmission may contain personal, financial, legal and/or other forms of high-value information. Secure communications can be performed in manners described in Systems and Methods for Using Eye Signals with Secure Mobile Communications, application Ser. No. 14/708,229, filed May 9, 2015, the entire disclosure of which is expressly incorporated by reference herein.

In additional examples, the illumination and/or acquisition of images of the eye can be controlled by a variety of waveguide technologies. More specifically, switchable Bragg gratings (SBGs) such as those produced by Digilens Inc., electrically-switchable liquid crystal gratings, surface relief gratings (SRGs), switchable waveguide displays, or MEMS-based mirror (i.e., beam steering) devices, can be used to control the location of the origin of light as it is directed toward the eye and/or conversely spatially select light that has been gathered from the eye. In this case, a reduced number of illumination sources, including a single source (e.g., light-emitting diode, LED) and/or detectors, including a single detector (e.g., photodiode) can be used to illuminate and/or acquire images. Illumination sources can be non-coherent (e.g., LED) or coherent including ultra-low-power (for eye safety) diode lasers. Spatial resolution can be provided by an electronically selective waveguide (e.g., SBG, SRG, liquid, crystal, MEMS mirror). Illumination and image capture may additionally or alternatively involve reflections or refractions off of so-called "hot mirrors," Fraunhoffer lenses, micro-lens arrays, waveguide combiners, total internal reflection (TIR) holographic waveguides, and/or holographic lenses or other optical components.

Aspects of a system may include an eye signal "language" that comprises sets of eye movements that consider the physiology and anatomy of the eye as well as the cognitive properties of the visual cortex. During normal day-to-day activities eyes can be tracked as they perform both voluntary and involuntary activities. One aspect of such embodiments is to discern the intent of a user as the user's eyes routinely perform both types of movements. This entails distinguishing voluntary movements used to convey intent from involuntary eye movements.

Voluntary movements can be associated with conducting normal daily activities or they can be used to convey purposeful intent based on the eye signal "language." Thus, algorithmic "filters" and/or other programming approaches are used to discern intent based on video images of one or both eyes. Algorithms can be encoded in software, firmware, embedded within silicon-based logic devices, or combinations of such approaches. Processing can also be performed locally, remotely or combinations of such approaches including so-called "cloud computing."

Voluntary movements that may convey purposeful intent include saccades that have a well-defined range of angular velocities and ballistic profiles (based on the physiology of the eye), vergence movements used to view at different distances from an observer, vestibulo-ocular eye movements that are associated with head movement, and smooth pursuit movements used to follow specific (real or virtual) objects. Additional information to determine user intent may be determined from other factors such as pupil dilation, lens accommodation, eye lid motion, facial muscular movement, body and head motion, hand motion, and related contextual information.

In further aspects, the eye signal "language" and associated visual displays may include components to make eye signals more intuitive and/or to speed the ability of a user to convey intent. For example, the eye signal "language" can make use of memory-guided saccades to rapidly convey intended activation sequences. Similarly, the so-called "gap effect" (involving the removal of one or more objects from the visual field) can be used to reduce the amount of cognitive processing required to perceive an object and thus "release" the eye for more rapid movements toward other targets (i.e., conveying further intent).

In further aspects, particularly when a target is the destination for an eye signal action, an image or "thumbnail" of a previously viewed object or region of a screen can be displayed, e.g., at the target destination. Recent "familiarity" (a specific form of recognition within the visual cortex) with this thumbnail reduces the cognitive load and time to recognize the object, allowing the device user to more rapidly transition to a subsequent action. Presentation of a copy or likeness of a recently viewed object, particularly during fixation following a saccade from the object, also confirms intent, reducing anxiety, and/or facilitating a more pleasurable and effective result derived from a user's intent.

In yet further aspects, the display or displays associated with the eye signal "language" may include steps to either attract eye movement toward likely intended target locations or conversely to introduce targets using methods that are designed not to attract attention. Underlying this strategy is the fact that it is psychologically uncomfortable and often physiologically impossible (without specialized training) to direct the eyes or track locations in which there is nothing to observe such as where an area appears homogeneous in color or texture. Thus, targets in a particular eye movement sequence may be introduced in a fashion designed to attract attention. Conversely, a target that might need to be available for selection but is less commonly used or is one of a large number of possible selections may be introduced using methods that do not attract attention.

In further aspects, targets that are a part of an eye signal "language" may use cognitive properties of the human visual system to be introduced within a display in manners that do not induce involuntary or unintended eye movements. This allows a user to deliberately convey intent without "inadvertent activations" (i.e., eye movements that result in accidental actions) due to involuntary or unintended eye movements toward new potential targets as they are introduced. For example, it is cognitively difficult to discern changes in detail within the peripheral field-of-view, whereas larger changes in luminance or movement of an object relative to background tend to attract eye "attention." Thus, target detail within the peripheral field-of-view can be altered without attracting attention. In a process known as "change blindness," it is also difficult to discern visual changes (that attract attention) if the changes are introduced slowly or at times when an observer is not looking (i.e., when the observer is "blind"). Thus, in further embodiments, new targets can be introduced slowly or during times when an observer is "blind" such as during the rapid portion of a saccadic eye movement.

Conversely, when desired in further examples, a new target can be introduced using techniques that attract attention when graphics visually "yell" to a user. This can include guiding a user's visual attention within gaming environments, redirecting a user's eyes toward (paid) advertising, or teaching through directed exposure to key methods or procedures.

In additional examples, systems may comprise a binocular device, simultaneously measuring the position of both eyes of a device wearer. Measurements from both eyes can be used to determine eye vergence or the movement of both eyes in opposite directions to maintain a single, binocular view of a scene at different distances from the observer. The eyes rotate toward each other (i.e., converge) to view nearby objects. Conversely, the eyes rotate away from each other (i.e., diverge) to view more distant objects.

Although vergence movements are much slower than saccadic movements (i.e., limited to angular velocities up to 25°/sec), they can be used to determine and track the distance of a viewed object from an observer. The combination of horizontal (i.e., X dimension) and vertical (i.e., Y dimension) viewing directions with vergence-based distance from an observer (i.e., Z dimension) enables a three-dimensional (3D) determination of viewed objects. The (X, Y, Z) determination of viewed real or virtual objects allows three-dimensional selection during eye-signal creation and/or object selection. For example, eye signals can include voluntarily looking close by (i.e., so-called "crossing" one's eyes). Object selections can be presented and subsequently selected via multiple two-dimensional display planes that appear at different distances from the device wearer.

In additional exemplary aspects, an eye signal "language" may include or exclude eye movement components that are based on the context of a particular eye signal or sequence of eye signals. For example, a "continuous activation" state can be used to specify a collection of objects that may be associated with a particular action. During "continuous activation," objects of interest can simply be looked at in sequence versus performing specific eye movements to "activate" or indicate that each object is the subject of some form of action.

In additional aspects, eye signals can be combined with other modalities to convey user intent. For example, eye signals can be combined with voluntary head movement (e.g., head nods) as a component of an eye signal "language." Head movements can be detected, for example, using an accelerometer or by detecting the movement of an overall scene in an outwardly facing camera. In this modality, involuntary eye movements are often associated with voluntary head movements (i.e., so-called vestibulo-ocular movements). Thus, vestibulo-ocular eye movements that reflexively occur in the direction opposite a head movement can be included within eye signal controls during voluntary head movements. Other modalities that may be combined with an eye signal language include hand gestures, movements by other body parts, voice, switch activation, facial expressions, and so on.

In yet other aspects, tracked eye movements and geometry can be used to discern the physiological and/or emotional states of an individual in a continuous fashion. For example, the degree of pupil dilation can be used to discern emotional states such as fear, interest, or cognitive load. Anti-saccadic movements can be an indication of viewing something distasteful. When combined with information about the real or virtual objects being viewed by a user, an indication of the classes of objects that, for example, elicit fright, attraction, or interest can be discerned. Such information can, for example, be used to tailor subsequent displays of information.

In other aspects, stereotypic movement patterns of the eyes can be used to discern certain types of activities being performed. For example, the timing, directions, and sequences of saccadic and other forms of eye movements can be used to determine that the process of reading is being performed. Algorithmic filters that determine the presence of such stereotypic eye movements can, for example, subsequently be used to control display content (e.g., page turns), provide context for eye signal language elements and/or produce and archival record that certain content (e.g., a checklist) has been viewed and/or read.

In yet further examples, the device wearer can be forced to ensure that all steps within a particular list, prescribed sequence, or checklist are surveyed. Object recognition may be used to identify the status of objects (e.g., valves, doors, switches, lights, indicators) or specific locations (e.g., indicated by observable signage, QR (i.e., quick response) codes, barcodes, uniquely shaped objects) within the environment of the device wearer. Identified objects or actions can be geo-located, time-stamped, annotated, and/or archived.

Ensuring that a specific sequence within a checklist has been adhered to is referred to as "procedural adherence." The lack of recognition of a particular object or step within a checklist can be used to force corrective actions. Procedural adherence is particularly important in disciplines such as fire fighters, first responders, soldiers, police, pilots, safety inspectors, oil rig supervisors, building inspectors, and mechanics. The exact sequences and patterns of gaze activity can also be archived for the purposes of training, legal verification, police forensics, user condition, procedural optimization, and so on.

In other examples, variable video frame rates can be used to display content based on eye movements. For example, it is well-accepted that an observer is functionally "blind" during the central portion of a rapid, saccadic eye movement. Thus, it may serve no useful purpose to display information during this time. During such periods, a display updating can be paused to conserve power and/or computational resources or new virtual objects can be introduced without attracting attention using the physiological principles of "change blindness."

On the other hand, during the initiation of a saccade, a high frame rate may be required to anticipate the landing zone of a saccade. This can be used, for example, to activate grammatical elements rapidly (i.e., without the need to even perceive the target element) and/or remove a target element from the display in order to eliminate corrective saccades and/or allow a new target to be chosen more rapidly using the so-called "gap effect."

Along similar lines and in additional aspects, eye movements can be used to perform "region-of-interest" control over cameras and other processing resources. For example, during saccades, eye movements are "ballistic." In other words, the time and location that a saccade "lands" can be calculated based on measurements during the saccadic launch. Power and computing resources can be conserved if the camera is turned off during the saccade and turned back on at a time when the eye lands. In addition, only the region where the eye is anticipated to land (in contrast to the entire field-of-view of the camera) needs to initially be sensed by one or more eye-viewing cameras.

Similarly, smooth pursuit eye movements occur over a physiologically limited range of angular velocities. When tracking smooth pursuits and other eye movements, physiological limitations can be used to restrict regions-of-interest to ranges that are biologically feasible. Region-of-interest control can be particularly effective when implemented via rapid calculations using distributed and/or dedicated processing resources (e.g., within an ASIC [i.e., application-specific integrated circuit] or FPGA [i.e., field-programmable gate array]). The rapid computational capabilities of an ASIC or FPGA can allow region-of-interest (and frame-rate) control at rates up to a frame-by-frame basis.

In further aspects, processes associated with detailed eye tracking can be reduced or temporarily eliminated when the eyes are not directed at a display or toward any interactable objects. Such techniques can be used to reduce power and other resources, and enhance safety.

In further examples, when tracking objects using one's eye to discern intent, tracked objects can be real objects in the environment of the device user, virtual objects displayed on one or more wearable or remote display devices, or combinations of real and virtual objects including substantially continuous transitions within display devices between the real and virtual worlds. This can be performed, for example, by controlling the transparency or luminance of augmented reality displays or by matching the size, shape, color, and/or movement of an object near the edge of a display.

In further aspects, gaze tracking can be used to control the resolution, content, and/or other properties of one or more displays within the foveal view of a device user. The physiology of the human eye is such that high-resolution viewing is performed by cone receptors within a 1.5 mm wide region of the inner surface of the retina. This corresponds to an angular range of approximately 1° to 3° within an observer's field-of-view. Using gaze tracking, resources can be conserved and distracting content can be avoided by focusing display resources on the content within the foveated region of a field-of-view.

In further examples, machine learning techniques including so-called "deep learning" can be used to convert eye movement patterns and other inputs to discern user intent. Deep learning can be used to recognize generalized patterns of eye movements (formed by the six muscles of the eye, as describe above) as components of the eye signal language. In addition to recognizing "purposeful" eye patterns that convey intent, eye movement patterns can also be used to determine emotional and physiological states of the device wearer.

The same machine learning techniques can be used to predict or anticipate eye locations and adapt user displays accordingly. This can be used to greatly speed up eye signals and adapt to the anatomical and physiological capabilities and limitations of individual users.

In further aspects, the performance and/or experience of a particular device user can be considered when controlling the timing of the presentation of objects within a display. As a user becomes more familiar with device operation, eye movements can become faster; for example, by relying more heavily on memory-guided (versus searching) saccadic eye movements. Thus, the rate of presentation of materials can be based on user experience in a self-adapting fashion, allowing eye signals to ultimately be performed much more rapidly.

Physiological Eye Movements

A foundational component of the eye signal "language" and system is an explicit integration with the anatomy and physiology of human visual processing. Thus, it is necessary to understand the physiology of human eye movements.

It is generally accepted that there are four fundamental types of eye movements: 1) vestibulo-ocular, 2) vergence, 3) smooth pursuit, and 4) saccadic. Each type of movement can be distinguished based on parameters such as range of motion, velocity profile, whether both eyes perform conjugate (versus dissimilar direction) movements, and whether the head or visual field is also moving. Distinct neural circuitry is involved in each type of eye movement. Different eye movements involve different degrees of voluntary (i.e., conscious control) versus involuntary (i.e., reflex) neural pathways. During the process of discerning eye signals, it is particularly important to be able to identify voluntary movements of the eye that convey conscious intent.

Vestibulo-ocular movements compensate for head movements by moving the eye through the same angle as a head rotation, but in the opposite direction. This has the effect of stabilizing an image of the external world projected onto the sensitive, high-resolution foveal region of the eye. Vestibulo-ocular movements are rapid and purely reflexive with sensory inputs from the semi-circular canals. Although vestibulo-ocular movements are reflexive in nature, the detection of vestibulo-ocular movements can be used to indirectly discern the absolute position of head movements (particularly when coupled with other inputs, for example, from accelerometers that move with the head) that are generally voluntary.

Vergence eye movements are used to align the foveal region of each eye independently to view an object located some distance away from the observer. Distinct from other eye movements, vergence movements are disconjugate, where each eye moves in a different direction. Resultant vergence angles can then be used to estimate the distance between an observer and a target object under observation. Within the central nervous system, this process involves the occipital lobes as well as the rostral midbrain reticular formation. By simultaneously measuring the movements and positions of both eyes, it is possible to estimate the distance between the viewer and a target object under observation. This, for example, can include whether the vergence-based distance to a display corresponds to the actual distance as an indication that the device wearer is viewing images on the display.

Smooth pursuit eye movements are slow, voluntary movements of the eye that keep the projection of a moving target object centered on the high-resolution, foveal region of the eye. Thus, overall velocities of smooth pursuit movements generally correspond to the velocities of the moving targets under observation. It is difficult for most individuals to execute smooth pursuit movements without actually viewing a moving target. In other words, unless substantial and specialized training by an observer has taken place, an attempt to initiate a smooth pursuit absent the ability to track a moving target simply results in an observer making one or more saccadic movements.

Saccadic eye movements are rapid movements that abruptly change the fixation point of the eye. Saccades are "ballistic" in the sense that, once initiated, the direction and distance covered by the saccade are governed solely by the saccadic launch. In other words, no mid-course corrections are possible during a saccade, even if the position of a target changes during the time of saccadic initiation and/or its execution. A saccade is the fastest movement produced by the human body, reaching angular velocities up to 900°/second.

A saccade is also "ballistic" in terms of its velocity profile. In response to an unanticipated stimulus, the initiation portion of a saccade takes about 200 milliseconds. Initiation leads to a phase of rapid acceleration where (similar to other ballistic velocity profiles) peak velocity is approximately proportional to the distance to be travelled. The movement phase of a saccade lasts from 20 to 200 milliseconds, depending on the total angular distance travelled. Normally, as long as the head remains motionless, saccades do not rotate the eye in a torsional axis (i.e., so-called Listing's Law). Saccades greater than approximately 20° are frequently accompanied by head movement although this varies widely from individual to individual.

There is a rapid deceleration phase as the direction of sight lands on the new target location. Following a very short delay, large saccades are frequently accompanied by at least one smaller corrective saccade to further approach a target location. Corrective saccades can occur even if the target has been made to disappear, further supporting the projected, ballistic nature of saccadic movements. However, corrective saccades are more frequent if the target remains visible.

By careful control of fixation points, pre-movement saccadic latency can be significantly reduced (by as much as half) by turning off any fixation points. The turning off of a fixation point appears to both serve as an alert to a viewer and reduce the mental processing that is associated with maintaining a fixation point. The turning off of a fixation point prior to a saccadic movement to fixate on a new target location leaves a "gap" in visual processing. This condition is known as the "gap effect."

Express saccades, with initiation latencies of 80-120 milliseconds, occur more often during "gap" situations. Careful control of the appearance of fixation points and targets, along with user practice and training can significantly increase the maximum rate of serial target selections. Arranging target locations so that memory-guided saccades can be utilized can further increase the maximum rate of target selection.

Figure 1B:
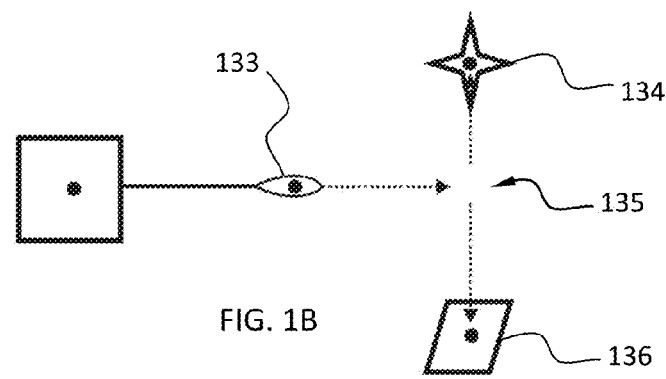

FIGS. 1A-1E illustrate the foundational "gap effect" as well as a 1-of-2 menu selection process. The gaze of a device user 133 may be directed at a real or virtual object 130. As illustrated in FIG. 1A, initiation of the selection of an action within the eye signal language occurs by directing eye gaze along a path 131 (via a saccadic eye movement) toward an activation icon 132. FIG. 1B shows eye gaze 133 directed along this path. However, at this time the activation icon 132 can be removed from the display, leaving a void 135 and a "gap" in time when there is nothing to observe at the saccadic landing site 135. This "gap" releases visual cognition to rapidly pursue a subsequent target.

Figure 1C:
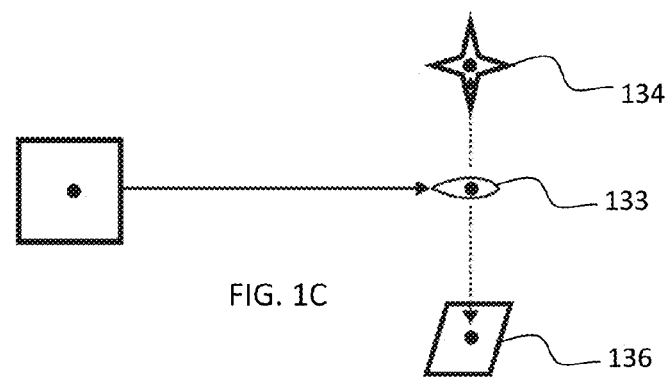

In the example shown in FIGS. 1B-1E, two new targets 134, 136 are introduced, allowing the device user to further make a 1-of-2 selection by directing gaze at one of the two targets 134, 136. A star icon 134 is introduced above the saccadic landing site 135, and a parallelogram icon 136 is introduced in the opposite direction. As illustrated in FIG. 1C, upon eye gaze landing at a site at which there is no object 133, the eye is readily "released" to make a selection of one of the two newly introduced objects 134, 136.

Figure 1D:
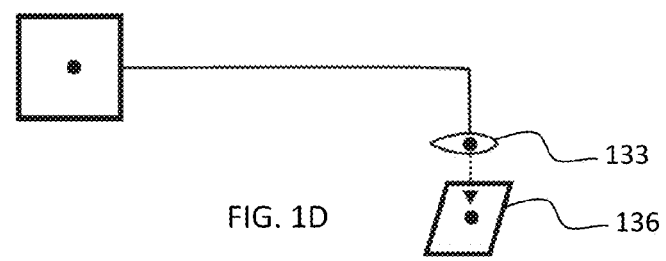
Figure 1E:
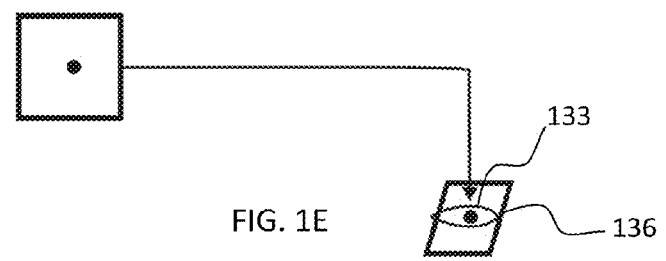

FIG. 1D illustrates a selection triggered by eye gaze 33 directed downward toward the parallelogram icon 136. Upon reaching the selected target (FIG. 1E) 136, the action associated with this particular target is performed. The gap effect can reduce the total time required for the eyes to make this activation and/or selection sequence.

Saccades can be further subdivided into 1) smaller movements (i.e., micro-saccades) that are a component of the fixation process along with (slower) physiological drift and tremor; and 2) larger saccadic movements used to explore the external environment. Micro-saccades are exclusively involuntary movements over ranges less than approximately 0.2° where their exact physiological role is controversial. Larger saccadic movements can be involuntary, particularly when an individual is startled, but are usually under voluntary control as an observer surveys the external world.

Measurements of physiological drift, tremor, and other smaller movements of the eye can be used as components to discern the physiological and mental state of the device wearer. These movements are also valuable in determining and monitoring a wide range of pathological conditions (in particular, neuro-muscular disorders) and the effects of drugs and other compounds.

Saccades can also be categorized based on their initiation or intent. 1) A reflexive saccade is triggered by the appearance or disappearance of an external event that may be within the peripheral visual system. 2) An anti-saccade involves eye movement away from a target object. 3) A scanning saccade is the primary mode for consciously viewing and exploring the external environment. 4) A memory-guided saccade allows an individual's eyes to move toward a remembered location in the absence of a visual stimulus. 5) Predictive saccades help keep the eyes directed toward a target that is moving in a temporally and/or spatially predictive manner.

Voluntary scanning, memory-guided, and predictive saccades can be useful to help discern the intent of a user within the eye signal language.

Eye Signals

In accordance with an exemplary embodiment, systems and methods are provided to substantially continuously or periodically classify eye signals. Eye signals are composed of movements of the eyes that are directed at conveying intent by a user. Sequences of eye signals can subsequently result in actions performed by one or more smart devices.

Eye signals can also readily be coupled to auxiliary information obtained from other wearable input devices such as one or more of switches, microphones, GPS (global position system) devices, thermometers, RFID (radio frequency identification) labelled objects to sense position within the device user's environment, and/or accelerometers to sense motion embedded, for example, in finger rings, buttons, or bracelets. Applications can also be coupled to information acquired using one or more of electroencephalography (EEG), electrocardiogram (ECG), heart rate (that can be sensed in a number of ways including via a pulse oximeter or within images of the eye), strain gauges to monitor respiration and other movements, other biometrics, and/or additional cameras to monitor gestures emanating from other regions of the body.

The following descriptions focus on human-machine control primarily using only one's eyes. By way of comparison, gestures such as those generated using a finger to control a tablet or touch screen are ubiquitous within modern-day computing devices. It is possible to completely control many computing devices, particularly those that are portable, exclusively using finger gestures. Unlike eye signaling, the movements of one or more fingers are completely voluntary in nature and the physical act of touching a screen (that can be sensed by a computing device) can be used as an unambiguous indicator that the device user is expressing intent to control the computing device, although occasional unintentional screen touches do occur. By contrast, controlling a computing device using eye signals has several unique challenges:

1. The eyes are in constant motion, acquiring information concerning almost every aspect of daily life. In particular, the eye must be used during the process of viewing a display or retinal projection device. In order to discern intent, surveying eye movements used to view and explore the display must be distinguished from deliberate eye signals.
2. It is difficult and uncomfortable to view, for any period of time, a location in which there is "nothing" (i.e., no visual references, edges, or cues). Similarly, it is difficult (without extensive training) to move the eye in a particular pattern without a reference object to follow. Thus, the layouts of objects and boundaries along with their controlled movements within a visual field may be used during eye-signal control operations.
3. Most voluntary movements of the eye can be classified as 1) smooth pursuit or 2) saccadic, where saccades can be either voluntary or involuntary. Different regions of the brain are involved in the control of each type of movement. In addition, there are immutable limitations within each type of eye movement. For example, smooth pursuit must involve the tracking of an object or edge that cannot exceed angular velocities of approximately 30°/second. Attempting to track target objects that exceed this angular velocity results in multiple, short saccadic movements to "chase" the object around a visual field. Saccades can be produced at angular velocities, up to 900°/second; but once initiated, there is no ability to make adjustments to correct a target location, even if the target has moved or disappeared. In contrast to smooth pursuit eye movements, saccades pass over regions of the visual field without perception. During the detections of eye signals, it is particularly important to algorithmically distinguish (i.e., filter) smooth pursuit, saccadic, and other forms of eye movements.
4. Within the region of the fovea, an eye can perceive exquisitely fine detail within a display or retinal projection. In fact, under normal lighting conditions, eyes can discern detail at resolutions close to the Raleigh Criterion. Assuming a pupil diameter of about three millimeters, this corresponds to an angular resolution for detection of approximately 0.013°. This is in contrast to eye-tracking systems associated with eye gaze that, even under optimum conditions, can generate angular resolution measurements that are at least an order of magnitude larger than the resolution for user perception. Eye signals must take into account this large discrepancy between perception (i.e., the minimum size of objects that can be perceived on a display screen) and measured gaze tracking resolution (i.e., the minimum size of objects that can be reliably selected during eye signal formation).

These challenges result in requirements for unique visual layouts and strategies for the efficient generation and detection of eye signals compared with other forms of gesture control.

On the other hand, there are advantages to utilizing eye signals as a human-machine interface (HMI) mechanism compared with devices such as computer mice, joysticks, or tablets; and display surfaces that use some form of hand gesture control.

1. Muscles that control the eye can generate movements that are the fastest within the human body. Thus, with strategically designed graphical user interfaces ("GUIs," referred to as "iUi"™ within the eye-signal systems and methods herein), there is potential for rapid eye-signal control.
2. The sensing and actuating components of eye-signal control are within the same organ (i.e., the eye and its six muscles that control movement) located only a short distance from the biological "processer" (i.e., the brain) used to coordinate eye signal control. The short neuronal pathways further lead to the potential for rapid eye-signal control with a well-designed iUi™ GUI.
3. In humans, the eye is the highest-bandwidth organ used to sense the external environment. Using eye gaze, it is possible to pinpoint and subsequently associate real world objects visualized in the environment with selected actions. During an eye gaze-based selection, other sensory or effecter organs do not need to be involved from either a physical or cognitive perspective. For example, there is no need for so-called "hand-eye coordination" to select a real or virtual object during an eye signal.
4. Eye signal control that is self-contained within an eyewear or headwear device can be unobtrusive, not only to the device wearer, but also to individuals in the immediate environment. Eye signals can involve no obvious movements, sounds, or visible lighting other than those discretely associated with the eyes and headwear. An individual next to a device user can be completely unaware that eye signals are being utilized.

Eye Signal Language

In order to describe a paradigm for eye signal control, it is convenient to develop and assign specific meanings to new terms. This terminology permits more concise descriptions of eye signals and can be more meaningful, particularly to those not familiar with the neural control or physiological movements of the eye. The following is a list of such terms:

An "interactable" is a virtual object that can be similar to an icon, viewable within a display. Icons are a familiar concept within the area of GUIs where they are used to convey meaning within minimal display areas, can be selectable, and are often language-independent. Within the present application, "interactables" can be used for similar purposes except an interactable selection process involves one or both eyes.

One form of an interactable involves the tagging or labeling of a real object in a manner that attracts attention and/or conveys meaning. For example, within an augmented reality display, one or more alphanumeric characters, halos, cursors, arrows, or other symbols may be superimposed within a display on or adjacent to a particular object. These may indicate to the device user a particular meaning assigned to the object so that it can be included in the eye signal language (in the same general manner as virtual icons). As examples, a halo can be placed around a physical light switch such that it can be the object of an action (e.g., turn on) or the name of a person can be displayed adjacent to the person's (real) face, allowing text or mail to be sent to that person using the eye signal language.

A "select" is the selection of an object using one's eye(s). Objects can be: 1) entities in the real world viewed, for example, adjacent to a display or viewed through a translucent display (indicated using the same techniques just described to annotate interactables). This also includes objects or graphics viewed on one or more remote screens (TV, computer display, signage, etc.) holograms, or other remote virtual or physical visible constructs; 2) entities in the real world captured by an external-facing camera and then viewed or augmented on a display that can be remote or wearable; or 3) virtual objects (e.g., interactables) viewed on a display device such as those used to initiate applications such as those associated with texting, e-mail, maps, weather forecasts, and so on.

As a device user surveys his/her viewable environment, objects that can be picked are usually highlighted or altered in some manner when viewed, providing valuable user feedback indicating gaze direction in real time. The final eye viewing position prior to a saccade to an "activate" interactable (see "go" below) is the location of a "select." Activation causes an action to be performed (on the selected object, if the object is needed to perform the selected action). The term "select" can be used as a noun to refer to an object that has been selected, or as a verb to indicate the process of selecting an object.

In an embodiment, the usual sequence within the eye-signal language is to apply an action to an object that is being viewed. In other words, an action is specified after specifying object(s). In rare instances within the eye-signal language, it may be advantageous to specify a component of an action prior to specifying one or more objects. As an example, the continuous activation mode described below allows actions to be performed on one or more objects repeatedly. In this case, the action (or at least some component of an action) can be specified first.

A "look" is the process of moving an eye from a real or virtual object (i.e., from a saccadic launch location) to another object (saccadic landing location) via a saccadic eye movement. As previously described, saccades are rapid, ballistic movements of the eye. The voluntary nature of "looks" and their potential (when needed) to rapidly cover large angular distances are of particular value and importance during rapid formation of eye-signal controls.

Saccades associated with looks can be reflexive, scanning, or memory-guided. A look can include a small corrective saccade following a large-distance saccade to hone in on a target location. A key feature of a look is the ability to algorithmically discern the occurrence of a look in real time, so that interactables or other objects in the path of a look (i.e., not at the launch or landing sites) are not selected. A look allows two objects or processes that are not necessarily adjacent to each another to be associated or connected during the formation of an eye signal.

A "go" is an activation target. A look from a "select" to the "go" target is an indication that a selection or activation is intended by the user. The "go" interactable may be located at a fixed (i.e., known to an experienced user) location so that memory-guided looks can be used during eye signal formation. Experienced users learn to avoid viewing the "go" location except when selection or activation is desired.

The sequence of control events within the eye-signal language differs significantly from gesture-based control systems. Differences arise because of a clear acceptance within the system design that the eyes are used constantly to conduct daily activities and they readily perform only specific types of movements such as saccades and smooth pursuits. In simple terms, this translates to a principle of "let the eyes do what they do naturally."

One difference with gesture-based systems is the sequence in which "objects" and "actions" are coupled together. In many gestures sequences in other systems, an action (e.g., change color, delete) is first specified and then applied to one or more objects. When using the eye-signal language, it is recognized that objects are viewed ubiquitously. If an action is to be performed, the action is initiated by a saccade or "look" from an object under routine observation to a location that initiates an action sequence (i.e., "go"). By analogy, if the object is a "noun" or "subject" and the action is a "verb," then in the eye-signal language, the noun/subject precedes the verb (i.e., similar to the common order of the English language).

This sequence takes advantage of the surveying nature of most eye movements. We constantly use our eye to "find things to do." If a sequence of: 1) finding an object, 2) selecting an action, and then 3) re-locating the object to which the action is to be applied, is wasteful of eye movements. Instead, in the eye-signal language, an action can be applied immediately to anything "actionable" viewed in our real or virtual world (i.e., by a single saccadic eye movement to an activate location).

Knowledge that a real or virtual object is "actionable" reinforces the notion of the importance of user feedback. Feedback is extremely important for a device user not to feel "lost." In the examples of user feedback described below, it is also important that the feedback itself does not interfere with normal operations of the eye. Thus, for example, the characteristics (e.g., size, thickness, location, color) of an outline around an actionable virtual object or a halo around a real object within a virtual reality system are chosen carefully so as not to distract or disrupt normal eye movements.

Under these conditions when viewing the world, an experienced device user uses a memory-guided saccade to a remembered location to initiate an action. At that point, additional screen prompts or object removals are very carefully timed (in the range of milliseconds) and controlled (to either attract or not attract attention) to guide or "hold" the eye as additional interactions are performed. Furthermore, since rapid eye movements occur in the time-frame of milliseconds, eye-signal action feedback must be in the same time-frame for comfortable operation.

In a further exemplary embodiment, a user can indicate voluntary "selection" or activation by performing a so-called "cross-eyed" manoeuver. Unless one is observing an object that is extremely close to the face, the crossing of one's eyes is a clearly recognizable and voluntary action. This can be incorporated within the eye signal "language" as an alternative activation action. However, frequent crossing of one's eyes can be perceived as tiresome. Thus, the eye signal language may assign lesser used actions to crossing one's eyes. For example, a brief cross-eye can be used to "go back" to a previous menu selection and a prolonged cross-eyed manoeuver can be used to reset the device to a "home" state.

A "pursuit" is an additional mechanism to indicate that an activation or action is intended by a user. "Pursuits" are specifically designed around the ability of the human eye to follow an object using smooth pursuit. "Pursuits" can be used in one of two functional modes: 1) if a 1-of-N selection is desired, then two or more graphical elements are projected radially outward at a constant velocity, moving away from the approximate central location of the original target location, or 2) if no selection is required (only activation) then the target pursuit interactable itself may move away from its original location. Following a pursuit object for a period of time and/or distance results in activation. A saccadic (or in rare cases, vestibulo-ocular or vergence) eye movement away from a smooth pursuit prior to a threshold time and/or distance being reached terminates the eye movement sequence without activation. All movements are carefully controlled (e.g., angular velocities are maintained well below 30°/second) so that they can be viewed via smooth pursuit, neurally regulated mechanisms.

In the case of a 1-of-N selection, the term "pursuit object" is used to describe the N individual sub-interactables or objects as they move smoothly and continuously, in a conveyer-like fashion, outward from the original target location. The process of following one of the N "pursuit objects" over a selected distance (possibly also considering time) is used to identify the user intent of making a 1-of-N (where N is the number of projected pursuit objects) selection and activation. The voluntary user selection of the 1-of-N states is primarily conveyed by the direction of the smooth pursuit eye movement. This distinction is important in simplifying the filtering and processing necessary to discern the intent of a user to follow a pursuit object. This may be contrasted with requiring the system to discern that a user's gaze is following a specific path for security or other control. The approach proposed herein is much simpler with broad applicability.

When tracking a single pursuit interactable via smooth pursuit, there can be two modes of eye-signal control: 1) discrete, or 2) continuous. In the case of the discrete mode, once the moving pursuit target is substantially continuously followed over a selected distance, then activation criteria are satisfied and the device responds to the selection. In the continuous mode, the distance tracked by the eye as it follows the pursuit interactable (i.e., generally relative to its starting position) is used as a substantially continuous "measure" or scale that is available for algorithm control (similar to a "slider" control in typical GUIs).

Programmatically, the continuous mode is also useful for stopping partway through a specified action. For example, depending on the distance moved, a page may remain in a partially moved location within a book-reading application when the user looks away from the pursuit interactable. This action may be referred to as a user's eye "hopping the track" to slow or stop some activity that would otherwise be continued by a user's continued pursuit of an object. This provides a user with real-time, granular control in a natural manner. In such cases, a specific target to which the user's eye "hops" (i.e., moves as a saccade), may be offered. The requirement that a user must look at a particular target may or may not be included.

Figure 10:
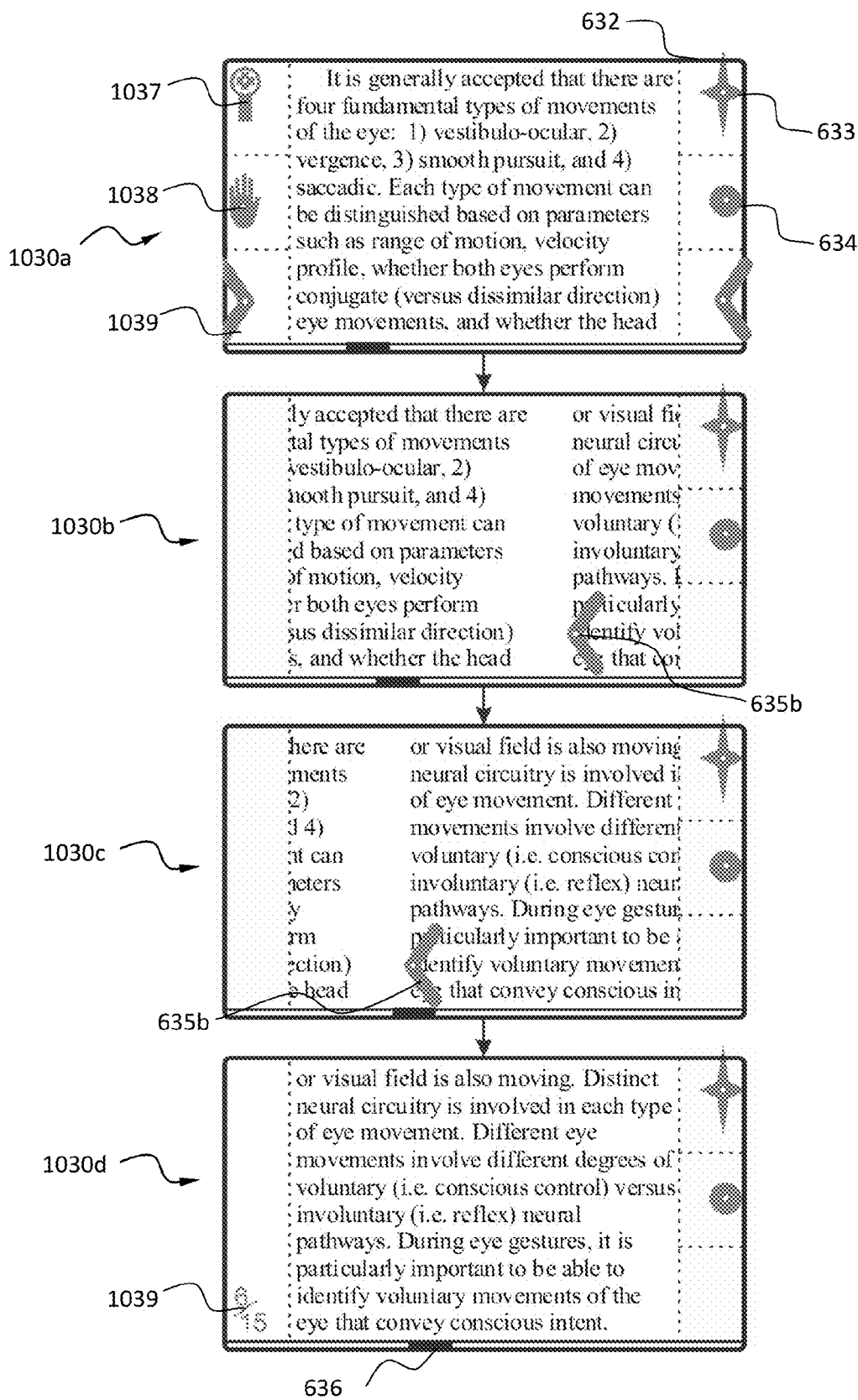
FIG. 10 is a series of screenshots illustrating eye-signal control over the viewing of pages of text.

During smooth pursuit, when the eye (and associated pursuit object) reaches a terminal position, the program may repeat the selected operation for as long as the region of the terminal position is viewed. Programmatically, this is commonly referred to as a loop or repeat structure. A visual indication related to the number of loops or repeats can be displayed at the terminal position. This is one of the few instances where the eye dwell time plays a significant role to convey user intent. The process of controlling multiple page turns while reading text, illustrated in the lower panel of FIG. 10, is an example of a "loop" or "repeat" process controlled by eye fixation.

During a pursuit process, if the user does not follow a moving interactable or pursuit object, or if the user looks to another location before sufficient distance has been traversed, no activation occurs. The ability of an individual to substantially continuously view and perceive what is being tracked during smooth pursuit, in contrast to saccadic eye movements, is a key element of pursuit-based eye signals. Pursuit objects can disappear once activated or disappear or fade after a short time/distance if not tracked. All but the tracked pursuit object may disappear, fade, or be translucent, and/or barely visible once a particular pursuit object is being tracked.

As a further embodiment, pursuit objects can, not only operate in the plane defined by the horizontal (i.e., X direction) and vertical (i.e., Y direction) axes, but also in the third dimension (i.e., Z direction) where methods to determine the focal distance of a device user are used. These methods include binocular vergence or assessing the curvature, thickness, or other geometries of the left and/or rights lens(es) that make up the eye. Pursuit objects can be made to appear to move toward or away from the device wearer. The intent of a device wearer can be inferred based on whether the device wearer voluntarily follows virtual movements in the Z direction.

It is also possible to combine the detection of voluntary tracking of pursuit objects in any combination of X, Y, and Z directions. When using all available dimensions, pursuit object particles appear to "explode" in all directions, allowing the user to track a single particle to make a 1 of N selection.

A "reveal" is a target interactable which unlike the go, does not need to be preceded by a select, although it could be preceded by a look from a pursuit object which is relevant to the "reveal." A special instance of a "reveal" interactable is the "main reveal." This "reveal" is placed at a fixed (i.e., known to an experienced user) location accessible to a user on all (or most) screens and, for example, may provide access to "home," "back," "settings," and/or "menu" interactables. Upon viewing the "main reveal" interactable, additional interactables can be further "revealed" or superimposed on an existing display.

A key aspect of the main reveal is the temporal control of the display of the interactables revealed once the user makes a look to the main reveal. The revealed interactables are only viewable for a short time-period. Failure to view (generally via a look) one of the additional "reveal" interactables within a specified time period causes the additional interactables to fade or disappear, resulting in no selection. The intent of a device user is discerned by the initial viewing of the main reveal interactable and then, within a fixed time period (generally less than 1 second), "looking" to one of the newly revealed target interactables.

As described in greater detail below, reveals are particularly useful for providing contextual access to additional selections and/or information. The main reveal interactable reveals interactables that do not require any additional selection information. A look from the main reveal to the revealed "home" or "back" interactable instantly activates the selected interactable.

In some cases that are usually dependent on context (e.g., examining an image that takes up most of a display), a certain amount of "friction" can be added to some menu selection processes such as a "back" interactable. This can be implemented, for example, by making the gaze selection area associated with the interactable smaller. Context-sensitive customization is one of several strategies to avoid inadvertent activations, particularly within dense displays.

A reveal may itself be nested or layered, where newly revealed interactables are replaced by other (generally different) reveal interactables. This nesting of reveal icons can continue for any number of layers. Within each layer, the selected reveal interactable may be replaced by a "back" function and associated graphic. This scheme permits multiple "back" operations to gracefully return to a previously displayed, layered reveal tier or group. In addition, as described in more detail below, a user can always return to the top-level (i.e., home) menu by using a "home" interactable triggered by the main reveal. The reveal layering and context-sensitive display of interactables maximizes the use of display real estate available for eye-based selections.

A "reveal" is a process whereby a functionality (often referred to as a "tool" in some gesture-based GUIs) is selected that can subsequently be applied either immediately (if no other information is required for application) or following the subsequent selection of a location or object to which the menu reveal functionality is applied.

Another type of a reveal is a "menu reveal." Menu reveals are particularly useful in cases where a function is being chosen from a large number of possible selections. This is in contrast to a main reveal that is useful in situations where there are a small number of frequently-used selections including "home" and "back." Unlike main reveals, menu reveals and other reveals are not time-dependent.

A typical (non-main) reveal selection process begins by presenting a context-sensitive set of revealed interactables as a menu where initial selections can depend on the content (e.g., picture, text, apps) that occupied the central display region between the sidebars. Menu items are laid out by superposition (e.g., translucent or opaque) over this central display region. Menu selections can be surveyed (again, without time constraints) by a device user. An individual menu reveal can then be selected using the established look-and-go sequence, described above. In other cases, a revealed menu interactable may be activated by "looking" from it to an object in the display or elsewhere, such as an object viewed in the real world.

The transitions within such reveal steps are particularly important for a pleasing user experience. Changing the opacity of a selection and/or moving a segment of a display so that the eye naturally follows to a new selection menu are examples of such transitions. Conversely, sudden changes involving objects either appearing or disappearing, particularly in multiple locations simultaneously, are generally perceived as harsh and tiring within the visual environment.

Menu reveal selection results in the display of menus that are similar to drop-down menus (that are familiar in many other GUIs). When a menu item is selected, the region that contained the original (i.e., selected) menu reveal can immediately be transformed into a "back" button, allowing a user to reverse a selection and/or climb up the tree structure that represents the process of menu selection.

The sub-menu selection process can be repeated any number of times, allowing a user to select from a pool of selections that (in theory) can be infinitely large. By strategic selection of menu and sub-menu structures, it is possible to generate context-sensitive display of interactables within the limited screen display real estate (e.g., without a need for screen scrolling). Once a menu reveal has been selected and activated, the display is returned to its original state (such as a picture or body of text) and the operation represented by the revealed interactable (e.g., magnify) can be applied and re-applied, if desired.

A tool that is ubiquitous within GUIs employed over a wide range of other menu-selection devices is the so-called "drag 'n drop." The eye signal language must handle a "drag 'n drop" functions in a different fashion due to the physiological constraints of eye movements. It is not possible to "drag" an object along a particular path using a ballistic saccade. Similarly, a smooth pursuit must be guided by the display (not the user). These are in contrast to the actions that can be performed using other control devices such as a hand-held computer mouse where there is a clear voluntary control over the pointing device.

Instead, edges of objects or areas may be specified by eye movements. This takes advantage of the eye's innate capabilities to discern edges. This also requires careful user interface layout to provide edges at appropriate selection locations to serve as focal points (e.g., that may include a grid, array of dots, or periodic waveform). A resultant action (i.e. when activated) can then take into account both the current and one or more previous eye selections. The (distinguishing) term used to describe this process using eye signals is a "pick 'n place."

Table 1 summarizes some of the functional or programming elements that are available via such eye signals. These elements serve as "primitives" or building blocks by application developers for iUi GUI construction with a shell framework built upon eye-signals.

TABLE 1

Eye-language Primitive Operations

| Function | Implementation | Example |
| --- | --- | --- |
| select and activate a single application from a large cluster of processes or applications | select, look, & go | menu selection |
| scroll display window to other windows containing more application "objects" | a single mode pursuit | scroll among pages, partial pages, chapters or sections of a book |
| quickly choose from small number of selections including "home" and "back" | main reveal | jump to home page main menu |
| pick 'n place | select, look, & go, followed by select, look, & place | insert word(s) into text |
| select from a large number of menu functions | menu reveal | select magnifier to zoom a photo |
| 1-of-N selection | track a pursuit object | specify 1 of 8 directions on a map |
| continuous slider | single mode pursuit | volume control |
| Loop | dwell following single mode pursuit | repeated page scrolling |

Other exemplary combinations of eye signal sequences include: 1) Select a region: by performing a series of looks across a collection of intersection points on a grid presented as a framework to enable the selection against a possible homogeneous background (unfriendly for eye fixations) and look from a last point to go. Alternatively, starting at one interactable, look along multiple points to a final location where the final look to an interactable triggers selection and indicates the selection via multiple-region highlighting. 2) During the selection of a region of text, look to a reveal; look to a "text select" revealed interactable; look to the first word of a selection and optionally look to intermediate words; look to the final word; look to a text select (or "delete text", "replace text", or other text-actionable interactable). When "looking" to the "replace text" interactable, a user might speak replacement words that could be captured by a microphone for speech-to-text conversion with instant replacement on the display for the selected word or words.

The general "grammar" of eye language is applicable to a number of eye-tracking platforms. Eye movements and interaction patterns can be discerned using headwear-based devices that include unobtrusive cameras, such as the systems described elsewhere herein and in the references incorporated by reference. The headwear may include virtual reality, augmented reality, and/or other near-field displays, and/or one or more displays that are remote from the headwear. Eye movements and patterns can also be discerned using non-head mounted cameras including those embedded within cell phones, tablets, laptop computers, and desktop computers.

Eye-tracking cameras can also be used that are "peripheral" to processing units such as those connected via a USB (universal serial bus), wirelessly (e.g. via Wi-Fi or Bluetooth), affixed to the dashboard of a car, mounted near a television or other display, attached within signage, and other eye imaging configurations. Eye movements and interaction patterns can also be discerned from cameras that image regions of eye(s) based on reflections from mirrored surfaces, from surfaces that reflect selected wavelengths (e.g. so-called "hot mirrors"), fiber optic image guides, through lenses, and other optical configurations that can convey images of one or both eyes. The grammar and eye signals contained in the iUi GUI (user interface) can be relevant, useful, and/or be deployed in any of these contexts.

Eye Signals Supplemented by Head Movement

The eye signal grammar can optionally be augmented by tracking small head movements or "nods." In a manner similar to saccades and smooth pursuits, voluntary head movements are a natural (i.e., comfortable) extension of eye movements. In fact, any shift in gaze greater that about 20° (although this value varies widely from individual to individual) is usually associated with a head movement. This can occur routinely during daily activities without significant conscious effort. The different regions of the brain involved with saccade-associated head movements have been studied where, for example, (poorly understood) differences in the propensity to generate head movements varies as a function of age.

Accelerometers are commonly embedded within wearable devices. Acceleration and orientation relative to the earth's gravitational field based on the output of a head-mounted multi-axial accelerometer can provide information about relative head movements. When coupled with eye gaze direction and the tracking of vestibulo-ocular eye movements, absolute head position and movements referenced to viewed objects can be discerned. This provides a vehicle to integrate head gestures with eye-signal control.

Small, voluntary head "nods" used to convey intent can be distinguished from typical head movements based on 1) the relatively small amplitude of the movement, 2) movement velocity, and 3) the performance of the movement while the eyes are viewing a stationary location (e.g., interactable, real or virtual object, edge, point). These head movements take advantage of vestibulo-ocular eye movements, one of the four foundational types of eye movements described previously.

As described above, vestibulo-ocular movements are purely reflexive, moving the eye through the same rotation as the movement of the head, but in the opposite direction. This is used to stabilize images of the external world onto the foveal region of the eye. Thus, although a vestibulo-ocular movement itself is involuntary, the movement of the head that produces a vestibulo-ocular movement can be voluntary. Therefore, such head movements can be used as one component within the eye signal language to convey user intent.

When instructing an individual on how to use head nods to convey intent, it is sometimes useful to use the expression "point with your nose." In other words, when looking at an object, if one nods in a direction with one's nose (i.e., causing the eyes to move in the opposite direction), then one can convey intent based on the direction of movement (e.g., left, right, up, down) of one's nose.

A head "nod" may return to its point of origin or it can continue in a given direction in a manner similar to a pursuit object (see above). It is comfortable to generate head nods in one of four directions: 1) left, 2) right, 3) up, or 4) down. With a little more effort, one can also generate head nods in the following four additional directions: 1) upper-left, 2) upper-right, 3) lower-left, or 4) lower-right. The "amplitude" (i.e., range of motion) of a head nod can also be used as a continuously-variable control of the "amplitude" of a particular action.

Armed with this flexibility, head nods can be recognized and incorporated within eye signals in a number of ways. First, the presence of a head nod can be used as an indication for "activation." The presence of such voluntary head movements can be algorithmically distinguished or filtered from other movements of the head based on movement range, velocity, direction, and user-interface context (see, e.g., FIG. 4). During some eye signal sequences, this can avoid the need for saccadic or other movements of the eyes to execute an "activation" sequence.

Second, the direction of the head movement can be used to make a 1-of-N selection where N can be any value between two and at least the eight different directions described above, i.e., 1) left, 2) right, 3) up, 4) down, 5) upper-left, 6) upper-right, 7) lower-left, or 8) lower-right. For example, one could pick one selection from a choice of the 7 days of the week using a single head nod in order to view a calendar of events. As another example, one can select a "yes" answer by a head nod up or down, or "no" with a head nod to the left or right.

Third, the amplitude of the head nod can be used to indicate the magnitude (i.e., in a non-discrete mode) of a particular action. For example, one can use both the direction and amplitude of a head nod to perform a "pan" function on an image, large table of objects, or map. The greater the amplitude of the head nod, the greater the displayed pan movement.

Fourth, head nods can include rotation. Rotation can be in the clockwise or counter clockwise direction. To some degree, head rotations can be graded (i.e., larger or smaller). Head rotations are generally not well reflected as rotation of the eye (a component of Listing's Law); however, they can be detected by other means including overall scene rotation in a camera affixed to the head, accelerometers, or remote cameras that can view the face or head.

Fifth, head nods can be repeated any number of times. Depending on context, this can be used to repeat a single action a number of times or to indicate the selection of an action from an extended menu (e.g., beyond one specified by the eight different nod directions). An example of the former is to repeatedly zoom in on an image (e.g., picture, map) as long as head nods occur in the up-down direction. Zoom out can similarly be implemented as long as a left-right repeated head nod occurs. In other contexts, for example when reading a book, left-right head nods can be used to control the direction (i.e., first head nod in the left versus right direction) and speed (number of left-right nods) of turning pages in a book. The most complex of head nod gestures can be reserved for lesser used, but important functions, such as two left-right nods followed by two up-down nods placing a device in a low-power or "sleep" mode.

Eye-Tracked Object Signals

In another embodiment, one can reverse the usual role of using virtual objects to trigger or initiate actions. For example, an outward facing camera can track an extended finger moving over a range of about 10° to 20° in a user's field-of-view. One can apply the same eye tracking rules that govern the tracking of a pursuit interactable when tracking the real object. When, for example, a sufficient range of tracked finger movement has taken place (i.e., less than 10° for applications that require more exaggerated movements, but more typically less than 1°), the system can launch an action (e.g., take) of a photo. Attributes of the finger (e.g., what it is pointing at, whether bent) can be used to help determine which action is performed.

The placement and use of a finger (or any other object that is controllable by a user, such as a pointer, light, laser beam, hand-held object, and so on) within a device user's visual field-of-view can aid in discerning intent. Movements of, for example, arms, hands, and fingers are purely voluntary (although they can be related to non-associated activities). Thus, it can be easier to discern intent from motions and objects that are carried, pointed to, and so on using one's eyes. There may also be differences in power consumption within a device when configured for the different activation roles of real and virtual objects. The coupling of objects viewed in the environment with eye signals is a useful feature, described further below.

In addition to looking at real objects in the environment, it is possible for a user to select other virtual objects within displays or screens within an environment. These displays can include smart watches, screens on healthcare equipment, industrial screens (within manufacturing equipment), televisions, etc. A user can execute eye signals with display feedback on a wearable screen or on any of these remote screens.

Figure 2A:
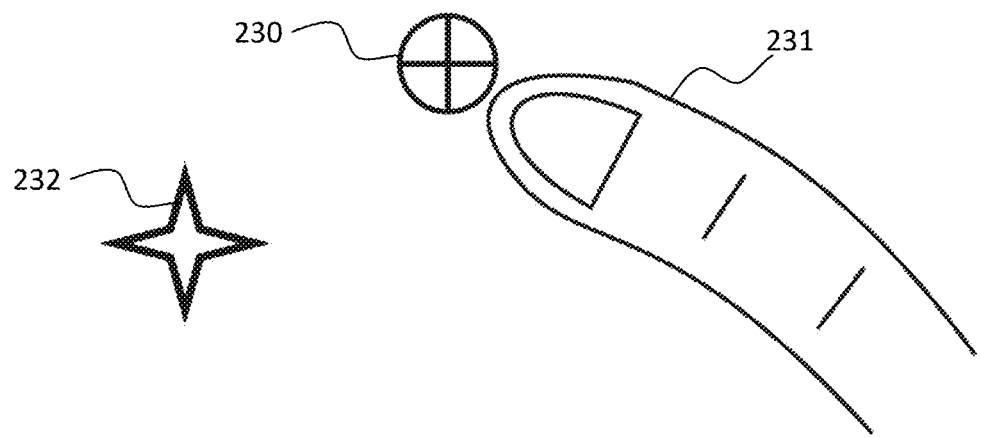
FIGS. 2A and 2B show the activation of a user selection based on eye signals and a viewed finger.
Figure 2B:
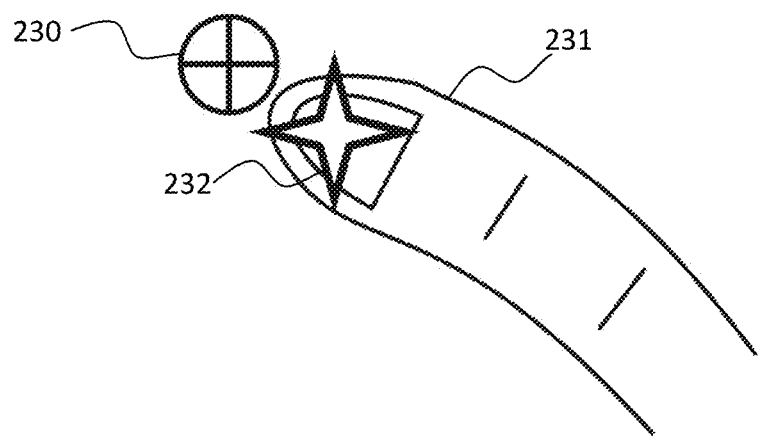

FIGS. 2A and 2B show an example of an eye-tracked object signal. In this illustration, the gaze location of a device user is indicated by a star 232. A real or virtual target associated with a particular action is indicated by a crosshair 230. As illustrated in FIG. 2A, even when a finger 231 happens to be adjacent to an activation target 230, as long as the device user does not specifically look at the finger 231, activation does not occur. On the other hand and as illustrated in FIG. 2B, when the user looks at the finger 231 and it is in the vicinity of an activation target 230, activation occurs.

Eye Signals Supplemented by Voice

The ease and efficiency of multi-modal eye signals can be greatly enhanced by the inclusion of voice within command sequences. The detection and ability to transcribe a user's voice into, for example, text is a particularly powerful combination when used with eye signals. Vocalizations and/or other forms of human-machine control interact naturally with eye signals. In general, the enacting of an eye signal may be used to specify both the form of an action and when the action is to take place. Vocalizations may then supply one or more "subjects" for such target actions.

This can be illustrated by an example of generating a so-called "text message" using voice recognition and then making corrections to that message using a combination of eye signals and vocalizations. An eye signal is first used to indicate to the device that a user's voice is to be transcribed into text. Both the beginning and end of voice entry are under eye-signal control. This allows any combination of words to be transcribed. In other words, there are no key words or phrases that could disrupt transcription. Using a subsequent sequence of eye signals, a place within the text can be specified with the eye(s) for a correction or insertion. Once again, vocalizing a correction (including the possibly of spelling a correction) is controlled by the simultaneous application of vocalization and eye signals.

Eye-signal control with synergistic voice command input is distinct from voice control where the eye might simply be used to gaze or point (in a non-signal based mode) to an object that is enacted upon as a part of the command. Non eye signal-based voice activation generally requires the use of key words or phrases. In order to avoid inadvertent activation, these words or phrases must be avoided during normal conversation. Phrases that sound similar and/or words spoken by another person in the vicinity are additional sources of inadvertent voice activations.

Additionally, when one is providing the device with any form of free-form verbal input (e.g., phrases for an e-mail message), there needs to be some indication that free-form input has ended. This is often achieved by detecting a prolonged pause or a specific keyword or sound. Once again, this is subject to inadvertent termination since, for example, a pause in speech could indicate that one is simply thinking about a topic. An experienced user of eye signals avoids inadvertent activations simply by looking at a location that represents activation or completion only when activation or completion is desired.

Another way of describing advantages of eye signals with synergistic voice input involves treating an eye signal as specifying both 1) what to do (i.e., a verb), and 2) when to perform an action. The voice is an additional source of data (i.e., a subject) to help perform the action. This is in contrast to initiating an action solely with a voice command where the device must always be "listening" for some form of alert or action phrase (i.e., verb). The position or object viewed by the eye at the time of a voice command becomes supplementary input.

Such eye signal-invoked filtering of audio is also useful when there may be high ambient sound with only occasional speech. A system that is always listening consumes more power than one that is activated by a simple eye signal, particularly when the eye-tracking system employs low-power methods (described below) to determine when the eye gazes at display locations.

Specifying an action via an eye signal also avoids ambiguities associated with a verbal action control. Careful selection of eye signal menus allows a device to be directed to perform a specific (i.e., unambiguous) action. In contrast, a request using a verbal command such as "find Jane" provides no indication to the device if "Jane" is to be found as a word within a body of text, using face recognition within a set of images, as a spoken name within audio records, where Jane is physically located, whether to display vital statistics about Jane, etc.

Eye Signals Supplemented by Other Modalities

In other embodiments, eye signals may be combined with other input modalities to control device actions. These modalities may include head movements such as shakes, tilts, or leans (e.g., indicating "yes," "no," interest, surprise, reflection); muscle twitches and movements, (with cameras mounted facing the eye(s)/head/face); hand movements and gestures with appropriate externally facing cameras; jaw movements and teeth clicking with appropriate audio, force, or motion sensors; as well as traditional computer input devices such as keyboards, mice, and touch screens.

Eye signals interact naturally and synergistically with other man-machine control modalities. For example, little or no training is required for an individual to learn to point a finger or look at a light switch and vocalize "turn on" or perform an action such as a smile (conversely, with a frown to turn off). The combination of pointing with one's eye(s) and recognition of an action can be easily understood and generalized to other situations. It would then be intuitive to a device user to subsequently survey a home or office and begin to perform commands, for example, raising eyebrows directed at a thermostat to "raise temperature" or when viewing a door lock saying "open door." Control using eye gaze can augment the normal operation and actions of numerous other devices.

Another powerful combination of sensed information is achievable by collecting data specified by the FACS as a series of "Codes" for Main Action Units (AUs), head movements, eye movements, visibility states (of areas of the face, determined by inward-facing cameras, external-facing cameras, and inertial measurement units), and gross behaviors. This information can then be merged with time-synchronized gaze information to provide a vast amount of information regarding emotional state and user intent, given the additional context of knowing exactly what a user is gazing at. This further supports the objective of transforming user intent into action by initiating activity locally on a wearable head-mounted display device or remotely on any device in the world.

Algorithmic "Filters" to Discern Voluntary Eye Movements

During the formation of eye signals, algorithmic filters take advantage of the physiological basis of all fundamental types of eye movements: 1) saccades (memory-guided or vision-guided); 2) smooth pursuit (including object tracking at appropriate physiological velocities); 3) vergence (with binocular eye tracking to produce a third dimension during object selection); and 4) vestibulo-ocular (incorporating head nod selections).

Additionally, during a series of eye movements that make up an eye signal, the gap effect can be used to remove the appearance of objects within a field-of-view in a manner that frees eye movements and speeds eye signals; when a target location is viewed that results in an eye action, a "familiar" thumbnail can be displayed as user feedback, requiring reduced visual processing and more rapid transition to additional actions; techniques associated with change blindness are used to introduce objects without attracting attention; objects are tailored (e.g., size, brightness, color relative to background, contrast, opacity, detail, repetitive screen position) to regulate the degree of attention produced by the visual cortex when altering the visual field; and the timing and characteristics of objects are further tailored in a manner that is dependent on the gaze direction of the user and their associated foveal, parafoveal, and peripheral views.

These physiological concepts are also used to control when, where, and how objects are introduced into, or removed from, the visual field during the formation of eye signals.

Foundational to the systems and methods herein are the physiological bases and limitations of eye movements. As previously described, the most common types of eye movements that can be performed directly or indirectly under voluntary control are: 1) saccades, 2) smooth pursuit, 3) vergence, and 4) vestibulo-ocular. Using eye position data determined from a series of eye images, algorithmic "filters" can be constructed to identify and distinguish, in real-time, the presence of a saccadic or smooth pursuit eye movements.

The saccadic filter relies primarily on the fact that saccades are rapid. In fact, as mentioned previously, saccades are the most rapid movements in the human body with angular velocities up to 900° per second. The saccadic velocity profile is ballistic, where (up to displacements of about 60°) peak velocity is a linear function of distance travelled. For example, a 10° saccade has an angular velocity of roughly 300° per second whereas peak angular velocity for a 30° displacement is roughly 500° per second.

An aspect of implementing eye signals based on saccades within the systems and methods herein is the ability to unambiguously couple or connect virtual or real objects located at two positions (i.e., the saccadic launch position and the saccadic landing position) anywhere within an observer's field-of-view without interference by objects along the visual pathway between the two positions. By performing a series of saccades, any number of objects or positions can be logically connected under voluntary user control to discern intent.

Saccadic movements are an order of magnitude faster than the fastest motions associated with smooth pursuit. This velocity difference is a key distinction within a smooth pursuit filter. The overall direction and speed of a smooth-pursuit eye movement must also match the velocity profile of the object that is under observation (unless the observer has received extensive training to avoid this). Thus, smooth pursuit can readily be distinguished from saccades based on velocity, and from other eye movements (i.e., vergence and vestibulo-ocular movements) based on whether a match exists compared to the velocity profiles of displayed or real objects.

More specifically, when viewing slowly moving objects, a smooth pursuit can be recognized by close following of the object after a latency of approximately 100 msec. Smooth pursuit is generally recognized at angular velocities less that about 30° per second; although somewhat higher velocities may occur, particularly in the horizontal direction. At object movement velocities greater than those that can be followed by smooth pursuit, so-called "catch-up saccades" are used by humans to track objects in the environment. This saccade-fixation sequence is easily distinguished from smooth pursuit based on overall velocity as well as the start/stop velocity profile of saccadic sequences.

Another aspect of implementing a smooth pursuit filter within the systems and methods herein is the ability to unambiguously determine when a user is voluntarily following a specific object on a screen. By assigning meaning or purpose to different objects that can move about on a screen, user intent can be discerned by measuring which object (if any) is being followed. This approach is particularly powerful in selecting 1-of-N states (or the absence of tracking any object) if there are N "trackable" objects moving about a screen (e.g., see FIG. 1).

Figure 3:
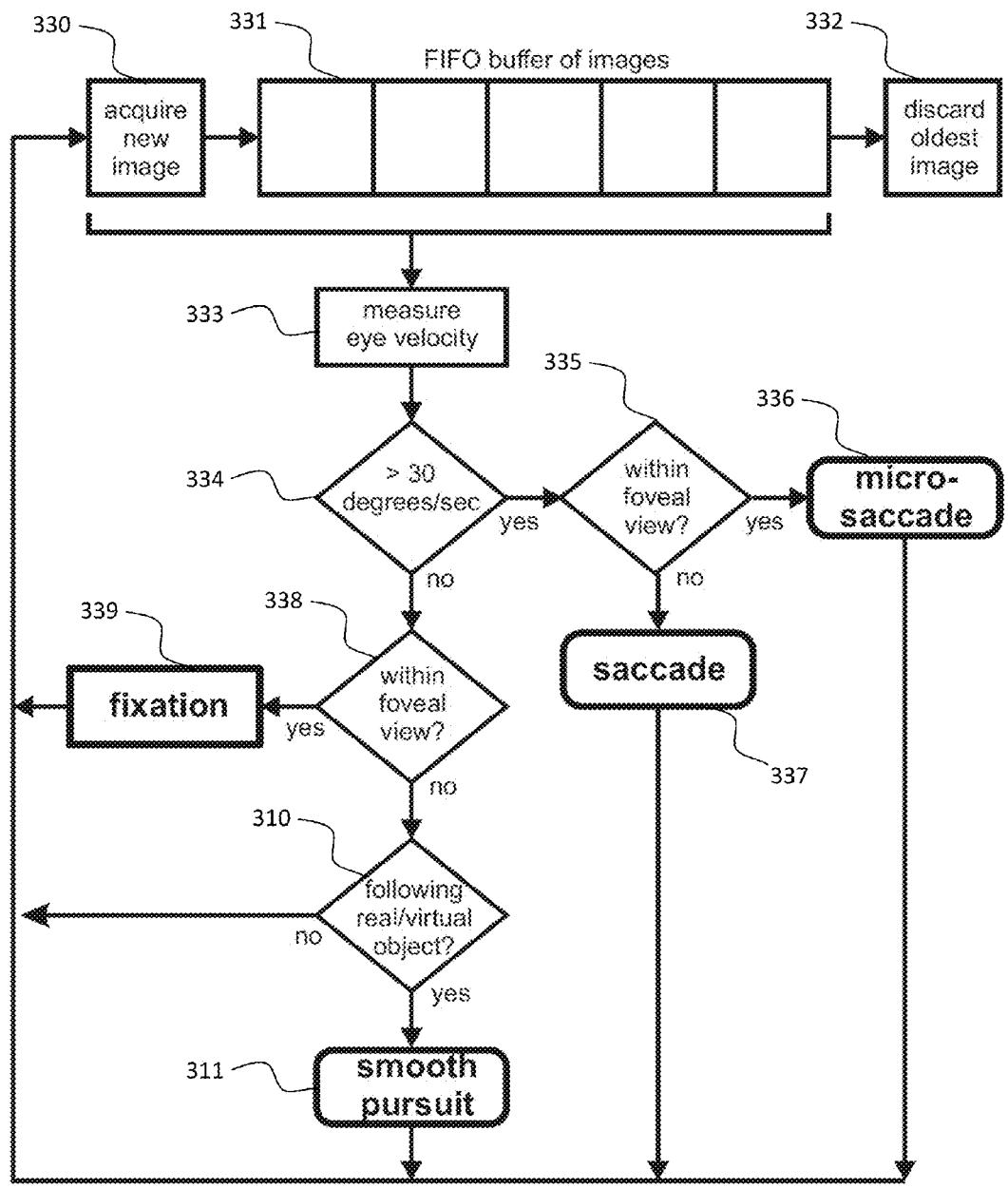
FIG. 3 is a flowchart illustrating the classification of saccades, micro-saccades, smooth pursuit eye movements, and fixations.

FIG. 3 schematically illustrates an algorithmic approach to identify saccadic and smooth pursuit eye movements. When a new image of an eye is acquired 330 at, it is added to a first-in first-out (FIFO) buffer at 331 of eye images and/or strategic measurements. Oldest images and/or measurements are discarded at 332 from the FIFO buffer(s) at 331. Eye velocities are measured based on eye-tracking within images at 333. If the eye velocity is greater than a minimum threshold for saccadic movements (typically 30° per second) at 334, then the system signifies that some form of saccadic movement has occurred at 335. If the saccadic movement occurred over a distance that is generally within the foveal view (i.e., within approximately 1° to 3°) at 335, then the eye movement is recorded as a micro-saccade at 336. If, on the other hand, the angular distance travelled by the eye is greater than this range at 335, the event is registered as a saccade at 337.

If the velocity of eye movement is less that the threshold for a saccadic movement at 334 and the movement (if any) is within the foveal view at 338, then the eye is essentially stationary and the event is recorded as a fixation at 339. If, on the other hand, the eye is traveling at a velocity and direction that matches that of a real or virtual object at 310, then the displacement is classified as a smooth pursuit eye movement at 311.

Another class of eye signals is "vergence," detected using binocular eye tracking. Even though vergence eye movements are generally reflexive, a user can voluntarily control which objects (i.e., positioned at different distances) are being viewed. Thus, there is an indirect control over a user's vergence.

Vergence signals are generally slower than smooth pursuits (particularly as one ages, due to conditions such as presbyopia), but offer extraordinary flexibility as one works with a three-dimensional palette for interacting with objects. Vergence control is difficult to achieve without targets, but there is some degree of conscious control over focal distance in situations when there is a large depth-of-field (i.e., near objects, such as dirt on the glass of a window, versus far objects along the same sightline).

Importantly, one can consider a set of objects, presented with binocular displays (i.e., one display per eye), so that the objects come in and out of focus with gaze (possibly controlled by tracking vergence binocularly), so that a user can look or pursuit among objects on a plane and "zoom" between objects on planes presented and perceived at different distances/depths. Vergence motions are limited to angular velocities up to approximately 25° per second. Selection of virtual objects at different depths literally adds new dimensions to an object-selection palette, greatly expanding the number of objects that can be displayed and/or selected/activated.

Vestibulo-ocular eye movements are also generally considered reflexive in response to head movements. However, the head movements themselves are frequently voluntary, particularly when a device user is focused on an object. Thus, there is an indirect control over a user's vestibulo-ocular eye movements.

Figure 4:
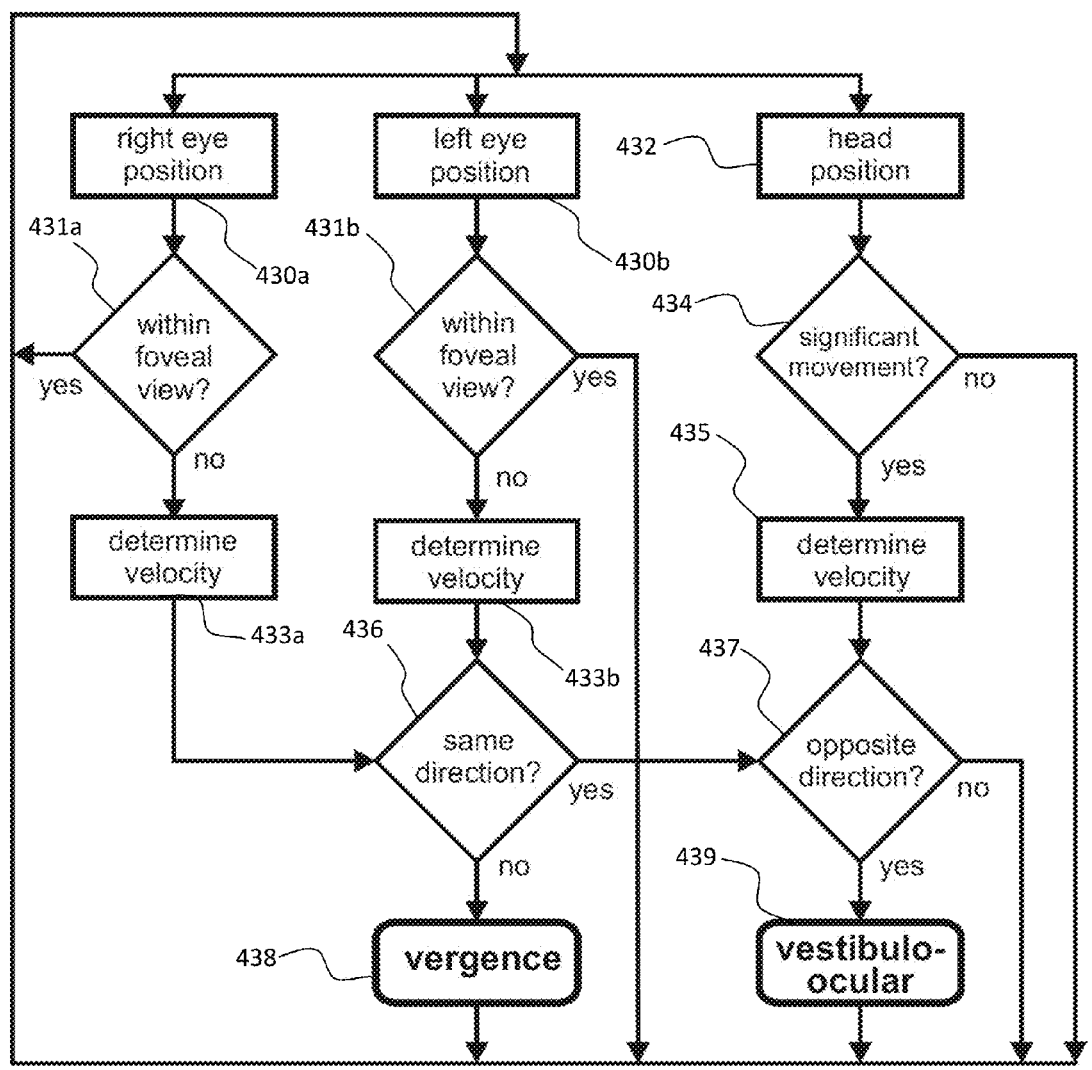
FIG. 4 is a flowchart illustrating the classification of vergence and vestibulo-ocular eye movements.

FIG. 4 schematically illustrates an algorithmic approach to differentiate vergence and vestibulo-ocular movements. In the case of vergence movements, eye position measurements from both the right 430*a* and left 430*b* eyes must be considered. If either right 431*a* or left 431*b* eye positions are within the foveal view of the device user (compared with previous eye position measurements, not shown), then there is no further consideration of vergence or vestibulo-ocular movements. If movements exceed beyond the foveal view, then velocities are computed for the right 433*a* and left 433*b* eyes. Simultaneously, head position is determined at 432 using accelerometers, overall movement of images within scene camera(s), or other methods. If head movement is insignificant at 434 then no further comparisons are made. Otherwise, head velocity at 435 is computed based on head positions at 432.

If the right and left eye move in the same direction at 436 and this direction is opposite the direction of the head at 437 with an approximate correspondence in movement magnitudes, then the eye movement is classified as vestibulo-ocular at 439. If the right and left eye move in the opposite directions at 436 with roughly the same movement magnitude, then the eye movement is classified as vergence at 438.

Another strategy to algorithmically identify eye movements that express user intent is to simultaneously identify eye movements that are also NOT associated with conveying intent. Once identified, these movements can be ignored, subtracted or otherwise accounted for in the overall interpretation of voluntary eye movements. For example, high frequency oscillations or tremors (physiological nystagmus) are superimposed on nearly all forms of fixations. These oscillations shift the image on the retinal receptors, recruiting fresh retinal receptors near boundaries and moving approximately the distance between two adjacent foveal cones every 0.1 seconds.

In addition to "normal" (i.e., non-pathological) filters, algorithmic filters can also be constructed to distinguish and identify pathological eye movements that are NOT associated with voluntarily conveying intent. Once again, these movements can be ignored, subtracted, or otherwise accounted for in the overall interpretation of voluntary eye movements. For example, 3 to 6 cycle-per-second oscillations are associated with Parkinsonian tremor. Schizophrenia may cause a stiffening and/or spasms of eye muscles. Involuntary eye movements in individuals with attention deficit hyperactivity disorder (ADHD) during the anticipation phase for a visual stimulus have recently been characterized. Along similar lines, pharmaceuticals and other drugs including alcohol may affect eye movements (as well as eye lid movements), possibly forcing one or more criteria for discerning purposeful eye movements to be altered under such conditions.

Additionally, some eye movement patterns, such as those associated with epilepsy or concussion, may indicate a need for immediate medical attention or the need for a particular medication (e.g., insulin). The device can initiate steps to automatically call for medical assistance and/or alert the user that medication(s) or other actions are required. The algorithmic filters to discern normal and pathological eye movements can also be a key element in the long-term monitoring of the health of an individual. This can include the monitoring a wide range of neuromuscular, ophthalmologic, or central nervous system disorders; as well as "normal" progression of eye movements and behaviors as a function of age.

Another feature of the systems and methods herein is their general lack of reliance on dwell times (except for the case of performing repeat structures, as described previously) or prolonged eye blinks to discern intent. Many commercial eye-tracking systems require a user to focus on a virtual object (i.e., dwell) for some period of time or to blink as a part of a selection process to indicate intent. Dwell requires perception (requiring about 0.25 seconds) and focal maintenance. Often, the indication that a dwell has taken place involves magnifying the region being viewed. This induces further mental image processing during perception by the visual cortex. Blinks take even longer periods of time, requiring a complex series of muscle contractions. The minimum time for a blink is about 0.3 to 0.4 seconds.

When the components of an eye signal are concatenated to produce an actionable choice, delays accumulate and can become significant. Jerky movements of the eye (and jerky displays) feel unnatural, causing discomfort and uneasiness. Long-term use becomes strenuous and induces fatigue.

Algorithmic Filters to Discern Stereotypic Eye Movement Patterns During Reading

As a further embodiment to discern the intent of a device wearer, more complex patterns of movement of the eyes may be analyzed in the context of observing virtual or real world objects. Knowledge of the sequence and/or identity of observed objects coupled with eye movements can be used to identify stereotypic eye actions being performed by a device wearer. Actions, in addition to the sequence and identity of viewed objects, may be included as components of discriminating user intent. Discerning such actions and intents can be performed in discrete (i.e., over one time-period) or continuous modes.

An example of stereotypic eye actions that can be identified by eye movements is the reading of text. When a body of text is displayed, sequences of saccadic movements and brief fixations by the device wearer can be used to discern the fact that the process of reading is being performed. On average during a typical reading process involving the English language, a saccadic movement takes 20-40 milliseconds to span 7-9 (range 1-20) characters. Fixation lasts 200-250 milliseconds, allowing for approximately four reading saccades per second. Approximately 10-15% of the time (depending on the difficulty of the material), the eyes of a reader regress (i.e., move back to previously read material).

Algorithmic filters can be used to automatically identify series of repeated sequences of saccade followed by fixation.

The locations of script and directions in which reading is performed can further be used to identify the fact that the reading process is taking place. The identification of a reading process provides context for a user interface. Components of a user interface can subsequently be altered based on the fact that reading is being performed. For example, during reading, page turn or scrolling can be made to occur automatically upon reaching a display border (i.e., without a specific page-turn or scroll command sequence).

Further, saccadic signatures, observed and generalized for a body of readers, or codified as being specific to an individual reader, could augment a learning profile for a student, automatically noting such cognitive instances as difficulty in comprehension (related to rates and variances in reading speed, re-tracing, pausing, eyes-off-page including to generate notes, where such eye-tracking related observation and generation of notes could be used, cross referencing other related content, loss of interest, keen interest, Vigotsky's zone of proximal learning, and/or intentional eye-movements (rolling of eyes in frustration). Gaze information could be coupled with other sensed data such as head movements (shaking head left-right or up-down), and/or observed use of a writing tool to underline, highlight, or expanding a device wearer's region-of-interest.

By recognizing stereotypic eye movements during the reading process, rates of reading, any text that might have been skipped and/or conversely, text that attracted prolonged attention can also be identified. The number of regressions, sub-vocalizations (using additional sensors), saccade distances, and fixation times can be used as indicators of both interest in and complexity of materials. These can be used as components to identify and characterize interests (or disinterests) of the device user. Such characterizations can be used, for example, to tune search engine results, determine a level of understanding of instruction sets, control the rate of content display, index the user's reading abilities such as "retracing," fluency, and so on.

The content of what is being read can be used to further hone a user interface. For example, it would not be necessary to provide menu selections to follow embedded hyperlinks if no hyperlinks are present within displayed text. Similarly, tools to zoom in on an image would not be necessary if no image is present within a body of text. Context-sensitive exclusion of unnecessary user interface tools helps to avoid inadvertent activations and can simplify menu selections.

On the other hand, if, for example, a series of instructions were being read, then it would be helpful to the reader to make available user interface tools that are associated with those instructions as they are being read. In many cases, it would be appropriate to make the targets for these tools "invisibly visible" (i.e., introduced within the display in a manner that does not attract attention) as described elsewhere. As long as the device wearer continues to read instructions, the form and/or resultant actions of such targets can be modified based on what is being read.

Skim reading can also be recognized as having distinctive eye movements. Fewer regressions and more rapid vertical movements of the eye (e.g., while scanning English script) distinguish the skim reading process. The recognition of a skim reading process can be used to control the rate of presentation (e.g., scroll or page-turn rate), Lexile level, and/or cognitive density of displayed information.

The general directions and timing of the saccade-fixation sequences during reading are strongly dependent on the form and structure of the script being read. For example, English, French, German, and Italian script is generally read from left-to-right where, upon reaching the end of a line, a new line continues below starting at the far left. Sentences and lines of text are further organized into paragraphs that can include intentional gaps in text at the beginning and/or end of each paragraph.

In contrast, Arabic and Hebrew script is written right-to-left. Variants of Chinese, Japanese, and Korean script can be written either horizontally or vertically. During Japanese text reading, the size and timing of saccadic movements vary based on whether Japanese text is written as phonograms (i.e., hiragana or katakana) or ideograms (i.e., kanji). Thus, algorithmic filters to detect text-reading must be tuned to the sequential directions and precise timing of saccadic movements and fixations present when reading different scripts.

If the content of displayed text is not within the control of the device, gaze tracking can also be used to identify specific regions of focus by the device user. Such regions can be on signage, billboards, televisions, remote display monitors, and the like. Regions under observation can also, in real time if desired, be "read" by the device using optical character recognition (OCR) techniques well-known in the art. Such text content can be transferred to other forms such as speech and/or archived for retrieval at another time. Gaze patterns by the device wearer can be used to identify the specific script and objects observed, the sequence of observations, and a measure of the degree of attention given to identified script and objects.

Filters to Recognize Stereotypic Eye Movement Patterns while Examining Objects

Along similar lines as other exemplary embodiments, algorithmic filters can be developed to detect the examination of images such as photographs or works of art. Models to predict scan-paths when viewing images have been developed. There remains significant debate in the literature involving these models over, for example, whether saliency is correlated with durations of fixation. However, by correlating actual eye movements with those predicted by these mathematical models, algorithms can be developed to identify if the intent of a device wearer is close examination of particular objects within an image.

Computer vision with machine learning now enables the automated interpretation of images to identify objects within the images. Large computer databases are currently being constructed to allow all objects to be visually identified automatically, as known objects or object classes.

One embodiment comprises an object-gaze database of objects tagged, indexed, or otherwise associated with individual, iris-authenticated gaze data, or aggregated gaze data traversable, accessible, and controllable by an identified user via an eye-driven interaction model with a graphically supported eye signal language synergistic with the object-gaze database. Processes for identification of a device user are described in Systems and Methods for Discerning Eye Signals and Continuous Biometric Identification, application Ser. No. 14/708,241, filed May 9, 2015, the entire disclosure of which is expressly incorporated by reference herein.

Such a system offers high value in many contexts. This system affords the opportunity to associate or infer human thought and behavior with gaze patterns associated with objects to enable a new generation of human-machine interfaces.

An extension of discernable eye movement behavior to identify user examination of objects within a static image is the tracking of moving objects within the real world or within video images. In this case, knowledge of the locations of particular objects as a function of time can provide additional assurance that an object is being actively viewed by the user.

Object-gaze data may be captured for an individual with gaze data logged for specific objects viewed by the person, or for classes of related objects. Object-gaze data may also be aggregated for users observing the same object, instances of like objects, and/or classes of objects.

Such object-gaze data may be used within a gaze-based user interface enabled by an interaction model used with augmented reality or virtual reality. Such a user interface may also be multimodal incorporating head movement, hand movement, voice, and other physical or measurable brain-generated signals.

Such an interaction model, transforming a user's intent into action through eye movements, can be enabled or enhanced through the signature of gaze patterns stored in the object-gaze database. These object-gaze signatures can be captured and analyzed for specific objects observed by the user. The object-gaze signatures can be classified by first observations of specific objects, subsequent observations, and/or context data. Object-gaze data may also be captured and used for similar objects or classes of objects. The term object refers to any identifiable image—person, place, thing, or any identifiable set of reflected light rays.

The object-gaze signature data inform the dialogue that occurs between the system providing visual stimulus overlaid on the user's view of his/her physical environment as "augmented reality" imagery in the areas of entertainment, gaming, information, control, behavioral change, psychological or physiological treatment, learning, increased creativity, improved sports performance, combat, communication, and more.

In presenting graphical information in an augmented reality display, an interaction model can determine what visual augmentation to present, when to present it, and where to present it within the user's field of view. Knowledge of former object-gaze signatures for a user or users for an object or objects, allows an augmentation engine to place graphics to achieve a desirable gaze pattern or to avoid an undesirable gaze pattern as a component of the eye-signal language within the interaction model.

In an augmented reality or virtual reality eye-driven interaction model, there are conscious, explicit, fixation, and pursuit actions that a user may exercise to achieve specific outcomes. For instance, a user may look at an object then look at an activation element to activate the object, or a user may follow a moving object, moving in a prescribed pattern, to initiate an action. The system places graphics within the field of view of the user to determine the intent of the user based upon predictable gaze patterns. In this embodiment, knowledge of expected object-gaze signatures are used to place static and dynamic activation graphics at locations that are distinguishable by fixations and pursuits, and distinct from a user's natural gaze pattern of fixations and pursuits for the set of objects.

Generation and Recognition of Other Stereotypic Eye Movement Patterns

In sports, object-gaze signatures of expert athletes accompany critical moments of physical activity. For instance, in tennis prior and during a serve, in basketball prior and during shooting, in football prior and during a pass, in golf prior and during a swing, and in other sports, these object-gaze signatures have been observed to show common elements across experts. In an augmented reality ("AR") environment, graphics may be placed at appropriate locations relative to key target objects—a tennis ball, basketball hoop, receiver, golf ball and more to direct a user's gaze to mimic an expert's gaze. Conversely, graphics may be shown to direct a user's gaze away from other locations. Monitoring the object-gaze signature of a user over time may allow the system to analyze and evolve a graphical interaction. Proper stimuli can accelerate the development of a novice's skills in a variety of activities.

In a gaming environment, the game may be designed to hide "invisibly visible" graphic elements in locations within objects in locations not typically viewed, frequently viewed, or viewed in predictable sequences. The introduction of other objects may be designed specifically to attract attention. Actions may be taken by the interaction model and game when such graphics are viewed, not viewed, or viewed in sequence. Points may be awarded or game play altered based upon defined gaze activity.

Addressing the needs of individuals with limited or no mobility, and/or ophthalmological or neurological disorders, including those who are "locked-in," presents special sets of needs and pattern analyses. The eye signal language and principles can be adapted to meet these special cases. For example, reliance on vestibulo-ocular reflexes can be eliminated. Other forms of neurological disorders can result in a reduced synchronization between movements in left and right eyes. In these cases, vergence can be eliminated as a communication component. A number of neurological disorders result in superimposed tremors or oscillations in movements. These movements can be digitally filtered. There is a tendency in some high-level spinal transection individuals including those who may be locked-in to have an increased dependency on vertical eye movements. The self-adapting nature of the eye signal approach can be used to accommodate such individuals.

Other circumstances can also be accommodated within the eye signal language approach. For example, simplified, non-text menus can be presented to the very young. The timing of eye signal steps, especially involving perception (particularly including responses to changes in brightness or depth) can be adapted for the elderly. The use of color to distinguish selections can be avoided or eliminated to accommodate those who may be color-blind.

Cognitive Load Management

Context-sensitive gaze pattern identification captured in an object-gaze database may be used to inform the device management of cognitive load. Tuning the presentation of information in an AR display or within a virtual reality ("VR") environment is a key component of cognitive load management. For instance, at times, it may be desirable to display information, or options to access information directly on physical or virtual objects. At other times, to manage cognitive load, it may be desirable to provide explicit access to hidden menus, or other affordances that may be revealed to a user following a prescribed set of actions (eye signals, hand gestures, head movements, intentional or implicit brainwave activity), or via a dialogue with the system involving an interchange of system/user stimuli responses.

For instance, consider an individual performing an emergency rescue function. The intent of this individual is extremely focused on gathering information to determine a plan of action followed by instituting the plan of action. The gathering phase might include accessing and referring to specific, contextually relevant procedures, and consequently focusing on such visually presented information.

The system might determine, for an individual trapped in an inverted automobile in flames, allowing a user only minutes to extract a victim, specific information about the situation (e.g., location of the gas tank, flame temperature) might appear in text as a popup on an area of the screen. If the rescuer's eyes evidence a pattern suggesting unfamiliarity to the situation, the presentation of information might eliminate distractions by blocking some imagery, or by highlighting only key areas. If the rescuer appears to be experienced with the scenario, the presentation of information might be more dense and rapid, supporting more rapid action based upon knowledge and experience by the rescuer.

Such instances of expert/novice contextual information and action exchange extend to a broad range of circumstances and roles ranging from first-responders—police, firemen, paramedics, EMTs (i.e., emergency medical technicians), to members of the intelligence community, to military, and a broad range of professionals—surgeons, athletes (as noted), performers, and more.

When presenting information in an AR scenario, the information may take a range of graphical forms. Information may be overlaid text, symbols, objects, or may be in the form of alterations in the display of physical objects such as glow, aura, change of color or texture, change of size, replacement of one object with another object, or movement or dynamic changes or transitions of any of the above or combination thereof.

Such information is provided with a purpose to support any of the aforementioned activities, or simply to inform a device user. The presentation of such information may be coordinated with expected object-gaze signatures to enhance its intended use.

Selection of the affordances supporting interaction with visually presented information is critical to guiding and/or achieving proper user intent. For instance, it might be best to use saccadically discernible affordances in some circumstances, gap-effect affordances in others, or pursuit-tracking affordances in others. iUi user interface eye signal placement on and/or near objects appropriate to actions may be important in some applications. For instance, an eye signal with appropriate affordances could be automatically produced that motivates a derived sequence of saccades with dynamic affordances placed on or adjacent to an object, S[diaa] (Signal with dynamic inadvertent activation avoidance) for which data in the object-gaze database indicates typical observation by a distinguishable pattern of saccades, or a specific sequence of saccades that will not be replicated by a user's natural saccadic signature. As such, the S[diaa] can be created and placed dynamically by the system.

More complex signatures of object-gaze coupled with other sensory data can be used to derive an extraordinary range of dialogue between the system and user to achieve intent, manage cognitive load, achieve emotionally satisfying experiences, improve human machine efficiency, merge a human mind with an AI entity, and more. Other categories in which enhanced intelligent, dynamic dialogue may occur include entertainment, gaming, information, behavioral changes, psychological or physiological treatments, learning, increased creativity, improved sports performance, combat, improved communication, and more.

Discerning a User's State of Mind

In further embodiments, different emotions can be discerned based on eye movements and changes in the geometry of different components of the eye. For example, factors such as cognitive load and fear can cause easily detectable dilation of the pupils. When combined with knowledge of the objects being viewed by a device wearer, it is possible to further discern intent. For example, if viewing a spider or a picture of a spider causes pupil dilation, then it can be concluded that the device wearer may fear spiders (i.e., be arachnophobic). Individuals generally can have a number of different phobias. By considering various phobias by a device wearer, it is possible for example to customize content (e.g., particularly by advertisers) to avoid inducing fearful responses.

Similarly, if pupil dilation results from the presentation and viewing of objects such as a mathematical equation or a pet animal, then it can be discerned that there is interest in the mathematics associated with the equation or associations with the viewed animal. In this case, a saliency factor can be assigned to the equation or animal. Such factors can, for example, be used to enhance searches by retrieving particular equations or animals, or closely related items.

It is also well-known that pupil dilation can arise from viewing objects that generate fear. Thus, other factors such as heart rate or specific patterns of eye movements (e.g., anti-saccadic movements, described below) can be included to resolve such ambiguities. Multi-factorial approaches to classify the overall state(s) and condition(s) of the device user are described in greater detail below.

Conversely and as further exemplary embodiments, anti-saccadic eye movements can be detected as movement associated with averting the device wearer's eyes away from a particular object or class of objects. From such anti-saccadic eye movements and the identification of real or virtual objects that are the subjects of anti-saccadic movements, a device can "learn" particular objects and/or classes of objects that are avoided by a device wearer. Similar to phobias, the display of objects associated with anti-saccades by a particular device wearer can, if desired, be avoided.

Other interpretations drawn from object-gaze measurements to understand a user's state of mind and support iUi GUI behavior involve distinguishing "purposeful" from "day-dreaming" gaze movements and other logged sensory or contextual data.

In advertising, for instance, gaze and viewed object data might be collected for an individual gazing at a billboard that advertises milk while the individual is driving to work in the morning. The gaze data might be further time-stamped, location stamped, context stamped with the user's activities (discussion in car, work or recreational driving, whether he/she has eaten breakfast, and whether he/she ate cereal with milk), as well as other sensory data. The gaze-object database could be built of all objects observed, with similar detailed gaze, context, sensory and more, data for a given individual over an extended period of time. The use of such logged gaze data could contribute to subsequent presentation of information related to milk, or to a specific brand, in which a user might be engaged, to motivate action such as a purchase.

Patterns of eye movements associated with searching a scene have a strong dependence on the complexity of the scene. The "perceptual span" (i.e., region of effective vision) is expanded during searching eye movements compared with reading or scene perception. Saccades are generally shorter and fixations are prolonged with more clutter or density in specific regions of a scene. There is also a strong tendency to look at objects that are being described verbally or being thought about. Thus, it is possible to distinguish searching eye movements (i.e., longer saccades and shorter fixations) from those associated with objects of interest (i.e., longer fixations and clustered saccades). A high correlation between the gaze direction of the user and the path of the moving object within the real world or video image is indicative of user attention toward the particular moving object.

As a further embodiment, objects and classes of objects that are either attractive or aversive to an individual can collectively be used in machine learning or artificial intelligence (AI) schemes to enhance reasoning processes. For example, knowledge of topics that are of interest or that force increased cognition can be used to structure data retrieval and search engine results to help in high-level thought. In this scenario, the focus of a device wearer can be on real-time cognitive processes without spending intellectual resources on the mechanics of searching and information display. Preferences would be known to the device based on past interactions, and/or selected and modified by the device user.

Along similar lines, the interests and aversions of an individual, including those discerned by eye movements, can be reflected in the behavior of avatars. Avatars can be constructed to reflect one or more (including all) of the identified characteristics of an individual. Such behavioral characteristics can be used in gaming, role playing, behavioral therapies, predicting responses of individuals, and the like.

As noted, a variety of sensory data may be maintained in a gaze and object database, and may also be useful in discerning user intent. For instance, camera data observing a user's face, regions of the face, areas of skin movement, interpreted through Eckman's FACS, can be used to discern user emotion. Such camera or cameras may be deployed within an HMD of any form or a wearable head mounted device without a display. Once a user's emotional state may be discerned, virtual characters or avatars for real, remote characters, or hybrid AI/human characters may respond to such emotional communication. One embodiment could be through the use of an avatar whose face and/or eyes mimic or communicate the wearer's monitored emotional state(s) and transitions.

As a further embodiment, various classification approaches can be used to discern intent from eye movements and other available inputs including, for example, time of day, head motion, and real as well as virtual items in the visual field. A major issue with such classifications of user intent is that movement associated with the eyes can have many different purposes. Not only are the eyes critical in surveying and more closely observing the environment during the performance of daily activities, but movements can also be associated with startle responses, so-called daydreaming, gestures, balance, cognitive load, and the like. Eye movements can even be associated with activities that have little to do with viewing the environment, such as rolling one's eye in response to a receipt of news.

Eye Signal Display Technologies

In different embodiments, the eye signal language and command set can be executed using a number of different display devices and/or image projection technologies both near to, and remote from, the eye. Display devices mounted on headwear can include HMDs, AR displays, VR displays, and the like. Display devices can cover a portion of the wearer's field-of-view, cover the entire field-of-view, be translucent, or be opaque. Display devices most often used in the range from 0.1 to 0.5 meters from the eye include smart phones, mini-tablets, enlarged phones, mini-laptops, wall-mounted displays (e.g., thermostat), credit card readers, and the like. Display devices used at distances from approximately 0.5 to a few meters from the user's eye include computer display monitors, tablets, laptops, convertibles, televisions, cash register displays, and the like. There can even be interactions using eye signals with large format display devices (often composed of multiple displays) such as with over-sized screens or billboards within stadiums.

The system may comprise a display device that is viewable by the user. The display device can block the vision of the user from viewing all or any portion of the device wearer's environment such as displays found in VR glasses. Alternatively, the display device can allow the device wearer to view all or a portion of the user's environment by displaying information in a translucent or semi-transparent mode within all or a portion of a screen or projected display. Such schemes commonly are used within wearable heads-up display devices and AR devices. The display device can also be located away from the device wearer, but in a location where it can be viewed. The display can include one or more display screens, one or more projection devices, signage, and the like.

Some display devices may have a limited resolution (e.g., signage) or area (e.g., smart glasses) to display information. Similar considerations come into play when a display monitor is small and/or located well away from the user/observer.

Eye Signal Screen Layout

Poor screen layout, inconsistent responses, not taking into account the physiology of eye movements, and prolonged delays can cause a user to repeatedly lose context within the eye signal language. Factors such as gaze tracking resolution, the delays and peak velocities of different eye movements, elements that "attract" the eye within different viewing regions (foveal, parafoveal, and peripheral), consistency in the form and placement of interactables, and a wide range of other factors impact the ability to effectively communicate with eye signals.

As examples, "reveals" support context maintenance when located in parafoveal regions (up to about 10° from the visual axis) versus the foveal (up to about 2°) and perifoveal fields. With a gaze accuracy of ±0.5°, or within a general limit on shaping of 6×3 (see, e.g., FIG. 6) or 5×3 (see, e.g., FIG. 7), selectable regions within a display area that covers a range of approximately 16°, reveals, for example, may be placed near objects within the parafoveal area to establish and maintain a more visual context.

An additional strategy of the present systems and methods is the strategic placement and grouping context of interactables. Within exemplary embodiments, even the time to "perceive" objects is not required by experienced users during some processes to convey intent. For example, in order to return to a home screen showing a main menu (at any time), a user may deploy a memory-guided saccade to the upper-right, special main reveal interactable (see FIGS. 6-10) and then immediately execute a memory-guided saccade to the revealed "home" reveal just below. This completes the process of returning to a home screen main menu. There is no need to actually perceive the main reveal interactable and, in fact, the interactable may disappear as soon as the initial saccade reaches its target, or even before the eye reaches the interactable, "releasing" the eye for a subsequent saccade (i.e., the so-called gap effect). As such, the main reveal interactable is located in the same place at most, if not all, times for memory-guided saccades followed by an immediate second saccade performed without perception.

In some situations within some embodiments, it may be desirable to leave an image at the location of a target for a period of time. This time can be such that: 1) there is an awareness of the target, but it is not fully perceived (i.e. generally less than approximately 200 milliseconds including "flash-like" removal after just a few milliseconds to tens of milliseconds, 2) there is a perception of a target image, but it does not persist or "hang around" any longer than needed for perception, 3) there is clear perception of the target until the eye begins to move away from the location, or 4) the target persists until an action or some other operation is performed.

In contrast, interactables that are the target of smooth pursuit eye movements must first be perceived before a motion can be initiated and subsequently maintained at velocities well below maximum values (30° per second) for physiological smooth pursuit. Pursuit objects that initially appear within a region of perception can avoid intervening saccadic movement(s) when placed sufficiently close to (e.g., well within the foveal view region of 1° to 3°) or even within the structure of a target interactable (see FIG. 13). A saccade (taking up unnecessary time) may be forced to take place if, for instance, a pursuit object has moved some distance (e.g., outside the foveal view region of 1° to 3°) away from the selected interactable prior to perception. Thus, the timing of initial display(s), any delays before movement begins, and the rate(s) of movement are all critical for eye signal control using smooth pursuit mechanisms. Timing must take into account the physiology of anticipated eye movements and optimally include self-adaptive components the can be tuned to each device user including as experience is gained.

The pursuit process can also be modified to include the pursuit of objects that might move in a non-linear manner, e.g., with waypoint stops and forks (i.e., two-way splits) to further enable choices and general shape creation.

An additional strategy and embodiment of the present systems and methods involves the display of a "familiar" thumbnail as feedback to a user that the terminal location of an eye movement sequence has been reached and an action initiated. Within the field of psychology, it is generally accepted that there are two modes for the recognition of visual objects. 1) Recollection (also known as "remembering") of an object involves recalling the details from memory of a previous experience. 2) On the other hand, familiarity (also known as "knowing") generates a feeling that the object has been previously experienced without performing a (relatively slow) long-term memory search that results in recall. Avoiding the need to recall from long-term memory a recently viewed object or display region reduces cognitive load and can speed the conveying of intent with eye interactions.

Using these principles, a "familiar" acknowledgement to register a step within the eye signal language is to display a thumbnail of a scene just viewed. For example, the region of a saccadic launch site (e.g., an interactable, cut-out segment of an image, small block of text) can be duplicated at the saccadic landing site to acknowledge that an action (or component of a selection) is being performed. This transfer of a familiar image also has the psychological effect of visually "linking" selections with actions, making the eye-signal language more intuitive.

Another strategy of the present systems and methods is to take into account the distinct properties of human perception of objects in the parafoveal and peripheral visual fields. Sudden changes within objects (e.g., emergence, size, luminance, motion including vibrations) attract attention and provide visual references (even if never actually viewed to the point of perception) for eye movements. For example, the rapid appearance of distant (i.e., not necessarily within the foveal view) select interactables during the reveal process provides targetable locations for saccadic trajectories.

Taking this concept further, the rapid appearance (and/or change in color, transparency, size, or motion) of both select and pursuit interactables can be targets that appear in the parafoveal or peripheral visual fields. Parafoveal and/or peripheral interactables can be a part of general menu selections processes (not just reveals). In order to take full advantage of peripheral vision, it is advantageous to begin selection sequences from the central regions of the screen, leaving room for peripheral objects. In the case of pursuit interactables, pursuit object graphical elements (i.e., components) can already be moving (attracting attention) at appropriate times and velocities even prior to being perceived as a target. This is particularly effective when memory-guided eye movements are performed to execute eye-signal language elements.

Additional features of screen layout and sequences for selection/activation may be designed to avoid inadvertent activations. For example, activation interactables may be generally located near screen boundaries, where inadvertent glances can be avoided. If an inadvertent activation does occur, readily available sequences are available to "back out." Specific, voluntary physiological eye movements are required to indicate activation. Objects that can be selected for activation are displayed in a context-sensitive mode and available/displayed only on an "as needed" basis.

In some situations, it is useful to provide a grid, array of dots, periodic waveform, or other form of superimposed reference points that can serve as a graphical aid for more freeform modes of input for drawing, selecting, encompassing, etc. The ability to input arbitrary shapes is facilitated by such visual frameworks using concatenated eye saccades within this framework.

The pursuit process can also be applied to real objects that are stationary or moving in the environment. Object recognition software can be employed to discern the identity, size, and shape of a user-selected object. If the object is moving, then the size and shape of the object can be established independently by comparing successive video frames to determine which regions move relative to the background.

In addition, in binocular eye-signal systems, vergence measurements can be used to estimate the actual distance to a selected object. This can be used, for example, to compute the actual size of an object (i.e., not just the size within an image or a relative size compared with other objects). These data can be useful, for example, when displaying information (e.g., including web searches) about objects that are physically closest to a user or the identity of a (large versus small) object such as a species of bird that must be based on measured size.

The overall use of interactables and/or (brief) keywords is another strategy to counteract limitations on gaze accuracy and travel during eye signals. Interactables are sized to coincide with horizontal and vertical resolutions for reliable eye-based selections. The number of interactables (more precisely, the space occupied by interactables) can be greater in the horizontal axis since eyes can travel further in this direction compared with vertical eye movements. The use of approximately half-width, eye-gaze selectable regions within the sidebars further extends the notion of compactness and greater horizontal travel. Eyes can saccade to objects positioned near the screen edge and move about including beyond the display area of the screen. Gaze tracking inaccuracies can also be allowed to "spill over" into these areas beyond screen edges without significantly affecting the interactable selection process. Using real-estate at the edge and beyond a screen pushes limits on spatial accuracy.

One can also employ language components that include targetable interactables coupled with looking generally off screen. The language can also include off-screen known targets such as signs, symbols, icons, borders of headsets, or other objects. There is also the opportunity to add permanent or dynamic target illumination off screen that can, for example, illuminate or increase the illumination on one or more selected objects.

In further embodiments, the iUi GUI considers the functions and assigned meanings to target objects or locations identified by saccadic, smooth pursuit, and vergence filters. Based on typical eye-movement sequences, interactables can be strategically placed to minimize eye movement (i.e., minimizing fatigue), maximize performance (i.e., selection and activation timing), minimize inadvertent activation, and/or hasten the learning curve for device use.

Figure 6:
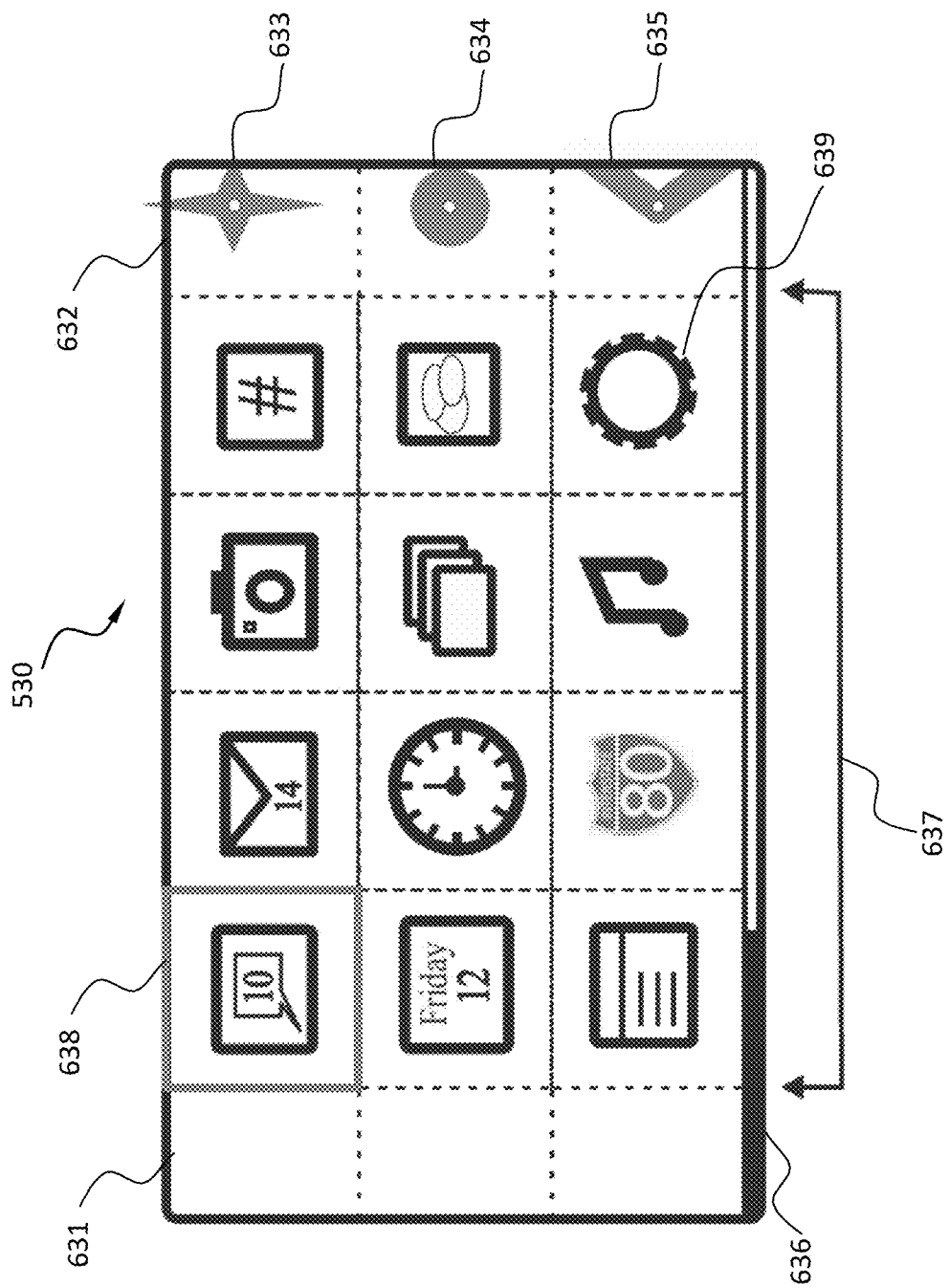
FIG. 6 shows an eye-signal main (i.e., top-level) menu.
Figure 7:
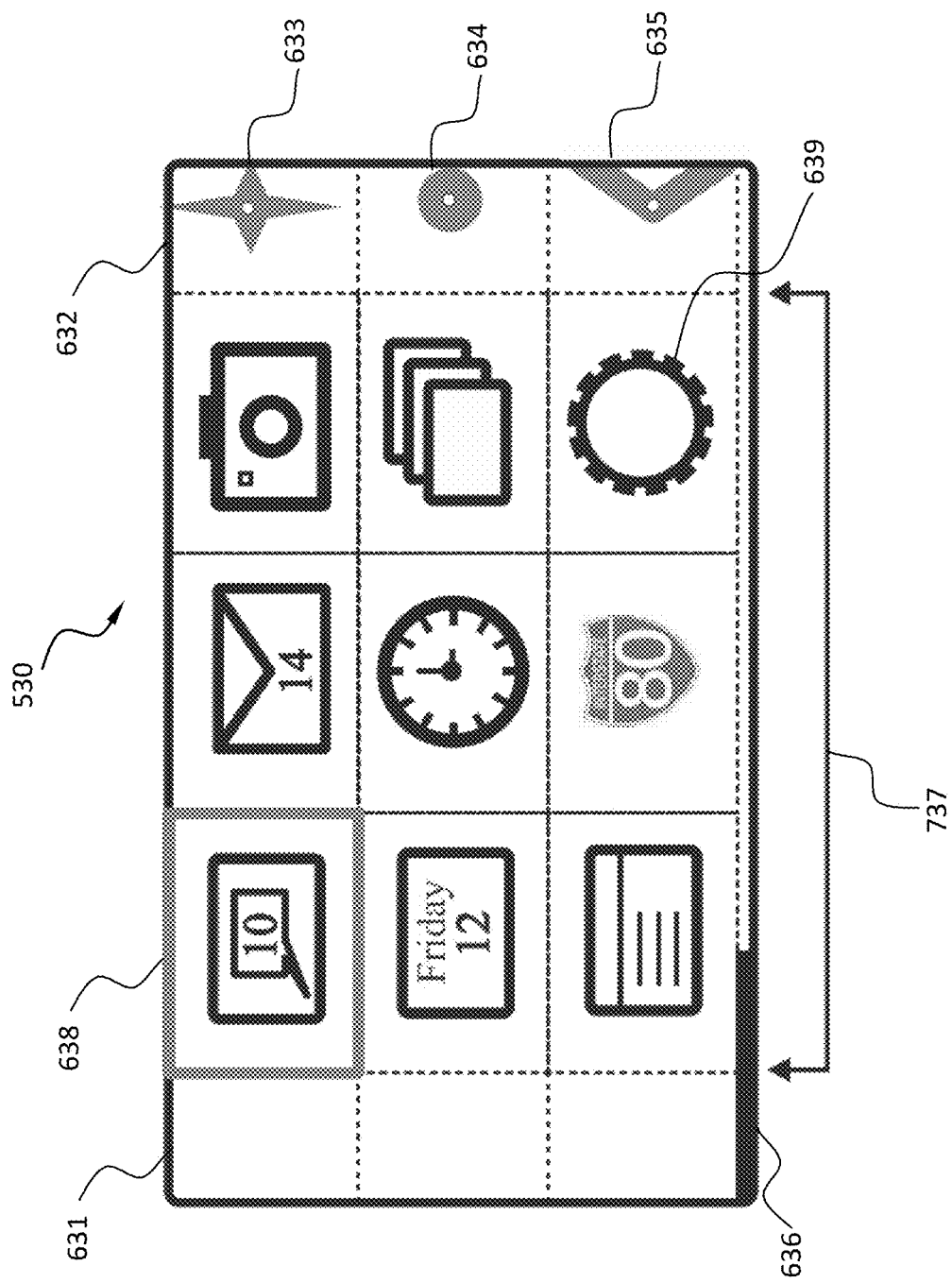
FIG. 7 shows an alternate version of an eye-signal main menu that requires lower resolution gaze tracking.

For example, in the menu selection scheme illustrated in FIGS. 6 and 7, the main reveal interactable is always positioned in the upper right corner, regardless of the number and type of menu items available. The "go" (i.e., activate) interactable, in one embodiment, may appear as a green (e.g., traffic) "go" signal where its vertical location in the middle of the sidebar is designed to minimize the average or aggregate "look" movement distances from the eye-selectable regions in the central region of the screen.

Consistency and compactness of overall display layouts are additional factors that affect performance and ease of use. The central viewing area (as illustrated in FIGS. 6-7) is generally used as a workspace (similar to a "desktop") where objects can be viewed and/or selected. Interactables in the left and right sidebars are generally target locations for saccades launched from the central desktop. Although not every configuration strictly conforms to this overall scheme, consistency greatly enhances the learning curve as new applications are introduced and promotes faster, memory-guided use. Consistency in screen layout is an important component of philosophies, guidelines, and standards that can be used to promote ease-of-use.

In further embodiments, there can be dynamic scaling and/or shaping of interactables within a display, based upon size and shape of the user's field-of-view (FOV, in angular degrees) toward the display, taking into account both screen resolution and gaze tracking accuracy. Target objects, selectable "tools," text, and other forms of presentation may also be dynamically scaled and/or shaped. The function of the dynamic display scaling (i.e., when designing screens and screen behaviors) is to produce a piece of art (i.e., interactable or other object) that is maintained within a "shaped" area, such that the size is not too small to force a user to gaze into a largely homogeneous background area within a gaze "selection box," and not so large as to motivate a user's gaze to land near the outer edge of the shaped area, and consequently to compete with the brain's visual accommodation that occurs naturally. If a user looks at an interactable that extends to the full extent of a selection box area, a small inaccuracy in the gaze-measuring system or drift (tremor or other movement) in the user's view may cause an adjacent box to be inadvertently selected.

In additional embodiments, when interactables (or other targets) are dynamically built and/or placed in any form of display (e.g., remote, VR, AR), the size and location of the items should also be considered relative to the user's foveal area. It may be desirable to place a target near a user's gaze location or next to an object at which the user is gazing, to allow the user to immediately view and/or interact with the new target. In this case, if, for instance, the target were tiny and distant, it would not be within the "awareness" zone of the user. Rather, automatic sizing (e.g., circumference, height×width) and/or placement (e.g., center of object, or other reference point) of targets can be designed to be within a user's high-density foveal area, or even the parafoveal region. Dynamically controlled objects may allow a user to more rapidly see and/or interact with subsequent targets.

In further embodiments, the notion that an interactable can be too small (i.e., not providing sufficient detail or "appeal" to attract the eye and/or leaving large areas of background with no contrast), or too large (i.e., extending to the boundaries of an eye selection area) can also be applied to the display of detail within an interactable or other virtual object. Detail that is too small is not perceived by a device user. In fact, the visual acuity of a particular device wearer can be specifically considered when determining the design of detail elements that may make up an interactable or virtual object.

Accommodation for decreased visual acuity or visual impairment can include a reduction in detail (e.g., the display of objects composed of fewer, high-contrast edges). Such accommodations can be performed automatically by the system based on measured eye movements (or in some cases, the lack of eye movements and perception) around thin lines or detail. Alternatively or in addition, a device user can specify that objects be displayed based on a device user's preferred or apparent level of visual acuity.

At the other end of the spectrum, objects or detail within objects can be too large. If an interactable has insufficient detail, then the object may have no eye focal point in the central region of the object. If instead, the eye must survey an object by discerning the outer edges near the boundary of an eye selection area, inadvertent selections or activations of adjacent activation areas can occur more frequently. This can occur even if there is a "dead zone" (i.e., a buffer or region in which no activation occurs) between selectable areas, although dead zones are generally undesirable because they can result in times when there is no user feedback (which may be perceived as "uncomfortable"). The inclusion of central detail is illustrated in FIGS. 6 and 7 at 633, 634, 635 and in FIG. 10 at 1037, 1038, 1039.

As a specific (simple) example, the line thickness of a box (e.g., selection box 638 in FIGS. 6 and 7), circle or other shape used as feedback to indicate that a particular interactable or region has been selected can be too thin or too thick. A line that is too thin (e.g. a hairline) can be simply difficult to detect. It would be particularly damaging to the flow of the eye-signal language if searching eye movements or substantial time for eye signal integration were required in order to detect the presence of a feedback indication made up of one or more line segments that are too thin to be readily detected.

Conversely, a line (or other detail within an object) can be too thick for optimum perception. Because one of the first steps in human visual process involves the initial layers of the retina transforming images into "edges," a thick line is ultimately observed as the mental combination of an inner edge and an outer edge (i.e., perceived separately). The region of no contrast between the inner and outer edges of a thick line provides no area for the eye to "rest" (i.e., focus on).

Thus, in further embodiments, line segments and other components that make up the detail of a displayed interactable or other virtual object can have an optimum range of thicknesses for eye appeal that is sufficiently large to be perceived but sufficiently detailed to provide focal areas. Guidance for this range can come from the "center-surround" model of perception encoded within the human (and other animals) ganglionic cells within the retina. Alternatively, other graphics may be presented to identify an interactable at which a user's gaze is directed that do not substantially modify the interactable, yet provide clear indication of the location of the user's gaze. For example, rather than a box surrounding the entire interactable, only the corners or other line segments of a box may be presented to identify the selected interactable, without distracting the user.

The center-surround circuitry of ganglionic cells can produce a so-called "off" or inhibitory response to light in a central a viewing area within the retina. The surrounding region produces an "on" or excitatory response. Similar to some computer-based edge-detection algorithms, the largest neural responses by this circuit arrangement are produced at edges. The size of such receptive fields (generally considered to be Gaussian in shape) is about four micrometers on the surface of the retina. This corresponds to an edge (or movement) traversing approximately one minute of arc. For reference, this corresponds to a line 0.3 millimeters in width when viewed at one meter.

Thus in embodiments, even with optimal human visual acuity, it becomes ineffective to produce detail at resolutions less than about one minute of arc. Lines and detail in the range of a few arc minutes can generally be well-discerned. Since, in the human retina, adjacent receptive fields in the retina can overlap, the separation at which one sees separate sides of a line segment is more based on visual perception (versus the wiring of ganglionic retinal cells). Thus, separate edges to a "thick line" can begin to be perceived within the range of a few receptive fields. Both edges of a thick line or "ribbon" can be discerned at more than ten minutes of arc.

In more practical terms, one arc-minute very roughly corresponds to the width of a pixel when viewing a medium-resolution display monitor at a comfortable viewing distance. Clearly, the ability to easily discern a line is affected by a number of factors including the brightness of the display, the degree of contrast between the line (or detail) and adjacent pixels, the actual viewing distance, the portion of the pixel that actually emits light, etc. In the case of AR displays, the opacity of the display and contrast with differing "real world" backgrounds can play additive roles.

Device Calibration

High-contrast graphical elements in specific locations (i.e., known to the device) within target objects help to focus a device user's gaze to specific points within the object or interactable. These graphical elements and/or the overall known locations of interactables can be used (discretely) to perform dynamic or continuous calibration. Calibration includes knowledge of the known geometries of the camera(s), display, illumination source(s), and lens.

The known locations of objects (e.g., interactables) on the display can be used by algorithms following so-called "remount" (i.e., a user removing and subsequently replacing a device), a unit shifting on the head, or when the eyes are viewed remotely from different locations. Such tracking can assist in determining whether a device has shifted and/or provide information to calibration algorithms for corrections following unit movement.

Calibration procedures are required primarily to account for variations in the anatomy (and to a lesser degree, the neurophysiology) of individuals and how wearable devices rest, particularly on the nose. An anatomical-based calibration can be used to determine factors related to the eye structures (e.g., eyeball radius, corneal curvature, offset between visual and optical axes) that are used to translate the location of eye structures (e.g., pupil, limbus) and glints within camera images into gaze directions.

A complete calibration process can involve a sequence of deliberate viewing by the device wearer of three or more known locations for brief periods of time. Given reference locations within camera images and known locations being viewed, an optimum set of calibration factors can be computed that translate camera image reference locations to the display or real world viewing locations. Interpolation techniques can then be used to translate reference locations within images that are between or around calibration locations.

During normal operations, the headwear may slip or move slightly, adding inaccuracy to calibration. As long as device movement (relative to the head) and inaccuracies associated with calibration are limited, it is possible to perform a substantially continuous calibration as the device wearer forms eye signals during normal use. Substantially continuous calibration uses the principle that the device wearer looks at sequences of interactables and other references that are at known locations in order to form eye signals. Since there is spatial tolerance in selecting reference locations during eye signal formation, eye signals can still be executed if calibration causes gaze locations to be slightly misaligned; however, calibration factors can then be re-calculated since both camera reference locations and the intended gaze location are known. This allows substantially continuous calibration during use. It also allows a much more detailed table of known calibration points to be formed compared with the points that may have been determined during the initial calibration process.

During eye tracking, it is often convenient to use a simple look-up table to map the positions of glints on the surface of the eye and/or cornea to eye gaze positions. The table is constructed using other gaze-determination techniques based on measured positions of the eye and/or limbus and known viewing directions. Use of the table can conserve power, reduce requirements for illumination, and/or facilitate gaze tracking when "trackable" structures within the eye are obscured by, for example, eye lids or lashes.

Several steps can be taken to increase the tracking accuracy of the look-up table:

1. Interpolation between points within the look-up table (when glint positions are not exactly on previously determined positions) can be based on the actual geometry of the eye, camera(s), and light source(s). Knowledge of the "shape" of the mapping function based on this geometry provides a superior interpolation compared with, for example, simple linear interpolation (that has no basis in the physical setup).
2. The table can be made less sensitive to movement of the headwear (so-called re-mount insensitive) by developing measurements (i.e., offsets) that represent the position of the camera relative to the eye and applying corrected measurements to the table. This two-step process allows a single table to represent the mapping function independent of camera position.
3. Using multiple glints, a "voting" procedure can be used to determine the most likely gaze position based on the measurements from multiple glints.
4. Historical data (particularly at high frame rates) can be used to eliminate "outlier" eye movements that would be beyond the physiological range of velocities for human eye movements.
5. The table can be gradually updated (or completely revamped if, for example, a new user wears the device) when differences are detected between measured eye gaze directions (i.e., using other techniques) and directions predicted by the mapping function.

Heuristic and Data Fusion Methods

Challenges associated with imaging an eye and reliably identifying features of interest include the need to operate across wide user demographics and unpredictable environmental conditions. Many of the challenges that precipitate from these difficult conditions include the fact that different methods of algorithmically detecting and tracking eye features perform better for certain users or for certain environmental conditions, while other methods perform better for other users or environmental conditions.

For instance, eye tracking software, firmware, and hardware can be painstakingly tuned to perform extraordinarily well in office environments with consistent visible lighting and low ambient infrared light levels. However, that same eye tracking approach thrust into an outdoor environment with high ambient infrared levels and bright illumination sources, can fail immediately. Conversely, software, firmware, and hardware that are tuned for good performance in outdoor situations may fail immediately in darker, indoor environments.

A primary reason for these tracking approaches succeeding or failing in particular environments or across particular user populations lies in the eye features that are being detected and tracked. As an example, a pupil may be easily visible outdoors when the eye is flooded with ambient infrared radiation, but may not be visible indoors with lower ambient infrared radiation. However, in the outdoor case, the sun may generate a bright and unwanted reflection on the eye, whereas in the indoor case, the only reflections on the eye may be those that the system generates from its own illumination sources.

Thus, in the outdoor case, software, firmware, and hardware that can reject unwanted reflections but rely upon the presence of a detectable pupil may perform well, while in the indoor case, software, firmware, and hardware that do not rely upon the presence of a detectable pupil and can accommodate lower exposure levels may perform well.

In order to make an eye tracking device acceptable for mass-market consumption, the device must function predictably in all situations to which it is exposed. As it is possible to equip a device with software and firmware that can determine characteristics of the operating environment in which it is placed, the device can reconcile which processes are employed to determine the direction of a user's gaze as the end result of the top-level algorithm. This reconciliation may happen in a number of ways, including the following exemplary instances.

For purposes of this disclosure, a top-level algorithm can be defined as a collection of individual processes, where, in this case, the top-level algorithm serves to determine the direction of a user's gaze. Each individual process may belong to one of several techniques involved with the goal of determining the direction of a user's gaze, such as eye feature detection, compensation for movement of the device relative to a user's eye, and/or the determination of appropriate settings for hardware components utilized by the eye tracking system.

In one exemplary instance, the system may recognize that a user's eyelashes are repeatedly occluding a large enough section of the pupil such that the pupil detection algorithm cannot reliably track the pupil. As a result, the process responsible for detecting and manipulating pupil-based data may produce outputs that correspond to an incorrect pupil size, pupil center or pupil normal vector, all of which may contribute to an incorrect determination of a user's gaze direction in the top-level algorithm. In this instance, the reconciliation method may instruct the algorithm to discard pupil data and instead rely upon glint data or iris data in the final gaze determination steps. This method is exemplary of algorithmic arbitration, or discarding one or more contributing processes that have performance-degrading input data associated with them and retaining the contributing process that will have the most suitable input data associated with it.

In another exemplary instance, the system may recognize that all the constituent processes are being supplied with data capable of producing desirable top-level algorithm output. Thus, a pupil may be visible and generating a stable edge, the correct number of well-spaced corneal glints may be produced by the system's illumination circuit, a limbus may be detected and its diameter within range of a population average, and an iris may be visible with enough information that its pose can be determined. In this case, each constituent process is capable of contributing enough information to the top-level algorithm to determine a user gaze direction without contribution from any other processes. Further, each constituent process has its accuracy estimated by considering characteristics of its input data, a calculation presented as an "error metric."

This error metric can be assigned to every process based upon the type of eye features it detects and the characteristics of those features that result in particular eye tracking performance. For instance, the separation in pixels between glints on the cornea, the stability of the centroid of each corneal glint, and the stability of the size and shape of the pupil edge can be used to calculate the theoretical accuracy of the pupil-glint constituent process. Other examples of error metrics include the number of detected points on the limbus, the distribution of detected points between the "near" side and the "far" side of the limbus (with respect to the eye tracking camera position), and the number of points detected on the pupil.

With well-defined error metrics in place for each constituent process, performing error estimations for each process results in a quantitative comparison across processes that assigns an importance to each process with regard to its contribution to a final gaze determination. Calculating an error score for each constituent process and then calculating a weighted average for the set of constituent processes results in a gaze determination calculation that accepts input from all available processes for input to the algorithm. This method is exemplary of algorithmic fusion.

Another technique that may be employed in the method of reconciling processes in the gaze-determination algorithm is the application of a Markov Random Field. In this implementation, dependencies between various operating conditions and eye features can be established. After these dependencies are established, output that corresponds to selection of contributing processes to the top-level gaze-determination algorithm is produced.

A demonstrable advantage of this method is its ability to improve eye tracking performance in conditions and settings that exhibit difficult environmental conditions. For instance, a gaze-determination process that relies entirely upon the presence of a particular number of corneal glints is compromised if environmental reflections on the cornea become indistinguishable from desirable glints. Thus, combining this process with other processes and applying a lower weighting to the glint-reliant gaze-determination process, which in turn reduces its contribution to the top-level gaze-determination algorithm, ensures that a user's gaze is more accurately and stably calculated. Conversely, if environmental conditions result in a case where a pupil cannot be reliably tracked due to a user's eye being too dark, the gaze-determination processes that rely more heavily upon corneal glint detection contribute to an improved output from the top-level algorithm.

Consequently, every eye feature that is detectable and is thus a candidate for inclusion in a gaze-determination process is also subject to environmental conditions. As those environmental conditions change and make particular eye features more difficult to track, reducing or eliminating the contribution of those features to the top-level gaze-determination algorithm results in more precise and more accurate outputs.

In addition to compensating for unpredictable environmental factors, the reconciliation of gaze-determining processes can be utilized help manage battery power in a wearable device. In a device that contains a head-mounted display and an eye-tracking subsystem, improperly-managed power is an issue that can drain a device of its battery capacity in an unfavorably short amount of time. Thus, careful schemas can be employed to prolong the battery life of these devices. These schemas may be further improved by employing reconciliation methods that take into account desired system operation.

It can be demonstrated that different methods for determining a user's gaze direction can be correlated with different levels of computational load. These loads can, in turn, be correlated to different impacts on the device's battery charge. These differences can be attributed to two major factors and a variety of minor factors. The main factors are: 1) the computational cost of detecting an eye feature such as a pupil, corneal glint, or limbus, and 2) the computational cost of calculating a gaze direction with this eye feature as input.

For purposes of administering reconciliation methods based upon computation cycles and consequently power consumption, one technique that can be applied is to maintain cost tables for each gaze-determination process. A cost table contains a variety of characteristic information about each constituent process. In this exemplary table, the following information is presented: two constituent processes, three gaze regions for each constituent process, the computational load on the device's processor to run the constituent process, the power required to properly illuminate the eye for the constituent process, a variety of metrics for points along eye features and corneal glints, the process' ability to detect and/or be robust to movement of the device on a user's head, and the theoretical maximum accuracy for that constituent process under the corresponding conditions. In addition, a metric is calculated for each constituent process and set of conditions that combines the theoretical maximum accuracy, illumination power, and computational load in a manner that quantitatively indicates how each approach will tax the device's capabilities.

TABLE 2

| | Exemplary Power Consumption and Metrics Break-downs | | | | | | | | |
|---|---|---|---|---|---|---|---|---|---|
| Units | Binary | Binary | MIPS | mWatts | Points | Unit | Glints | Pixels | Unit | Accuracy/ (W*MIPS) |
| Range low | 0 | 0 | 10 | 10 | 0 | 0 | 0 | 0 | 0 | 0 |
| Range high | 1 | 1 | 500 | 100 | 50 | 100 | 10 | 40 | 1 | 10 |

| Process | Gaze Region | Remount detect | Remount robust | MIPS | LED power | Detected points | Near/far point ratio | Detected glints | Glint spacing | Theoretical maximum accuracy | CET score |
|---|---|---|---|---|---|---|---|---|---|---|---|
| A | Display | 1 | 1 | 250 | 80 | 25 | 0.5 | 3 | 30 | 0.91 | 0.0455 |
| A | Nasal high | 1 | 1 | 250 | 80 | 15 | 10 | 2 | 25 | 0.74 | 0.037 |
| A | Nasal low | 1 | 1 | 250 | 80 | 12 | 10 | 2 | 20 | 0.68 | 0.034 |
| B | Display | 1 | 0 | 50 | 30 | 0 | 0 | 8 | 25 | 0.89 | 0.593 |
| B | Nasal high | 1 | 0 | 50 | 30 | 0 | 0 | 7 | 25 | 0.8 | 0.533 |
| B | Nasal low | 1 | 0 | 50 | 30 | 0 | 0 | 6 | 20 | 0.54 | 0.36 |

Table 2 represents a small section of a much larger table that serves as a lookup utility for the reconciliation process. The full table may include a greater plurality of constituent processes and many combinations of operating conditions from which theoretical maximum accuracies are calculated. This exemplary table is intended to demonstrate the utility of this approach when several constituent processes, gaze regions, and operating conditions may be considered during a use session. This cost table can be applied to many specific use cases for which management of battery power is a paramount consideration. Several of these cases are presented below.

In an exemplary instance, the system's battery may be nearing exhaustion, but rather than having the eye tracking subsystem totally turned off, or, conversely, contribute to an earlier exhaustion of the battery than is necessary, the reconciliation algorithm may determine that the gaze-determining method with the lowest computational cost (and hence, impact on battery power) shall supersede all other gaze-determining methods. In this instance, this may allow the device to retain an acceptable level of eye tracking functionality without exhausting its battery prematurely.

In another exemplary instance, the device's processor, combined with other sensors, may determine that the user is traveling home and will be able to charge the device in an estimated period of time from the present moment. Such determinations may be made based on historical (e.g., circadian) device usage. In this case, further eye tracking functionality may be maintained by employing more sophisticated gaze-determining processes than would be otherwise if the user was unable to charge the device within a satisfactory amount of time.

The approach to reconciling constituent processes for a gaze-determining algorithm may be modified depending upon the configuration of the device. In one exemplary instance, the device may be configured with an eye tracking subsystem capable of tracking one of a user's eyes. In this instance, gaze-determination calculations must happen without regard for where a user's other eye is looking. However, in an exemplary instance where the device is configured with an eye tracking subsystem capable of tracking both of a user's eyes, the reconciliation process may include a step that compares the locus of possible gaze directions for one of a user's eyes to the locus of possible gaze directions for the other eye of the user.

In this instance, it is important to note that the constituent processes that contribute to the gaze determination of the user's first eye need not be correlated with the constituent processes that contribute to the gaze determination of the user's second eye. In such a case, a user's first eye may have reliable input data relevant to a pupil-glint gaze determination, but the same data for the user's second eye may not be as reliable, with the consequence being a limbus-normal gaze determination for the second eye.

It should also be noted that in a binocular eye-tracking configuration, convergence between the eyes and hence depth into a scene (i.e., vergence) can be calculated. With this capability, comparing the locus of probable gaze directions from each eye may include a set of solutions where the gaze direction for each eye is in agreement with the other. The members of this set of solutions will therefore correspond to gaze directions at different depths within the scene. Further techniques may be applied at this point to determine which member of the solution set is most applicable.

In some instances, the reconciliation process may use as input data only from the current frame of video from the eye tracking subsystem. This may be referred to as a method without any memory of prior frames. However, in other instances, it may be advantageous for the reconciliation process to be provided with input data that is comprised of gaze determination data from previous video frames from the eye tracking subsystem. In these instances, knowledge of both prior gaze determination data, as well as the prior and current states of the user interface elements of the device can be used to inform the process of reconciling the constituent processes for the current frame of video from the eye tracking subsystem.

In some instances, the constituent processes that may be used to ultimately determine a user's gaze direction may be reconciled with regard to the region of a chosen field-of-view towards which a user may preliminarily be determined to be gazing. In one exemplary instance, the chosen field of view corresponds to that represented by some portion of a user's actual field-of-view. In this case, if a preliminary gaze determination results in a high probability that the user is gazing toward a region is devoid of user interface elements, any further gaze determination processes can be deprecated to low-cost methods. However, in the same case, if a preliminary gaze determination results in a high probability that the user is gazing toward a region of the field-of-view that contains user interface elements, further gaze determination processes can be elevated to provide an appropriate amount of precision, accuracy, or stability.

In another exemplary instance, the chosen field-of-view corresponds to that represented by the device's display. It should be noted that this correspondence may include a boundary region around the physical extents of the device's display. In this instance, higher priority is given if a user's gaze direction is predicted to fall within this field-of-view, regardless of where this display field of view falls within a user's actual field-of-view. However, if a user's gaze direction can be predicted to fall outside of this field-of-view, lower priority may be assigned to the desired output of the reconciliation process.

Some gaze tracking systems are designed for 'sweet' spot tracking areas that are a sub-area of a user's field-of-view. In this region, maximum accuracy and reliability is required. The resultant system design can be tuned for performance in this region, for example, placing a camera and glint-generating LEDs such that one region off-centre in the field-of-view is tracked with maximum accuracy. This may cause common glint tracking methods and pupil finding methods to fail for other gaze directions. An exemplary embodiment is the use of glint/pupil tracking in the 'sweet spot,' measuring the absolute relationship the eye to sensor and display. Then, as the eye to camera angle increases and the glints or pupil are no longer "trackable," switching to another feature-based tracking method.

Some eye tracking methods work better at some eye gaze angles. For example, pupil tracking may work well when looking directly at the camera, but fail when looking at larger angles away from the camera. The positions of features on the eye, such as the iris, sclera or even pupil viewed edge-on are tracked relative to the position of the 'last known' good location. Pupil tracking may be more accurate than, for example, limbus tracking, but when the angles are such that pupil tracking fail, or are expected to fail, limbus normal tracking (or some other method) may be superior. Key to this exemplary embodiment is the ability to combine several algorithms depending on the gaze direction, eye type, eyelid state, contact lenses etc. to improve eye gaze robustness over a variety of gaze angles.

Many eye gaze measurements rely on using LED(s) to cast a certain pattern of glints reflected from user's cornea surface in order to measure the 3D position of cornea sphere. Combined with pupil position estimation, a gaze vector can be calculated to infer the gaze. Glints and pupil position estimation depend on certain geometries that are guaranteed to be present in captured images. Therefore, to achieve robust gaze estimation, one needs to arbitrate/fuse/reconcile estimations from different measurements. One robust way to achieve this is to build a statistic model which inherently incorporates the robustness of each measurement under certain circumstance and combine the measurements into final gaze estimations.

The following are some exemplary algorithmic approaches for gaze measurement along with advantages and disadvantages of each (Table 3):
1. Pupil/Glint (PG) measurement (traditional method)
2. Pupil normal (PN) measurement that solely relies on pupil edge contour to infer the 3D orientation of a pupil surface to estimate gaze
3. Limbus normal (LN) measurement which is measured by extracting the limbus edge contour and estimating the 3D orientation of the limbus contour
4. Iris (IN) based gaze estimation which calculates the gaze by extracting the spatial texture features of iris patterns and estimate the 3D orientation of gaze

TABLE 3

Pros and Cons of Different Tracking Methods

| Method | Pros | Cons |
| --- | --- | --- |
| 1. PG | accurate under certain condition no 3D ambiguity simple and reliable | relies on visibility of glints and pupil sensitive to pupil diameter |
| 2. PN | does not rely on glints | 3D ambiguity relies on visibility of pupil possibly less accurate due to curve fitting issues |
| 3. LN | does not rely on glints or pupil | 3D ambiguity possibly less accurate due to curve fitting issues |
| 4. IN | does not rely on glints or pupil | expensive in computation |

By utilizing a calibration scheme, true gaze positions can be known. With this feedback, the accuracy of different algorithms can be estimated under different conditions such as lighting, user metrics, geometry between user and device, etc. With a large enough sample set, a prior accuracy estimate can be obtained for each algorithm candidate. Error metrics for algorithms can include:
- number of glints detected
- glint spacing
- number of points on the edge of a pupil
- number of points on the limbus (possibly splitting near and far side points)
- stability of measures over time Weighting for each algorithm can depend upon such error metrics. Some algorithms are inherently more precise than others and can be weighted as such. Algorithms can also be reconciled depending upon gaze direction (e.g., reduced accuracy can be acceptable in off-display gaze directions). Binocular convergence can be used to help determine erroneous gaze directions. There is no necessity to use the same algorithms for each eye.

Switching or weighting different algorithms can be based upon environmental conditions (e.g. lighting) or even physiological factors such as cognitive load. Error monitoring can also be used, for example, to determine if there has been device movement during calibration. Power can also be considered for accuracy and graceful degradation. This can go both ways, driven by requirements for precision or driven by power availability. Machine learning approaches can also be used to determine optimum selection or fusing of different measures.

The following are two of the more straightforward exemplary methods for data fusion.

1. Arbitration

Assume a list of algorithms named $A_i$ where i=1, 2, ..., n and prior accuracy estimations based on calibration named $P_i$ where $P_1+P_2+ \ldots +P_n=1$. The output from each algorithm is depicted as $O_i$. The final gaze estimation is chosen as $$O=O_i$$

where Pi=max $\{P_1, P_2, \ldots P_n\}$

2. Weighted Averaging

In this scheme, no output is thrown away and instead they are fused based on a weighted average based on prior accuracy estimations. The final gaze estimation is chosen as $$O=P_1*O_1+P_2*O_2+ \ldots +P_n*O_n$$

Eye Signal Language Coupled to Other User Interfaces

Eye-signal controls may also be constructed to interact (at least to degree possible) with objects deployed in the designs of screens used on existing personal computers, laptops, displays, tablets, smart phones, or other mobile devices. There has been an evolution in recent years away from, for example, text-based selections and descriptions toward icon-based selection tools. This evolution was largely driven by the introduction of mouse-based pointing devices to supplement basic keyboard entry. However, traditional hand-held mice are not amenable to a mobile environment. More recently, finger-based gesturing has revolutionized data entry, particularly within portable devices. There is now a wide base of user acceptance for icons that convey meaning and motions that convey intent.

The eye-signal language can be adapted (generally in a "subset" mode that does not fully utilized the efficiencies of screen layout as described above) to interact with objects and icons within these devices. In many cases, it may be necessary to augment (e.g., zoom in, highlight specific selection elements, etc.) the display of selections in order to conform with gaze resolution and eye-movement restrictions; however, eye-signals add an extra level of control that can be used alone or in conjunction with other input controls to govern a wide range of devices.

Hardware performance and evolution has also driven the transition toward cross-platform uniformity (from desktops to mobile phones) and the dramatic decrease in size, including the size of high-resolution displays. This transition feeds directly into the evolution of eye-signal control.

Paralleling the evolution of computing and display hardware, software, and the sophistication of graphics within, for example, web pages or mobile applications has resulted in tremendous advances in the ability to, for example, find desired information. Search engines have transitioned from simple word searches to searches for context-sensitive meanings implied by collections of words, even incorporating images and sounds. The transition toward more of a "visual" and even "video" user interface (i.e., the use of icons, thumbnails, pictures, etc.) lends itself to the use of eye signals, either alone or in conjunction with other forms of input. Thus, eye-directed searches based on one or more (real or virtual) images and/or videos will add great flexibility and speed to search-based information retrieval.

While some eye signal interactions will work effectively with existing screen layouts/designs, eye signal designs will drive an evolution in screen design (including cross HMI platforms) to support and enable new levels of interaction addressing speed, context, efficiency, increases in cognitive processing, collaborative participation, and more.

Eye Signal Context

At the next level of abstraction, the 1) spatial, 2) temporal, and 3) sequential characteristics of eye gazes relative to displayed interactables are all used strategically to discern user intent. For example, the spatial regions of a menu/app-selection environment can be closely examined or generally viewed for an indefinite period as long as an "activate" interactable (e.g., go) is not viewed. Users quickly learn to avoid activating (e.g., "looking" to or gazing at) the spatial region(s) of a display unless there is intent to activate.

In contrast, the main reveal is closely tied to the timing of a selection. The "activation" of an interactable revealed by the main reveal interactable is implied if selection occurs within a certain time (without the need to further saccade to an "activate" interactable). Failure to select/activate within a certain time (for temporal "select interactables" versus persistent "select interactables," of which "menu reveal" interactables are a class) causes revealed selectable objects to disappear, obviating the need for a specific "opt-out" operation.

Additionally, different sequences can be used under different conditions. If, for example, "go" activation is considered the action to be performed (i.e., launch an application or selection), then a selection (e.g., of an application) is performed first in the select-look-go sequence before activating it. On the other hand, in the case of selecting an menu reveal such as "magnify," the action to be performed is first chosen and then the region (e.g., of a map or body of text) that is the "recipient" of the action is selected second.

All sequential combinations can be strung together and are available to an applications developer. In addition to software tools, consistent philosophies, guidelines, and standards are made available to developers. These can be used to guide screen layout, menu structures, decision trees, timing and spatial resolution considerations, code construction, and so on. As an example, a high contrast central target that indicates whether an interactable is a select or a pursuit can be made consistent throughout all interactables to help guide users with regard to usage in addition to ensuring that all interactables have central visual points of attraction.

Any other form of distinctive graphic treatments that create a visual language for easy user recognition of classes of interactables, such a color, texture, size, graphical elements, highlighting, translucence, and more, may be used as well. The same strategies can also be applied to eye imaging cameras that are not mounted within headwear (i.e., within the user's environment), but pointed at the eye. The ultimate goal of such well-constructed systems and applications is to rapidly and intuitively discern user intent to turn eye signals into actions.

Another important area that is facilitated by eye-signal control is multi-user exchange. This includes a method for eye-chats for 1:1; 1:n, and even n:m simultaneous chats among people in common groups. This involves screen and time partitioning, and the introduction of new communication glyphs, all enabled via intelligence based on a user profile supplemented with machine intelligence, and amplified by user-to-user interchange of information. The "chat" may be unscripted, partly scripted, or highly scripted.

Eye Signals within a Continuous Activation Mode

In another operational approach, a device user can select a "continuous activation" mode. In this mode, once a continuous activation function has been selected (e.g., via an interactable selection), subsequent eye movements are interpreted as having potential for substantially continuously or repeatedly performing one or more actions. By entering a continuous activation mode, it becomes unnecessary for the device user to perform discrete "go" or activation eye signals in order to perform a particular function or set of functions repeatedly or substantially continuously.

The continuous activation might remain in effect until a device wearer terminates the mode via a specific eye signal, such as activating a "STOP" 534 command, or other multimodal termination indication such as head motion, a spoken word or phrase, a hand gesture viewable by a scene camera, or interaction with a controlling device connected or wirelessly linked to a processor. In rare cases, the activation mode may also be terminated after a prolonged period (i.e., "timing-out") such as when the device is removed from the head when in a continuous activation mode.

Figure 5:
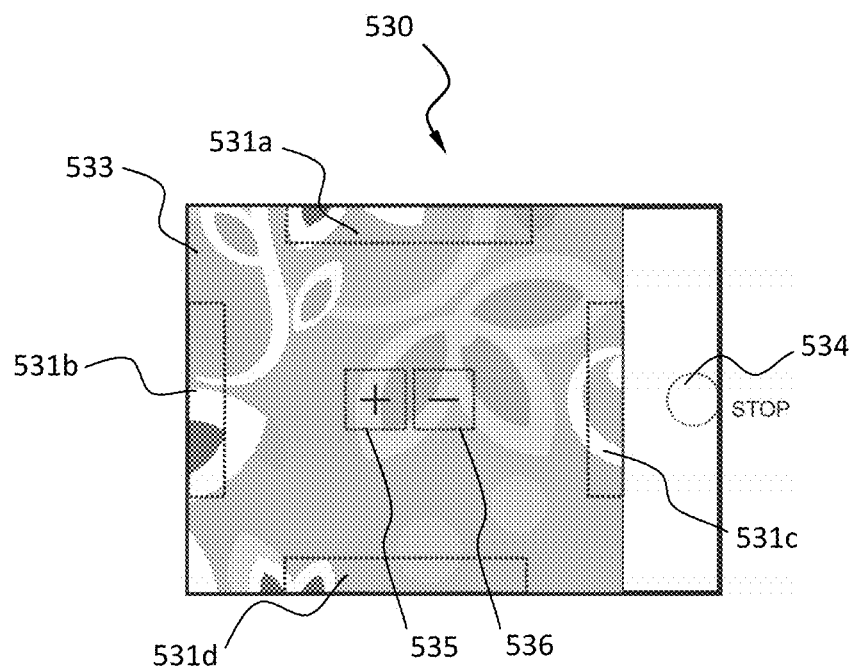
FIG. 5 is an example of an eye-signal menu that implements a pan and zoom function to view an image.

The "continuous activation" mode can be illustrated by the example of performing "pan and zoom" operations to explore the contents of an image, as depicted in FIG. 5. In this scenario, a user can view an image and then select a "pan & zoom" interactable using a typical "go" eye signal sequence. This places the device in a continuous "pan & zoom" activation mode. Upon entering the "pan and/or zoom" continuous activation mode(s), "+" (i.e., plus) 535 and "−" (i.e., minus) 536 symbols are displayed, typically near the center of the image and/or displayable area 530. Continuous activation areas, or "nudges," 531a, 531b, 531c, and 531d are represented by dashed rectangles at the edges of the display area 530. "Nudges" can be viewed to perform pan functions. The user can then substantially continuously activate any of the following commands:

When the "+"535 is viewed, the image 533 is enlarged (i.e., zoomed in) substantially continuously for as long as the "+"535 is viewed OR until a user looks at a termination icon 534. In one implementation, zooming in stops as soon as the user looks elsewhere or when the maximum displayable resolution of the image 533 is reached. In another implementation, the user is free to look around once the continuous command has been issued, during the continuous function—for instance, to look for faces in a picture that is zooming in, to look for a desired location on a map that is panning, to look for text in a large scrolling segment, or to look for an item in a video that is playing.

When the "−"536 is viewed, the image 533 might shrink (i.e., zoomed out) substantially continuously for as long as the "−"536 is viewed, or until an explicit termination action is taken. Zooming might stop as soon as the user looks elsewhere or when the minimum displayable resolution of the image 533 is reached.

When the top edge 531a of the image 533 is viewed, the image 533 "nods" downward, displaying new content lying above the originally displayed region 530. Nudging continues until the user looks away from the top edge 531a of the display 530 or the top of the available image 533 is reached OR nudging might continue until an explicit termination action is taken.

When the right edge 531c of the image 533 is viewed, the image 533 "nods" leftward, displaying new content lying to the right of the originally displayed region 530. Nudging continues until the user looks away from the right edge 531c of the display 530 or the rightmost edge of the overall image 533 is reached.

When the bottom edge 531d of the image 533 is viewed, the image 533 "nods" upward, displaying new content lying below the originally displayed region 530. Nudging continues until the user looks away from the bottom edge of the display 530 or the bottom of the overall image is reached.

When the left edge 531b of the image 533 is viewed, the image 533 "nods" rightward, displaying new content lying to the left of the originally displayed region 530. Nudging continues until the user looks away from the left edge 531b of the display 530 or the leftmost edge of the overall image 533 is reached.

Nudging in two directions simultaneously can be performed by viewing at corresponding corners of images 533.

Viewing any other region of the image 533 causes the "pan & zoom" functions to pause, allowing closer examination of the image 533. Continuous activation permits intuitive and natural eye signals to perform specific functions.

Other examples of applications or functions that can utilize the "continuous application" mode include being able to substantially continuously select the brightness versus darkness of an image, adjusting the volume of audio output, establishing a wake-up time by moving dials representing hours and minutes of an alarm clock, controlling a "slider" or other icon to adjust a substantially continuously variable setup parameter (e.g., font size, nudge distance), and controlling the introduction or modification of a virtual object that is overlaid into a physical view of the world.

The primary advantage of a continuous activation mode is the ability to rapidly and repeatedly perform a specified set of eye signals while allowing a user to "let their eyes do what their eyes do" such that they can achieve a goal without eye-fatigue and without unnatural, uncomfortable, or difficult eye movements. Further, this can allow a user to move their eyes with saccades, or to following changing imagery with smooth pursuits, to improve cognition of a changing landscape.

However, when in a continuous activation mode, other command sets are generally not available (in order to avoid command ambiguities and/or inadvertent activations) until the user performs a "STOP" 534 to the continuous activation. The "STOP" 534 interactable can, for example, replace the location reserved for the "go" activation interactable, since there is no need to perform further activations when in the continuous activation mode. This location also promotes the ability to employ memory-guided saccades to stop continuous activation, since the location for "go" and "STOP" 534 commands is frequently accessed.

Eye Signal-Controlled Reading Text

Another exemplary application that can utilize the continuous activation mode involves the visualization and scrolling through of multiple pages of text or any other information that requires an area greater than that available within a single display to view (e.g., maps, schematics, architectural drawings). Upon entering the continuously activated "text scroll" mode, a limited sub-set of text-scrolling commands may be made available. In an exemplary embodiment, these may include: fast scroll reverse, scroll reverse, scroll forward, and fast scroll forward.

The scrolling action itself can be implemented in a number of ways including actions similar to a "flip chart," simulating a page turn within a book, substantially continuously feeding text from the top/bottom or sides, text introduced at display edges at variable rates dependent on eye position, and so on. Scrolling can be in the forward (i.e., increasing page numbers) or reverse (i.e., decreasing page numbers) directions. Actions within the continuous activation mode are initiated immediately upon viewing the region of the display associated with each of the scroll commands. Page scrolling stops and a selected page can be viewed when the device wearer looks away from the region of the continuously activated scroll commands.

When reading an individual page of text, additional commands are available within regions around the edges of the text. These commands are designed to be compatible with the natural progression of the eyes as a page is being read. When reading text that is arranged left-to-right and top-to-bottom, it is natural to reach the lower-right corner of the screen when the viewing of a particular page is complete. Thus, it is natural to "turn 1 page" (i.e., advance to the next page) upon reaching this region of the screen. In addition to actual eye gaze location, the time of viewing the location can optionally be considered to ensure sufficient time to complete the reading of a page.

Upon reaching the end of a page and turning to a new one, physiological principles can be used to guide the user's eyes for a natural transition to a new page. First, the gap effect can be induced by removing the "single page turn" interactable from the lower-right corner of the screen. This causes the user to more rapidly move his/her eyes to another location. By rapidly introducing a screen of new text, directing the eye to a specific location(s) within the text can be avoided. Rather, if desired, a highly attractive (from an eye signal point of view) "shout" can optionally be displayed in the upper left corner of the screen. This "eye-shout" can help guide the eye for continued and sequential reading of text on the next page. A saccadic eye movement from the lower-right corner of the display to the upper-left corner can also be memory-guided by experienced users.

At progressively increasing rates of sequencing through text, a user may want to read, scan, or skip pages. The process of reading involves (in English and other languages) a progressive eye movement with full perception from the top-left of the display to the bottom-right portion of a display. Scanning can generally involve a similar progression of eye movements at a more rapid pace. Often during scanning, a user is searching or looking for one or more keywords, phrases, pictures, distinctive colors (e.g., indicating a hypertext link), or other distinctive features. When "skipping" pages, a user is generally attempting to locate a specific page or a general region (e.g., three quarters of the way through) of a document.

Similar considerations and controls are used to navigate through "insert pages" (i.e., viewable areas that do not take up the full screen) and partial pages that may appear as a result of small documents or at the beginning or end of a larger document.

As described above, a continuous activation can involve a series of single-step activations (i.e., without having to repeatedly activate each time via "go" saccades) or substantially continuously performing processes. In the latter case, a process is performed substantially continuously until a specific "stop" eye signal is executed. An example of a continuous performance is scanning/scrolling the pages of a book until a particular page or region is encountered (when a "stop" signal is executed). Continuous scanning frees the eyes to view content without concern for inadvertent activations or maintaining dwell on a particular region of information that is being displayed.

Self-Adapting Eye-Signal Filters

The rate of navigation around eye-controlled menus will increase naturally with user experience and a modest amount of training. Ideally, eye-signal schemes for user navigation should be compatible with, and self-adapting to, the degree of experience apparent within a user. For example, if a user fixates on the main reveal interactable and the display of the interactable is removed from the scene, a novice user might continue to view the location of the selected interactable (versus an immediate, memory-guided saccade performed by more experienced users). In an exemplary embodiment, following an initial removal of a selected icon from the display, the display of the interactable is re-introduced for a brief period and then re-removed from the display. If allowed to continue, this has the effect of indicating to a novice user, the selection of an interactable by blinking (on and off) the display of the interactable.

As a user becomes more trained, fewer blinks are required until trained to the degree of an expert user who generates only memory-guided saccades with no extended perception or blinking of interactables. At this stage, the gap effect can be utilized to further increase the eye signal rate. A similar strategy might entail an interactable that fades away or changes color with a more rapidly fading color change or other change over time.

In order to enact further enhancements of processes that lead to eye-controlled activation, it is advantageous for algorithms to know the degree of experience of a particular user. Such measures can be used to regulate a self-adapting system. An example of a measure of the expertise of a user is the time taken to saccade to a main reveal interactable, or another temporal reveal interactable and then onto a newly revealed interactable (recognizing that saccadic rate onto the reveal interactable itself doesn't necessarily change). Such temporal measurements are easily made by the system where a short interval indicates a more experienced user who is likely primarily using memory-guided saccades.

A less experienced user waits for, and possibly perceives, newly displayed interactables. Such measures can be used to control menu presentations, in particular, the length of display of selected reveals prior to their display being removed, any delay prior to pursuit object movement, pursuit object velocity, etc. in order to optimize the rate of navigation around selection menus.

Exemplary Eye-Signal Menus

Turning further to the drawings, FIG. 6 shows an exemplary embodiment of a main (i.e., top-level) menu screen 530 for an eye-signal controlled device. The screen contains interactables representing user applications within regions that are sized to conform to the angular resolution for reliable gaze detection and region selection. The screenshot shows three rows by six columns of regions (for a total of 18 regions) that can be selected using one or both eyes.

The left-most 631 and right-most 632 columns of selectable regions are referred to as "sidebars," a common notation within GUIs. In this main-menu example, the left sidebar 631 is unused for eye-signal control. The right sidebar 632 contains interactables that represent the following actions (from top to bottom): main reveal 633, go 634, and page scroll to the left 635.

As described previously, high contrast edges or regions within an interactable help the eyes of device wearers to view or fixate on a specific target area within an interactable. In the case of the interactables contained within the sidebars in FIG. 6, small high-contrast circles are positioned within each sidebar interactable 633, 634, and 635 to provide specific points for targeting and/or fixation. This gives the user "something to look at" in addition to directing the fovea of the eye more precisely toward the centers of selectable regions. Keeping eye gazes toward the center of a selectable region, well away from the edges, improves the reliability of region-selection process, making selections less susceptible to eye tracking noise and errors.

The left scroll function 635 (i.e., the interactable located at the bottom of the right sidebar) allows a user to "scroll" a screen through a series of pages. The page scrolling feature removes upper limits on the amount of information (e.g., interactables, text, pictures) that can be associated with a particular desktop/workspace or grouping of functions. Page scrolling is a common GUI approach, but implementation using eye signals requires unique strategies (see, e.g., FIG. 10).

In the sample screenshot shown as FIG. 6, there is no page-scroll interactable displayed in the lowest position of the left sidebar 631. This is because there are no pages virtually positioned to the left of the current screen (i.e., this screenshot is page 1). The strip 636 along the lowest portion of the screen is a page location indicator (sometimes referred to within GUIs as a type of a progress bar). The width of the filled-in portion of the bar 636 is an indication of the total number of pages. Since the width symbolizes the fraction that the viewed page represents within the total number of pages, wider filled-in portions represent a lesser total number of pages. The horizontal position of the filled-in portion of the bar represents the position of the selected page within the total number of pages. For example, the sample screenshot shown is page 1 of 4.

In between the sidebars within the central area of the display 530, the screen in the upper panel of FIG. 6 is divided into three rows by four columns 637 of eye-selectable regions. Interactables are located within each of these regions as visual cues of potential actions or applications that are available to the device wearer. In the screenshot, graphical interactables represent the following application selections (from left-to-right and top-to-bottom).

1. Text Messaging—where the displayed value indicates the number of unread text messages
2. Mail—where the displayed value represents the number of unread e-mails
3. Camera—for taking snapshots or video
4. Numeric Key Pad—used, for example, to make a phone call
5. Calendar—with the current date displayed
6. Clock—with the current time displayed
7. Folder—that contains files including stored pictures, text, and videos
8. Weather—with an embedded link that can display current weather conditions and forecasts
9. Notes—an archive of stored text
10. Map—that can include current traffic conditions
11. Music—stored on the device or that can be downloaded
    Settings—to accommodate to a user's visual capabilities and/or experience Any of these interactables can be selected using the eye-signal sequence of select, look, and go. In the example shown in the upper panel, a box 638 surrounds the "text" interactable, indicating that this region is being viewed by the user.

FIG. 7 is an illustration of another embodiment of a main screen menu 530 for an eye-signal controlled device. In this case, the central region containing selectable interactables 737 is composed of a three row by three column grid (for a total of nine interactables). Similar to FIG. 6, the right sidebar 632 contains interactables that represent main reveal 633, go 634, and page scroll to the left 635; and a progress bar 636 is located near the bottom of the menu. The eye-selectable region associated with each interactable is larger in the horizontal direction compared to FIG. 6, making selections easier. This feature could be used, for example, to accommodate for visual or neurological conditions involving lesser control over movements of the eyes or head (e.g., Parkinson's disease).

The lower right interactable 639 within the central menus shown in FIGS. 6 and 7 can be used to launch a "settings" screen. The settings can be used to adjust performance factors such as communications control, airplane mode, a notifications center, downloads, updates, etc. that are common within many portable computing devices. Unique settings for eye signals include control over the delay and timing of pursuit objects, pursuit object style, the size of eye-selectable regions (versus the number of interactables that can be displayed on a single screen), the rate of text or page scrolling, and so on.

Figure 8:
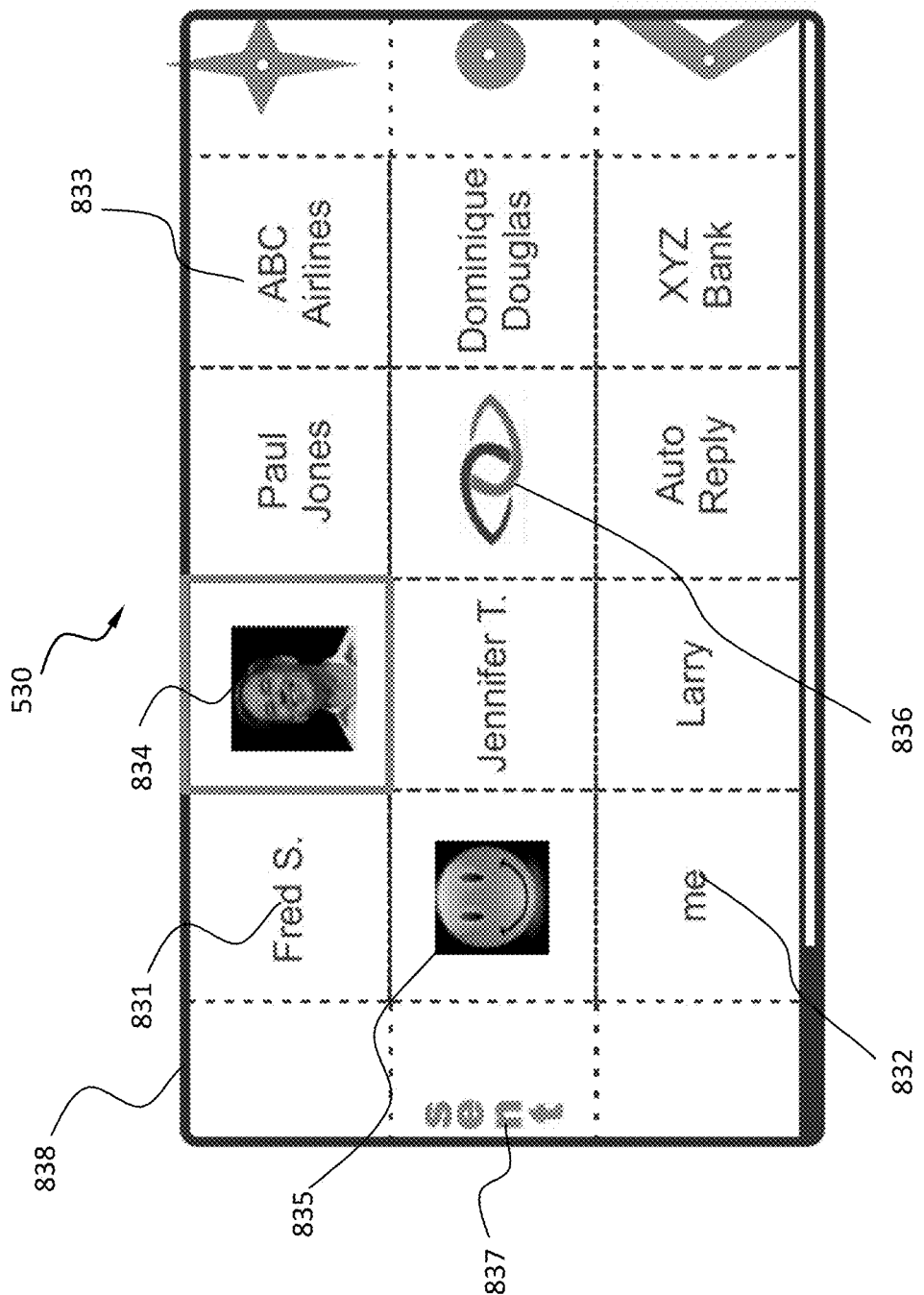
FIG. 8 shows an example of an eye-signal submenu used to view and respond to user e-mail.

FIG. 8 is an example of a screenshot 530 that might be viewed upon a selection and activation of a main-menu "mail" interactable (e.g., see FIGS. 6 and 7). The central region between the sidebars lists sources of mail sorted, for example, according to the time-stamp of their receipt. This panel also illustrates how different types of interactables can be strategically (for eye signals) and dynamically constructed (i.e., according to the information available to the device at a given time) and/or used together with static interactables. Sources of e-mails can be identified via a composed interactable based on abbreviated names 831, nicknames 832, multi-line names 833, truncated names (i.e., to fit within an eye-selectable region), full names, photographs or thumbnails 834, cartoons 835, corporate logos 836, and the like.

As examples of displaying large amounts information using (i.e., beyond a single screen) eye signals in the context of the display: 1) the text of the unread mail or an eye-signal selectable list of mail items (if more than one mail item is unread) is displayed upon selecting an interactable representing an e-mail sender. 2) Mail that has been sent by the device wearer to a particular entity (e.g., individual or corporation) can be viewed by performing an eye-signal sequence to select the entity followed by activating the "sent" interactable 837 located within the left sidebar 838. 3) Additional pages of e-mail senders are available via page scroll.

Figure 9:
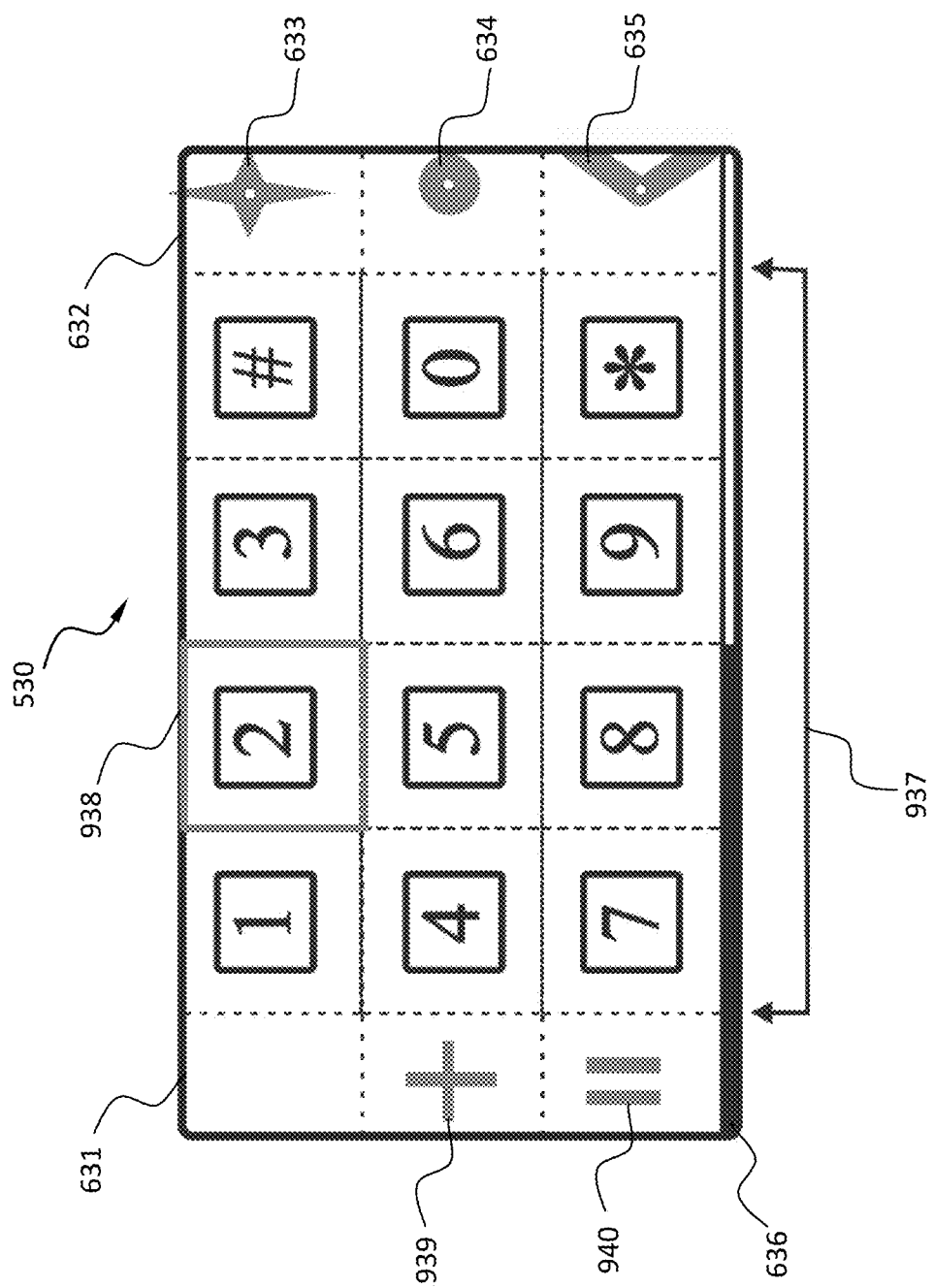
FIG. 9 is a numeric keypad designed for eye-signal data entry.

FIG. 9 is an example of a screenshot of a display 530 that can be used as a numeric keypad in applications such as entering a numeric value or dialing a phone number. The central three by four grid of the display 937 contains the basic selections available on a typical phone. The left 631 and right 632 sidebars contain interactables that can trigger actions by the device user. The right sidebar 632 maintains consistency with the main menu shown in FIGS. 6 and 7 where interactables that represent main reveal 633, go 634, and page scroll to the left 635 are located in consistent positions. There is also a progress bar 636 located near the bottom of the menu. Icons that are distinct to this menu are added to the left sidebar 631 including an icon 939 that adds a person to the call (for conferencing) and one that places the call on "hold" 940.

The exemplary screenshots shown in FIGS. 6 through 9 adhere to a common philosophy, and sets of guidelines and standards. Adhering to these principles makes the user experience much more intuitive, shortens learning curves, avoids inadvertent activations, enhances the use of memory-guided saccades, etc.

FIG. 10 illustrates the use of scrolling to manage and visualize a block of information that is greater than the amount that can be displayed on a single screen (and/or that can also not be fully visualized by the device wearer). FIG. 10 shows four panels 1030a, 1030b, 1030c, and 1030d that are successively displayed during the process of reading a body of text. The main reveal 633, go 634, and page scroll to the left 635a are shown in their usual locations (see FIGS. 6-9) within the right sidebar 632. A progress bar 636 is also show at its usual location along the bottom of the display. New target interactables (i.e., specific to the text-reading display) representing magnify 1037, text pan 1038, and page scroll to the right 1039 are introduced within the left sidebar 631.

Scrolling is implemented using the pursuit style of interactables. When a device user views an interactable that is capable of an activation using the pursuit process, movement and visual tracking of one or more virtual objects may be generated to allow the user to convey intent via smooth pursuit. In the case of a simple activation (i.e., without a 1-of-N selection), the entire viewed interactable can move and activation is determined by whether the user follows the interactable. In this case, a page scroll to the left is initiated by viewing the "scroll left" pursuit interactable 635 located in the lower portion of the right sidebar 632.

In the case of text scrolling, not only does the pursuit interactable 635b, 635c move to facilitate a smooth pursuit eye movement by the device wearer, but the entire page of text 1030b, 1030c moves at the same velocity, further supporting the neurological basis for a smooth pursuit eye movement (i.e., stabilizing overall foveal view).

Eye movement in any direction other than the direction of the moving "scroll left" interactable 635a, 635b, 635c aborts the scroll process. At a chosen distance (e.g., one-third of the way across the screen 1030b), a "point-of-no-return" is reached and the page continues to scroll regardless of eye movements. This eye-signal sequence is useful for scrolling a single page.

If the user continues to follow the left-scroll interactable 635a, 635b, 635c across the screen (as illustrated in the third panel 1030c), the page continues to scroll until the left-scroll interactable 635a, 635b, 635c reaches the left side of the screen. At that time, the left-scroll interactable 635c is replaced by a page counter 1039, as illustrated in the bottom panel of the left sidebar. If the user continues to fixate on the page-number interactable 1039, full pages of text sequentially appear as the page number is incremented. The process of turning complete pages continues until the gaze point of the eye leaves the lowest region of the left sidebar 631 or the final page is reached. This allows a device wearer to quickly select and view any page within a large block of information.

The process for scrolling to the right is similar, except a right-scroll interactable 1039 is selected from the left sidebar 631 and all directions are reversed. The process of using eye signals to control pages can be applied to text documents, photographs, lists, maps, drawings, charts, and other groups of objects; as well as any number (that exceeds the ability to be selected from a single page) of menu selections within a group.

Similar strategies and layouts can be used to scroll up and down. Vergence can be used to scroll in and out (i.e., viewed at different distances from a device wearer). Combinations of eye controls can be used to scroll (and subsequently read, interact, pan, zoom, etc.) by interacting with various combinations of left/right, up/down and in/out interactables.

Exemplary Eye-Signal Language Elements

Figure 11:
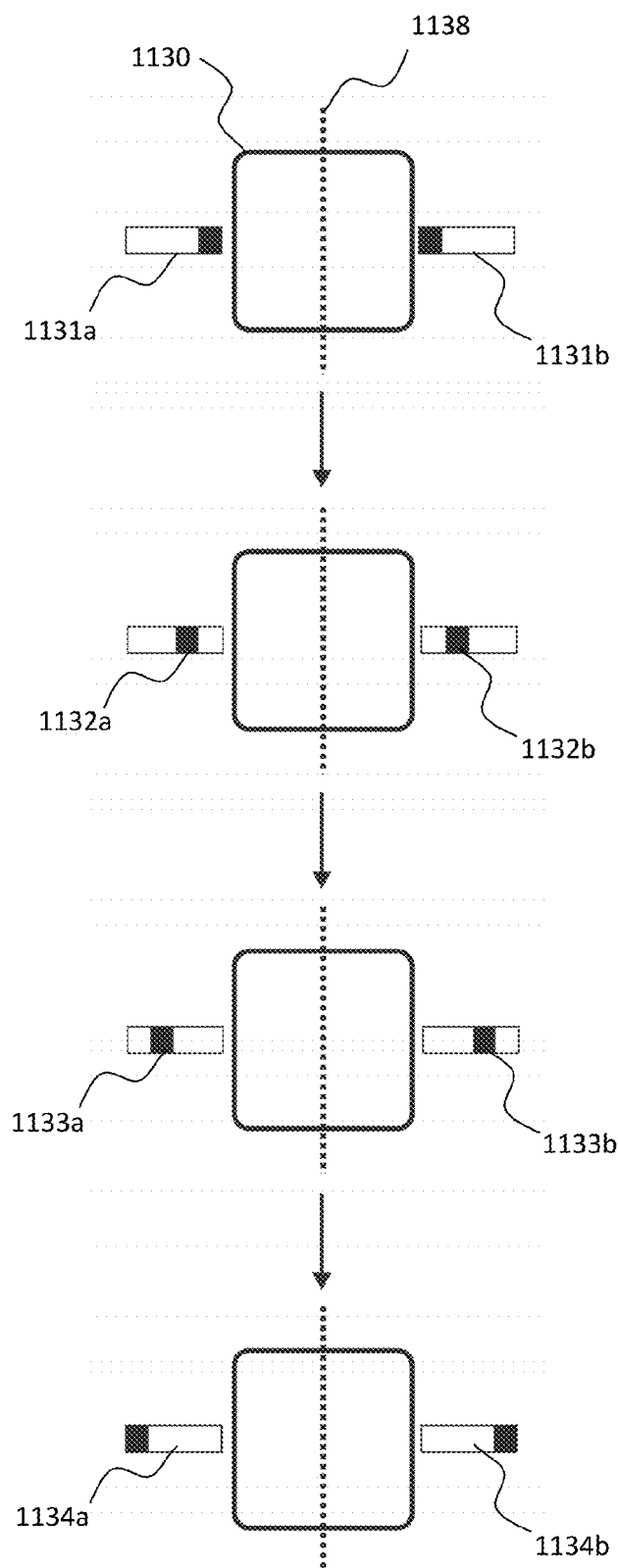
FIG. 11 illustrates the temporal sequence of a displayed object (i.e. a so-called "pursuit object") used to make a 1-of-2 eye selection.
Figure 12A:
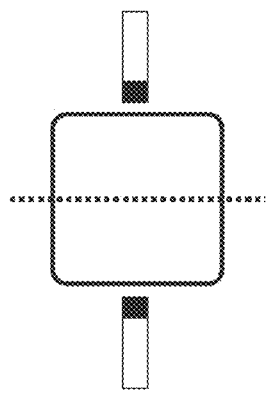
FIGS. 12A-12H show examples of displayed objects that can be used to make a 1-of-N eye selection where N=2, 3, 4, or 5.
Figure 12E:
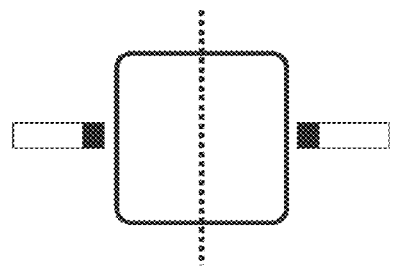
Figure 12B:
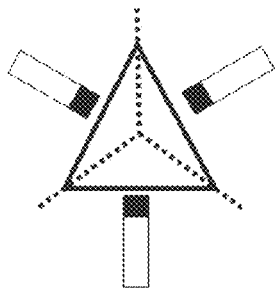
Figure 12F:
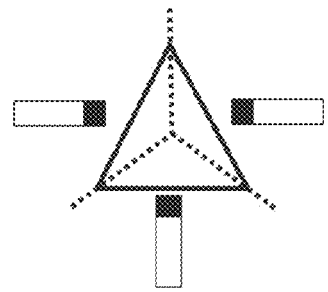
Figure 12C:
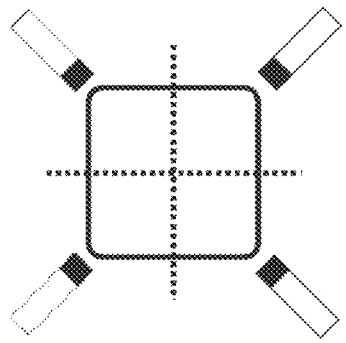
Figure 12G:
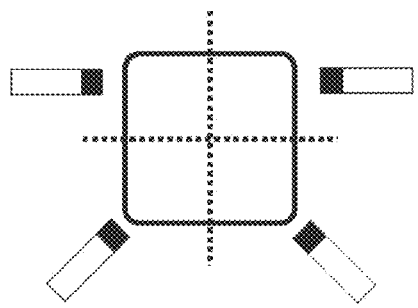
Figure 12D:
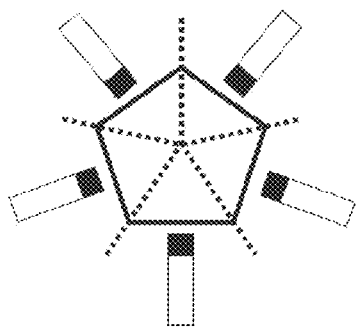
Figure 12H:
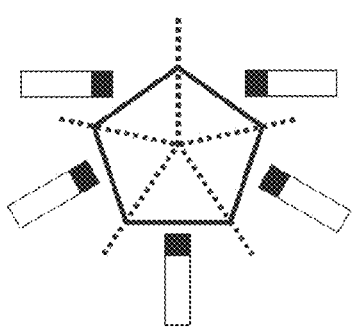

When a 1-of-N selection is made using the pursuit process, N moving sub-objects must be generated in order to allow a user to specify a pursuit selection using smooth pursuit. FIG. 11 illustrates the temporal sequence of a 1-of-2 selection performed using a pursuit operation. The top panel is an example of an initial setup when a pursuit interactable 1130 (represented as the central, rounded square) is viewed. Two pursuit objects 1131a, 1131b are presented, one to be projected toward the left 1131a and the other toward the right 1131b. Pursuit objects contain at least one high-contrast focal point (that could include the entire icon) to aid the smooth pursuit tracking process by the eye.

The pursuit objects 1132a, 1132b, 1133a, and 1133b travel continuously (and smoothly) outward as illustrated in the middle panels. If the pursuit objects 1134a, 1134b reach the end of their range of travel as illustrated in the bottom panel, the entire sequence (from top panel to bottom panel) may be repeated until one pursuit object is sufficiently tracked, indicating a selection; or the eye saccades away from the pursuit interactable, terminating the selection process. Repeated patterns of movement are generally not required for experienced users (and velocities can be slowed for novice users).

In the case of a 1-of-2 selection process, both the time an eye spends looking to the left or right of the center of the pursuit interactable (indicated by dashed lines 1138) and/or the distance from the center can be used to determine when a selection is intended by the device wearer. The key element in the 1-of-N selection process is determining the direction of the smooth pursuit to discern intent.

From top to bottom, the panels in FIGS. 12A-12H illustrate exemplary projections for 1-of-N pursuit selections for N equals two 1232a, 1232b; three 1233a, 1233b; four 1234a, 1234b; and five 1235a, 1235b. Interactables on the left side 1232a, 1233a, 1234a, and 1235a can be used particularly at locations where there are no boundary constraints with respect to expanding projections (e.g., when the pursuit interactable is in a central location within the display area, see, e.g., FIG. 6). Panels on the right side 1232b, 1233b, 1234b, and 1235b are examples of projection directions that can be used adjacent to an upper boundary (e.g., the upper edge of the display area). Pursuit interactables located adjacent to left, bottom or right edges can be handled by rotation of the illustrated projections by 90°, 180°, or 270°.

Pursuit interactables located in corners can be managed using a similar strategy, although the limited directional ranges for corner projections forces the number of projections to be kept relatively low. In order to clearly distinguish a direction to make a selection, the threshold distance travelled to discern user intent (i.e., when an eye signal is determined to be present) can also depend on N.

FIGS. 13A-13E show examples of different styles of pursuit interactables and corresponding pursuit objects for a 1-of-4 selection process. Snapshots from left-to-right 1330a, 1330b, 1330c show the progression in time for each of the pursuit object sequences.

Figure 13A:
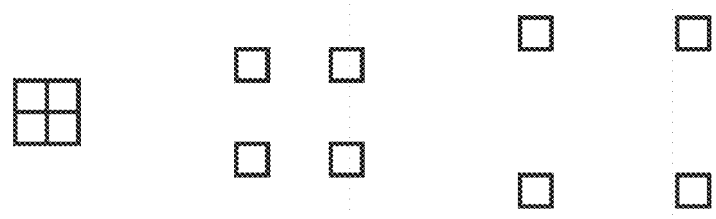
FIGS. 13A-13E illustrate examples of different graphic designs and principles that can be used to make a 1-of-4 eye selection.
Figure 13B:
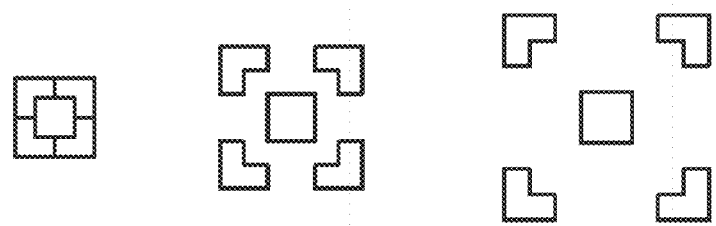
Figure 13C:
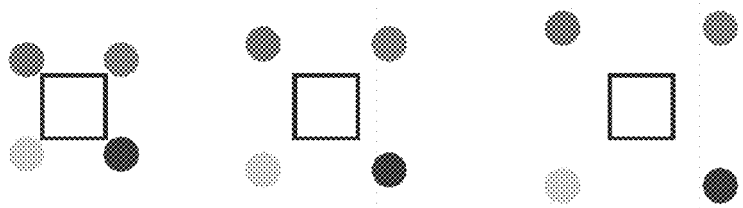
Figure 13D:
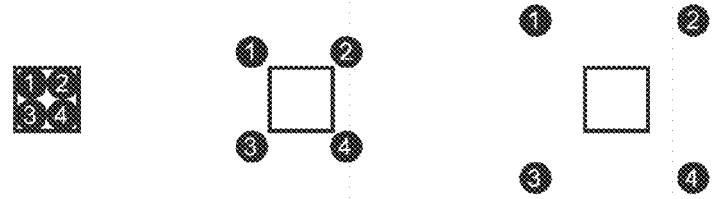
Figure 13E:
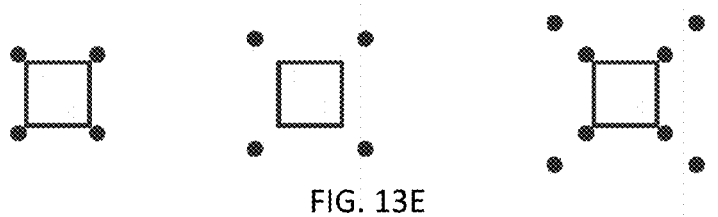

FIG. 13A is a pursuit interactable "explosion" where the original interactable splits into four pieces that expand outward. No portion of the original interactable is left behind. FIG. 13B shows an interactable in which only the interactable shell "explodes" leaving the inner portion of the original interactable behind. In FIG. 13C, color- or luminance-coded pursuit objects expand outward from a central interactable, leaving the original interactable behind. In FIG. 13D, pursuit objects start from within an interactable to begin their outward expansion. FIG. 13E illustrates a "conveyer" of points that radiate outward where new points are added as time progresses. The advantage of this later scheme is the ability to fixate on any pursuit object as it forms and radiates outward from the central interactable, versus waiting for a single pursuit object to loop around and re-start an outward projection.

Many additional variants in pursuit object appearance are possible to convey meaning or to simply distinguish a mover beyond the direction it moves. For example, different movers can have different shapes, sizes, colors, labels, etc. Shapes and labels can be meaningful (e.g., if shaped as, or labelled with, a number) or arbitrary.

Figure 14A:
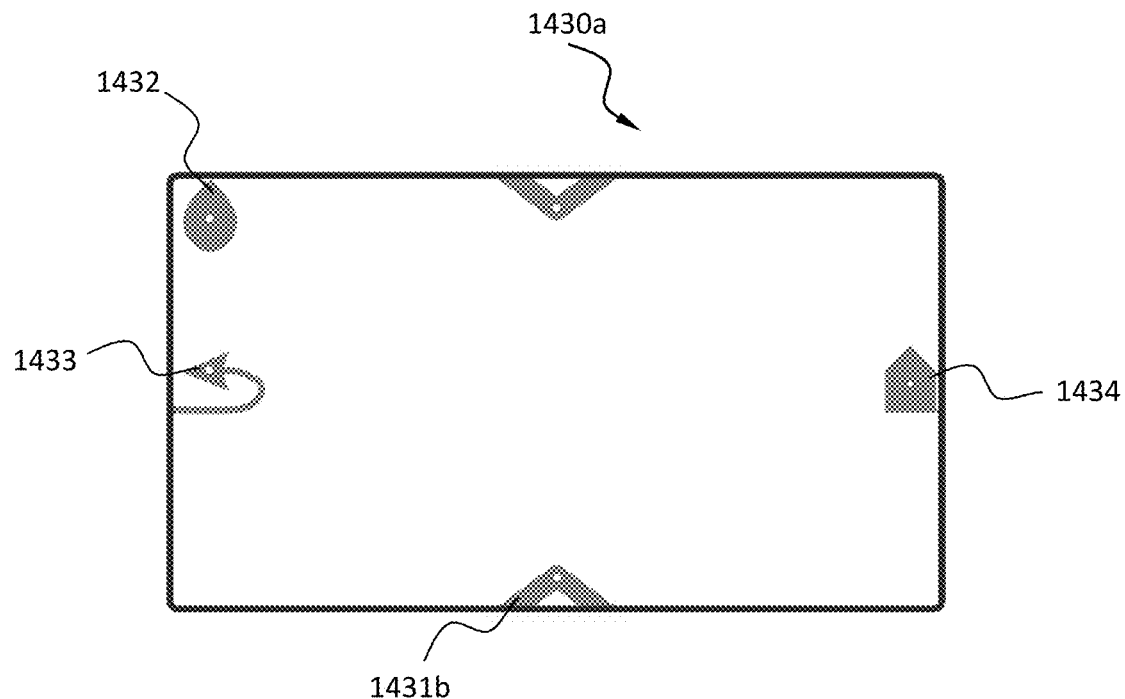
FIGS. 14A and 14B illustrate screenshots and overlays used to scroll text using the eye-signal language.

The upper panel 1430a of FIG. 14A illustrates an example of an overlay used to implement a main reveal process. A "main reveal" is initiated when a fixed-location main reveal interactable (i.e., star shown in the upper-right corner of FIGS. 6-9) is viewed by a device user. Viewing causes the overlay interactables 1431a, 1431b, 1432, 1433, and 1434 to appear for a brief time. In addition, the main reveal interactable can disappear in order to take advantage of the gap effect, where the disappearance of a viewed interactable coupled with the appearance of new interactables helps the eye to saccade more quickly to another location, including the newly exposed main reveal selections 1431a, 1431b, 1432, 1433, and 1434. If a newly exposed main reveal interactable is not selected within a specified period, the top-level main reveal interactable re-appears and the overlaid interactables 1431a, 1431b, 1432, 1433, and 1434 disappear without any further action.

Figure 14B:
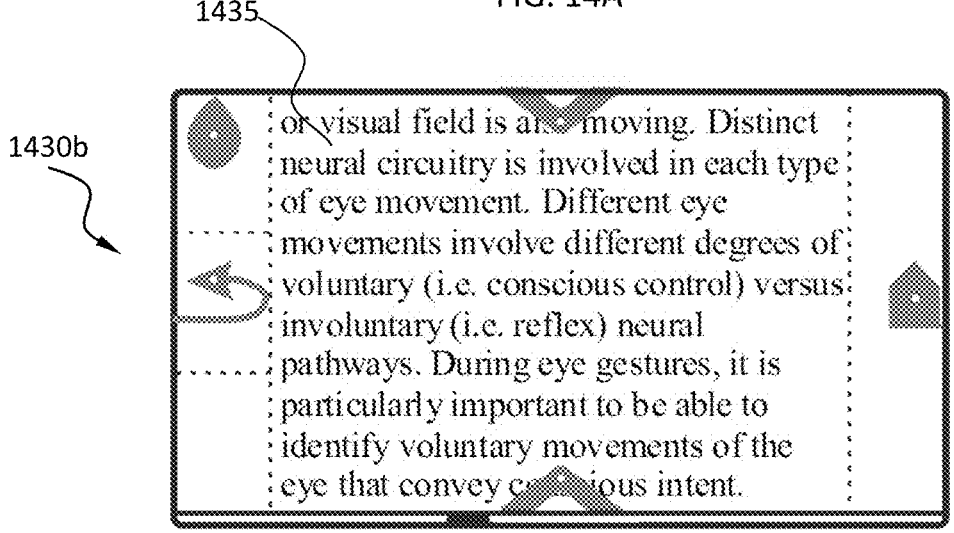

If, during the main reveal process, a device user saccades within a selected time to any one of the newly revealed interactables, the action associated with that interactable is performed. As illustrated in the lower panel 1430b of FIG. 14B, revealed interactables are strategically overlaid and positioned so as to minimize interference with content that is already being shown on the display. As shown in the top panel, revealed interactables are constructed to have a high-contrast focal point (similar to sidebar interactables) to help guide the eye when viewed. The rightmost revealed interactable 1434 is a "home" interactable that results in the display of the main or home menu (see FIGS. 6-9). The revealed interactables 1431a, 1431b located near the upper and lower display edges operate in a similar fashion to the left and right scroll interactables shown in FIG. 10 except the screen (in this case, text 1435) is scrolled in the up and down direction. The main reveal interactable 1433 located at the middle position on the left side of the screen represents a "back" button, elevating any menu-selection process up (i.e., toward the main menu) one level. The interactable 1432 in the upper-left corner of the screen initiates a pick 'n place function.

Figure 15A:
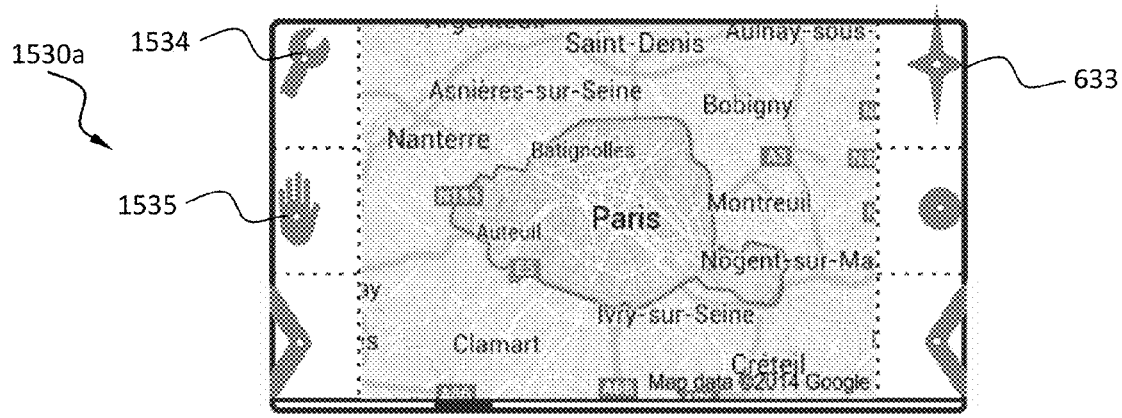
FIGS. 15A-15C show—examples of eye-signal multi-level menu selection during the viewing of a map.
Figure 15B:
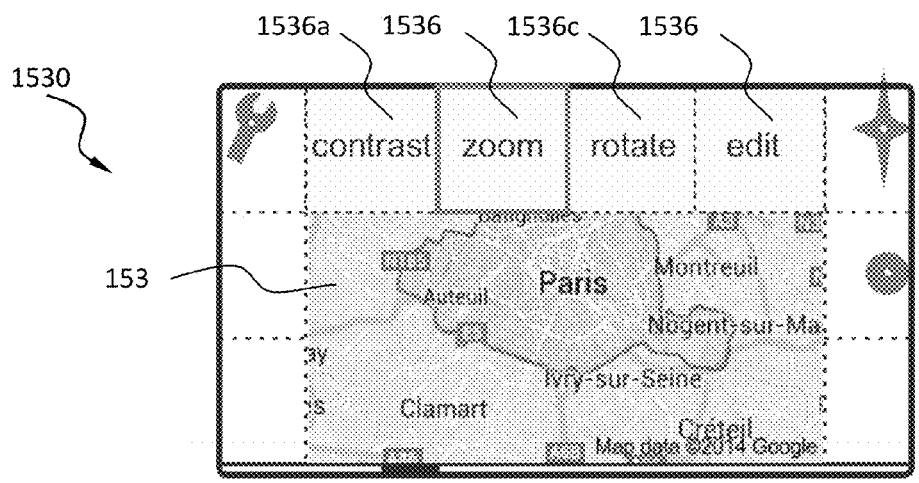
Figure 15C:
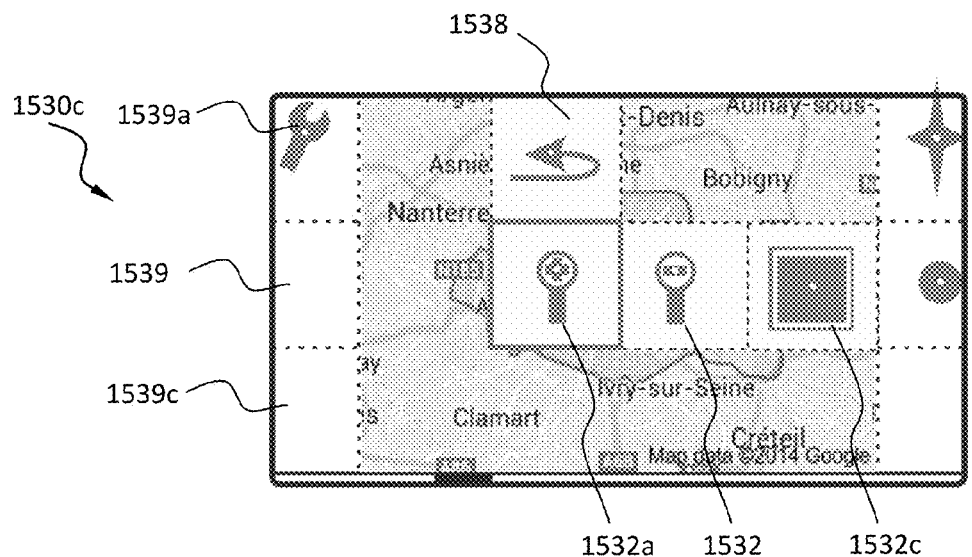

The screenshots 1530a, 1530b, 1530c shown in FIGS. 15A-15C illustrate an exemplary sequence demonstrating a reveal menu selection process. The selection process is initiated by "looking" to the menu reveal 633 positioned as the uppermost interactable in the left sidebar. This causes a menu of tools 1536a, 1536b, 1536c, 1536d to appear, as shown in the middle panel, 1530b. These tools are context-sensitive, taking into account that a figure, more specifically a map of Paris 1537, is being viewed. The displayed menu selections (i.e., contrast 1536a, zoom 1536b, rotate 1536c, and edit 1536d) represent groups of functions that can be applied to such figures. If desired, all menu options can be surveyed with highlight-based feedback indicating a user's eye gaze position. Activation of the zoom selection using a select-look-go sequence causes a submenu of zoom tools to appear, as shown in the lower panel 1530c.

Elements within submenus can, in turn, be selected. Repeating this process allows tool selection to be nested as deeply as desired by application developers. The selection of a specific menu item causes unused selections to disappear and the interactable representing the selected function to be replaced by a "back" interactable 1538. Removing reveals (that are not needed within the context of individual menu tiers) as selections are made also ensures that menu nesting (with proper algorithmic planning) can be as deep as desired and still displayed in a format that adheres to select gaze resolution.

When designing layout with a three by four gaze-selectable region, at all times a "back" interactable 1538 can be displayed on the top row 1539a of the central region of the screen (at the column position where a selection was previously made), up to four revealed interactables can be displayed in the middle row 1539b, and (as each group interactable is viewed) up to four submenu options can be displayed in the lower row 1539c.

Activating the "back" function 1538 moves the menu selection process up (i.e., back) one tier, allowing sets of tools to be re-selected. For example, if the "back" interactable within the lower panel 1530c of FIG. 15C were selected (i.e., using a select-look-go sequence), the middle panel 1530b of FIG. 15B would re-appear. Viewing the position of the original menu-reveal interactable 633 within the left sidebar, replaced with a "back" interactable, terminates a menu selection process immediately and removes any overlaid revealed interactables.

The zoom submenu illustrates (from left to right), a positive zoom 1536a, negative zoom 1536b, and original-image resolution 1536c zoom interactables. These represent the lowest level of the selection process (i.e., the actual tools themselves). Thus, no further submenus are displayed as revealed interactables are surveyed. Once a tool is selected (i.e., using a select-look-go sequence), the action specified by the tool is performed if no other positional information is required (e.g., zoom to the original resolution), or the function is applied as soon as a location is selected if position coordinates are required to perform the function (e.g., a central reference location when zooming in). The function can be repeated by again selecting a location (i.e., using a select-look-go sequence), or another tool selection sequence can be initiated by viewing the reveal interactable.

Eye-Signal Language Selections

Figure 16:
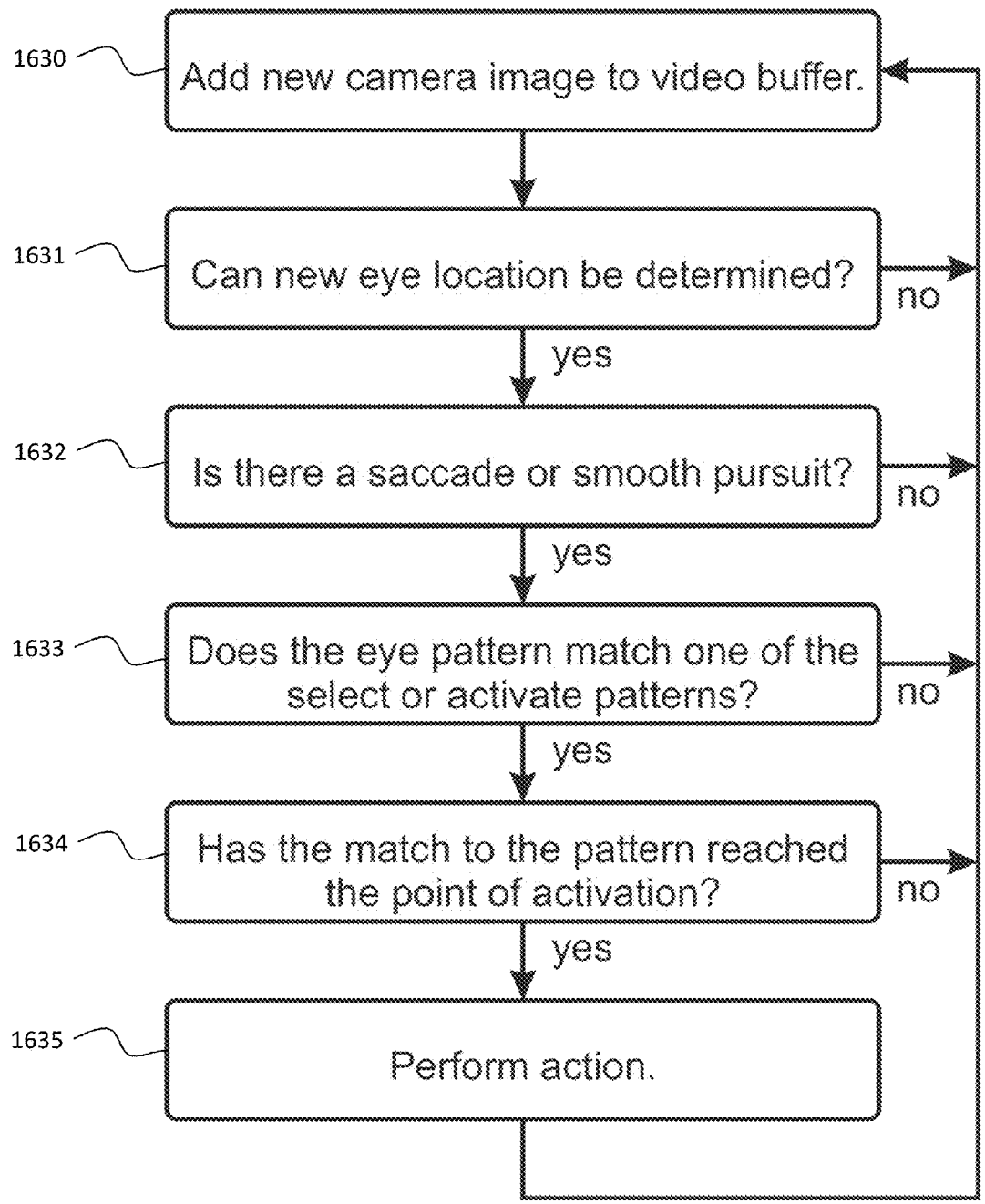
FIG. 16 is a flow diagram of steps to perform actions based on eye signals.

FIG. 16 shows an overall sequence of algorithmic steps used to detect eye signals that may lead up to the performance of an action. Images of an eye are acquired and analyzed at 1630 to determine gaze pathways. If an eye cannot be found because it is covered by an eyelid or otherwise obscured at 1631, timing registers are simply updated and analysis proceeds to the next camera frame. Filters at 1632 are applied to all series of eye positions to determine whether primarily saccadic or smooth pursuit (or vergence or vestibulo-ocular) eye movements are present. If matches to these forms of voluntary eye movement are found, then gaze pathways are further compared with screen positions at 1633 to determine if regions corresponding to interactables or real objects are being viewed. Gaze patterns are then further analyzed to determine if they generally correspond to activation interactables displayed on the screen at 1634. If a match is found, then actions corresponding to the selected interactable(s) are performed at 1635.

The use of smooth pursuit and saccadic eye movements as components in the formation of eye signals is not limited to following or visualizing virtual objects (i.e., interactables) on a display. Eye signals may also incorporate selecting actual objects in the real world environment of a device wearer. This form of eye-signal selection and control is particularly powerful when supplemented with object recognition techniques (within scene camera images) that are well-known in the art.

Figure 17:
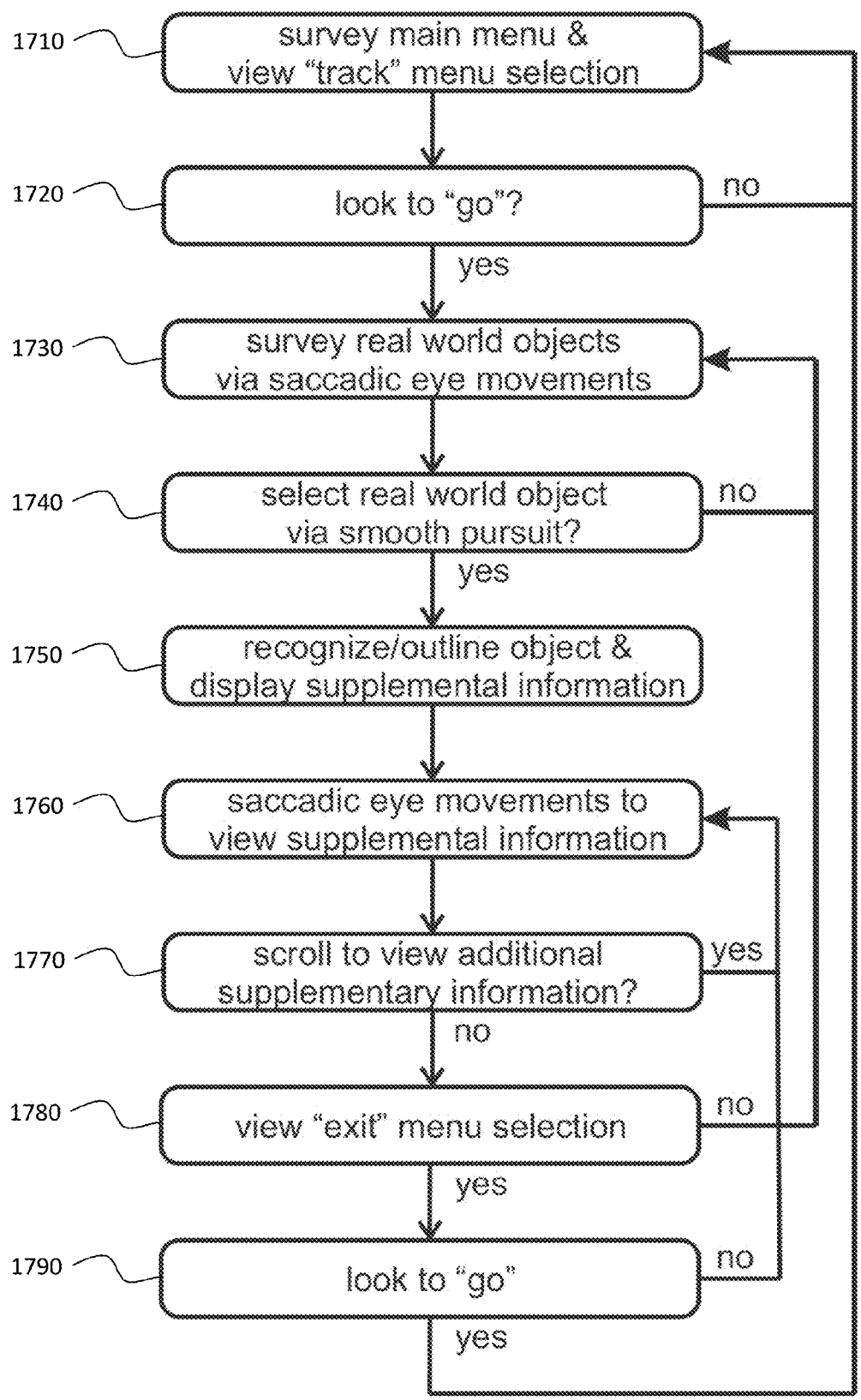
FIG. 17 is a flow diagram of steps to retrieve and display supplementary information about "real world" objects using the eye-signal language.

FIG. 17 shows an exemplary embodiment of a series of eye-signal selections that may be used to obtain supplementary information about identified objects in the real world. This flowchart represents the structure of a small code segment that may enable or disable a user preference of whether to display supplementary information about objects that are observed and recognized in device wearer's environment.

The flow chart illustrates steps in which both saccadic and smooth pursuit eye movements are used to (seamlessly) form signals within the real world and virtual displays as well as transitions between the two. For example, a look used to generate a go selection at 1720 of a "track" menu item 1710 is a saccadic movement to objects within a virtual display. The real world environment of the device wearer may be viewed using saccadic eye movements at 1730. Identifying items of interest to the device wearer in the environment involves smooth pursuit of objects in the real world at 1740.

If the object of interest happens to be within the viewing region of the transparent or translucent display, and indication of which object has been selected and recognized may be made by outlining (or some other indication of selection, such as a cross, arrow, changing translucency, etc.) the object within the display screen at 1750. A saccadic eye movement may then be used to view information on the virtual display 1760 about a particular item of interest. Smooth pursuit movements directed at the virtual display may be used to scroll at 1770 through additional supplementary information about the real world object of interest.

A saccadic movement may then be used to transition between displayed information and the real world to survey other objects of interest. Smooth pursuit may again be used to select another object of interest at 1740. The user may saccade back to the display for further supplementary information at 1760. Information about any number of objects may be obtained by repeating these later steps any number of times. Finally, the "track" mode may be terminated by selecting an "exit" menu selection at 1780 on the display using a go (i.e., saccade) at 1790 to complete the desired operation.

Dynamic Control of Frame Rate

Another exemplary embodiment involves dynamic control of the frame rate (i.e., number of images acquired per unit of time) of the one or more cameras that view regions of one or both eyes. Camera frame rate is a major determinant of the ability to determine and measure rates and directions of movement (i.e., velocities) of objects within images of an eye. As previously described, muscles within the eye are capable of movements that are the most rapid of all muscles within the human body. Thus, increased camera frame rate can be critical in some cases to more accurately and robustly measure dynamic movements of an eye and/or its components.

Modern-day cameras are capable of operating over a wide range of frame rates. Instantaneous frame rates can also be adjusted (i.e., governed by so-called "clock" circuitry) as frequently as on an image-by-image basis.

At the low end of the frequency spectrum within exemplary embodiments, frame rates as low as one frame over a period of several seconds can be used, for example, to conserve resources when the eye tracking device appears to have been removed from the head and is not in use. Images acquired at such low frame rates can be used to search for the presence of an eye within camera images indicating that the device has been remounted onto the head, in preparation for higher-performance use. At the other end of the frequency spectrum, rates of 1,000 frames per second or more can be used to accurately measure velocities of rapid saccadic movements or tremors within images of eyes.

The temporal accuracy, jitter and, precision within modern-day oscillator (i.e., "clock") circuits used to control cameras are measured in parts per million (PPM). Determining the velocity of eye movements involves measures of the spatial locations of "trackable" components of the eye over multiple images divided by the time separating those images. Over the course of acquiring several frames, the temporal accuracy of even relatively low-accuracy oscillator circuits of 100 PPM results in an insignificant error compared to measures of the spatial location of objects within camera images. Thus, clock accuracy is generally not a limiting factor when making velocity measurements of components within an eye. Overall accuracy is primarily governed by the accuracy of determining the spatial locations of objects within camera images.

Closely aligned with camera frame rate is the acquisition time required to collect each image. The maximum time a camera can take to acquire an image is the inverse of the frame rate (i.e., the total time of a frame=1/frame rate). However, modern-day digital cameras also have the ability to limit the time over which they detect photons during the image acquisition process. Limiting the time to acquire photons is known in the art as "electronic shuttering." Shuttering light (including infrared) collection times to very brief intervals (typically in the order of microseconds to milliseconds) "freezes" images, allowing a clearer view of moving objects since object edges are spread over fewer pixels. On the other hand, longer acquisition times allow the detection of more photons during each image, increasing the amplitude (i.e., intensity within each pixel) of camera images and generally increasing signal-to-noise ratios.

Armed with this control over camera performance, exemplary embodiments make use of adjustable frame rates and acquisition times to conserve power, maximize the use of computing resources associated with image processing, maximize the precision of eye measurement (particularly those associated with the measurement of moving objects), regulate sufficient illumination, and/or reduce spatial "noise" associated with the fact that eyes are in constant motion (e.g., micro-saccades, tremor) even when the viewer is focused on a single object.

Although micro-movements can be useful to infer some aspects of a user's state (see below), they can interfere with directional and distance measurements of smooth pursuit and voluntary saccades. Higher frame rates allow algorithmic approaches to compensate for micro-movements by removing oscillations/movements at such frequencies or other mathematical approaches such as averaging results. Brief acquisition times can also be used to reduce image blur associated with micro-movements.

Figure 18:
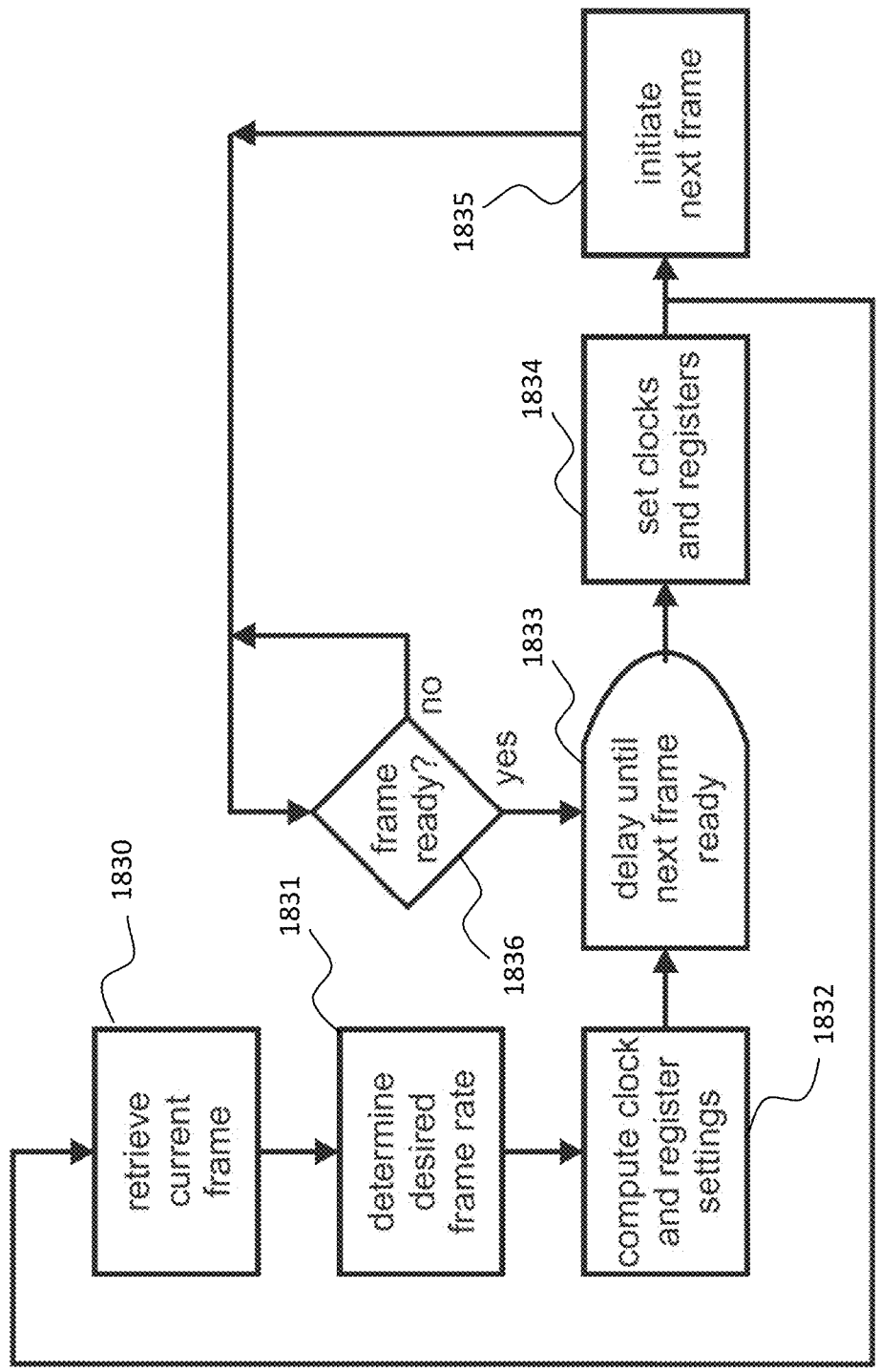
FIG. 18 illustrates some of the timing considerations for frame-by-frame control of image acquisition rates.

FIG. 18 illustrates some of the sequencing considerations involved in the control of a variable frame rate. Because image processing generally can occur at the same time as image acquisition (with acquisition performed independently by one or more cameras), controlling rate on a frame-by-frame basis involves the analysis of an image while substantially simultaneously collecting another frame and preparing for the control of the next sequentially acquired image.

Once an image is retrieved from a camera at 1830, image analyses are performed at 1831 to determine a subsequent frame rate. These analyses can take into account whether a saccadic movement is occurring, gaze direction, whether the eye is closed, menu selection requirements, and so on. Once a frame rate is determined, all camera clock and register settings are pre-calculated and loaded at 1832 into a temporary buffer (that can be located on the camera(s)). Further processing is then paused at 1833 until collection of the current image is completed at 1836 (e.g., by a simple loop). At that time, actual camera clock and register settings are set at 1834 and acquisition of the subsequent frame is initiated at 1835.

Although there are no restrictions to algorithmic approaches to analyze images of the eye, frame rates can generally be considered in three ranges: 1) Low frames rates, in the range from ten frames/second to one frame every several seconds, can be used generally when there is no need for active eye tracking. Applications include knowing when a device that has been removed from the head is returned to a position where viewing one or both eyes can be seen by device camera(s) or when eye tracking is not required for a particular application and it is only important to know if and when the device is removed from the head; 2) Mid-range frame rates, from 10 to 100 frames/second, can be used for routine eye tracking; 3) High frame rates, from 100 to 1,000 frames/second and beyond, can be used to analyze eye movements such as during the initial phase of a saccade to determine the velocity and profile.

In addition to adjusting frame rate, illumination levels can also be dynamically adjusted to, for example, help compensate for shorter frame acquisition times, objects of interest moving into poorly illuminated regions of an image, and so on. The dynamic control of illumination of the eye based on camera images is more fully described in U.S. Pat. No. 8,890,946, the entire disclosure of which is expressly incorporated by reference herein.

Prediction of Eye Locations

A particularly useful application of controlling camera performance is during the tracking and prediction of target locations during rapid, saccadic eye movements. As described previously, saccadic eye movements are "ballistic" in nature. In other words (similar to the launch of an unguided missile), the target location of a saccade is largely determined at the time of the saccadic launch. No "mid-course corrections" are applied to saccades. By carefully measuring the direction and speed of the initial portion of a saccadic movement, it is therefore possible to predict the target location of a saccade using mathematical approaches similar to those applied to ballistic missiles.

The key to accurately determining initial saccadic direction and speed is the acquisition of camera images at high frame rates (typically hundreds of frames per second). Several techniques are available to acquire a rapid sequence of images immediately following a saccadic launch: 1) Once a saccadic launch is detected when sampling at a lower frame rate, the camera is immediately switched to a higher frame rate. 2) Camera circuitry (only) can be constantly run at a high frame rate, storing images within a circular buffer. Not all images are transferred out of the camera buffer and processed during normal operations. When a saccade is detected, rapidly sampled images that had been stored in the camera buffer can be retrieved for processing. 3) Frame rate can be adjusted based on the "context" of eye signal control. For example, frame rates can be increased when an object is being viewed has the potential of being selected using an "go." Similarly, go-associated saccades are often followed by an additional selection such as a "home" or "reveal." High frame rates can be maintained throughout these sequences.

The ability to predict target locations of saccadic eye movements can be exploited in a number of ways to improve eye signal performance (e.g., speed) and reliability. Exemplary embodiments include:

1. If the predicted target location is the terminus of a command sequence (e.g., when some action is to be performed by the device), then the selected endpoint can be highlighted in any of a variety of ways (draw a box or circle around a target icon, change the color of the target icon, change the brightness of the icon, change the icon, change the background surrounding the icon, etc.). If the activation target indicates that an action is to be performed on a previously selected object or display region, a graphical representation of that object or display region (e.g., thumbnail) can also be displayed. In this case, a "foveal view" thumbnail can be displayed. These have the effect of indicating that a selection has been made, drawing attention to the selection icon to guide any small corrective saccade that typically occurs following a long-distance saccade, and/or reducing the time for the user to perceive that a selection has been made by changing the selection even before the eye reaches the selection point, and further reducing cognitive processing times by displaying a "familiar" image that does not require recall for long-term memory for recognition.

2. If the predicted target location is an intermediary point within a selection sequence (e.g., a go location prior to moving on to a "home" or "reveal"), then increased user selection rates can be achieved by removing the image of the target interactable during the ballistic saccade (i.e., before the target location is reached). Target interactable removal reduces the need for a typical corrective saccade (because the corrective target has been removed) and/or exploits the gap effect to allow the eye to rapidly move on to the next target in a selection sequence. These strategies can greatly reduce the time required to execute eye signals based on a serial sequences of targets.

3. In other cases, the target may be a launch point for additional selections such as those displayed in a pop-down menu. In this case, it may be desirable to display such menus or other icons in a gradual fashion, where luminance and/or opacity are introduced in a controlled manner. Final luminance and/or opacity can also be subdued. One purpose of these steps is to avoid attracting inadvertent attention. The brains of humans and many other animal species are "wired" to at least glance at rapid changes in luminance, edges, or movement; particularly if within the peripheral visual system. The sudden and/or high intensity introduction of icons or objects would generate the tendency of forcing a device wearer to look at the object. By keeping the introduction of selectable options more subdued, voluntary option selection can occur without distractions that may cause inadvertent activations.

4. By knowing the range or distance of a saccadic movement, it is possible to adjust (in real time) the stringency of an eye-signal selection. For example, if a selection is being made based on a saccade initiated from a distant location, the area surrounding a target that is used to determine if a positive selection has been made can be expanded to account for the potential of greater error during a long-distance, ballistic saccade. Conversely, a higher stringency (i.e., smaller selection space) can be used during short saccadic movements to avoid unintended activations when a user is simply surveying a scene.

5. Along similar lines, if a saccadic target location is known, then the stringency of selection targets along the path of the saccade can be increased (i.e., made more restrictive) to avoid inadvertent activation of such targets.

Predictive Region-of-Interest Control

Another strategy that is particularly applicable during high-rate imaging is to isolate the transfer and processing of images collected by the camera to certain "regions-of-interest" (ROIs). Well-selected ROIs can facilitate high frame rates by optimizing available bandwidth to transmitting regions that most likely contain essential eye structures. Similar to controlling frame and acquisition rates, ROIs can be adjusted on a frame-by-frame basis within modern cameras.

During high-rate imaging, spatial differences in the locations of objects between frames are reduced, allowing the locations of detected objects within a given frame to help define an ROI for a subsequent frame. In particular during saccadic eye movement (but also applicable to smooth pursuits), the trajectory of a ballistic saccade can be used to predict the locations of eye structures (and thus, ROIs) for a number of subsequent frames.

Figure 19A:
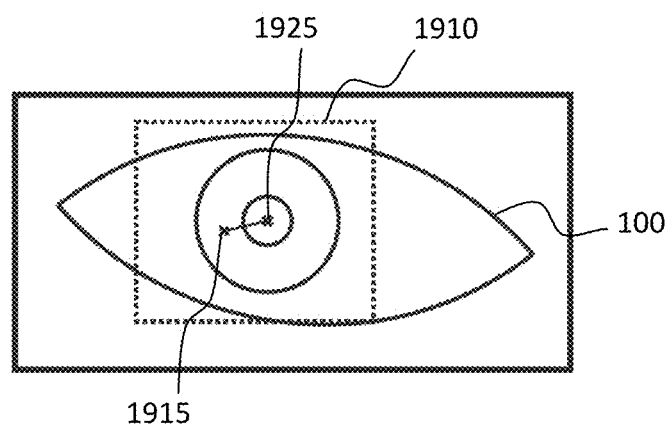
FIGS. 19A and 19B show region-of-interest control based on projected eye movements.
Figure 19B:
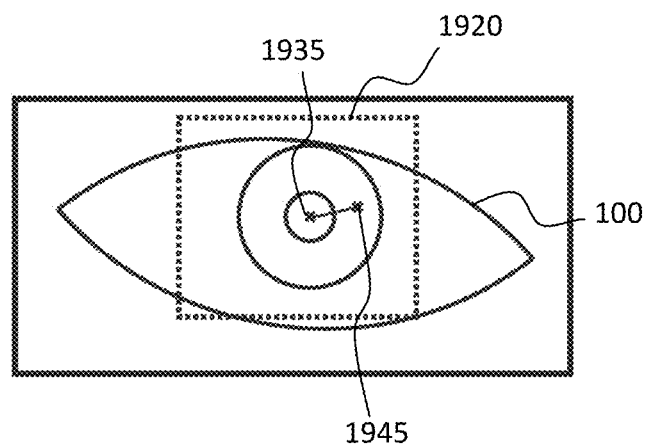

FIGS. 19A and 19B illustrate an ROI (dashed line) 1910 for a given frame and an ROI 1920 within a subsequent frame based on predicted movement. In FIG. 19A, an ROI 1910 was used to isolate a region of the eye 100 based on movement from the position of the center of the pupil 1925 within a previous frame 1915 (previous frame not shown). A new position for the ROI was computed based on the difference between the previous position of the center of the pupil 1925 and the current pupil position 1935. Applying this difference to the current ROI resulted in a predicted ROI 1920 for the subsequent frame shown in FIG. 19B. As predicted, the center of the pupil moved to its new location 1935. The difference between the newly measured pupil location 1935 and the previous pupil center location 1925 can be used to predict new pupil center location for the next frame 1945 (next frame not shown).

During the process of determining whether a user is performing an eye signal via smooth pursuit, the foundational question determined by the headwear during a selection process is: Does an eye gaze track match the location and velocity (i.e., both direction and speed) of a particular pursuit object? As described previously, a complication of this type of measurement is the presence of constant, superimposed background movements (e.g., micro-saccades, tremor) of the eye, even when fixated. A key method to reduce the effects of such rapid, small movements is sampling at a high frame rate. Absent a higher frame rate, a phenomenon known in the art as "aliasing" (governed by formulations developed by Harry Nyquist) occurs.

During discrete sampling at a low frame rate, aliasing can cause high frequency movements to appear as low frequency movements in directions that can depend on a variety of factors such as the frequencies within the high frequency components and frame rate (i.e., not necessarily based on macroscopic movements of the eye). Thus, higher frame rates can be used to satisfy the Nyquist sampling theorem, to determine more accurate measures of overall eye gaze velocity. This allows the determination of whether a smooth pursuit movement is an eye signal (i.e., user intent) to occur sooner and more robustly.

Predictive Control of Information Display

The term "foveal field-of-view" or "foveal view" refers to a central region within an individual's field-of-view where there is sharp vision used, for example, during reading. The foveal view is important for perception and the formation of voluntary movements associated with eye signals. Anatomical and physiological features that support this notion include the fact that, although the fovea occupies less than 1% of the overall retinal surface, more than 50% of the visual cortex is devoted to processing information from the fovea. Thus, perception associated with the construction of grammatical elements during eye signals primarily involves foveal views.

The foveal view takes up approximately the central two degrees (reported range of less than 1° to more than 3°) of the overall visual field. If this view is the subject of an action that is performed during an eye signal, then the foveal view (or elements within the foveal view) can be used to construct thumbnails or icons that can be used within graphical representations of eye-signal actions. For example, if an object is viewed and a "go" saccadic movement is performed, replacing the go target with a thumbnail of the foveal view can serve as an indication that an action is being performed. This view is both intuitive and pleasing to the device user. This form of indication also leads to the ability to quickly "back out of" or reverse an operation if an incorrect subject was chosen and subsequently indicated.

A thumbnail of a foveal view can be constructed in any of a variety of modes:

1. If the processor cannot or does not recognize objects or perspective within foveal view, then a simple thumbnail can be constructed based on a fixed size (e.g., a 2° square) foveal view.
2. If foreground versus background regions of the foveal view are recognized (e.g., looking at an icon on a screen compared with screen "background," a foreground object on a wall, an object set against the sky, etc.), then the background can be removed and the foreground can be displayed as the foveal view thumbnail.
3. If a distinct object such as a face within a foveal view can be recognized, then that object (or a representation of the object) can be displayed as the foveal view thumbnail.

4. If multiple objects within a foveal view are recognized, then the grouping of objects (or representation of the group) can be displayed as the foveal view thumbnail.
5. Recognized objects or regions within a foveal view can be enhanced (e.g., brightened, colored distinctly, outlined, labelled, or animated using, for example, a GIF [Graphics Interchange Format] protocol).
6. An audio clip or representation of a foveal view object can supplement the recognition and indication process.

In another exemplary embodiment, the direction of view of the device wearer can be used to control the luminance and transparency of a display. Knowing the region of the foveal view allows intelligent control of 1) the information displayed within the foveal view and 2) information displayed outside the foveal view (within the parafoveal and peripheral views).

If a user looks away from information that is being displayed in the foveal view, then it is non-productive to continue to display or update that information. This applies particularly to any form of animation such as a video clip. Thus, upon looking away from a foveal view, the information that was being viewed can be paused and/or suppressed (e.g., decreased luminance and/or increased transparency). If a new foveal view is established, information within that region can be enhanced (e.g., brightened and/or made more opaque). Information just outside the edge of the foveal view (particularly when borders exist between objects) can be "nudged" away to isolate and/or enlarge or make more visible objects within the foveal view.

These schemes are multi-modal in that they 1) serve as an indicator of the region being viewed, 2) reduce peripheral "distractions" by suppressing contrast, movement, or edges that might attract unwanted saccades and 3) conserve power and computing resources. As an extreme (but common) case when using a HUD, when a user looks away from the display for a prolonged period, much or all of display can be made transparent. This allows the user to interact with his/her environment without distraction from the headwear. The display can also be placed in a reduced processing power mode to further conserve battery life.

Intelligent control outside the foveal view includes suppressing or eliminating grammatical components of eye signals that are not compatible with object(s) within the foveal view. For example, if a face is being observed within a foveal view, then a path to obtain information about the "cost" of an object is incongruent, and can be suppressed or eliminated. In contrast, an interactable or path to obtain "profile" information (e.g., name, age) about the face under observation may be enhanced. On the other hand, when observing a barcode of an item that might be purchased, the "cost" interactable can be brought to the forefront. Intelligent, context-sensitive menu selection combines contextual display of selections as well as control over the number and arrangement of those selections within both an historical context and object(s) within the current foveal view.

Intelligent and contextual control of specific items to display or suppress has similar considerations to the intelligent control of the rate at which information is presented to the device wearer. In another exemplary embodiment, the rate at which information is presented to the device wearer is regulated based on context and user performance (including the experience of the device wearer). Two classes of factors can affect the rate at which useful information can be perceived by a device wearer: 1) physiological and 2) human factors or, more specifically, cognitive ergonomics. The principles used to regulate the rate of information display apply to a wide range of information formats including lists, animation, text, charts, video, strings of pictures/instructions, and the like. For purposes of illustration below, the rate of presentation of textual information is used to illustrate concepts.

The physiological basis of the control of information includes the rate at which saccadic movements can be generated during the process of reading. Thus, it is not effective to present information to a device wearer at a rate that exceeds perception based on such movements. There is also an issue of the "comfort" of a device wearer when continuously viewing content over an extended period, although this can be dependent on a number of cognitive ergonomic factors including the particular subject matter being viewed. In addition, there are also techniques associated with so-called "speed reading" where the perception of information can be "grouped" into larger chunks.

The cognitive ergonomic basis for the control of information includes a number of factors associated with the device wearer (e.g., rates of perception and reasoning). In the case of human-computer interaction, it can also include the density of decision-making within the information that is displayed. If a number of questions or options are presented to a device wearer, information cannot be displayed as rapidly as when the user is in a scanning or passive recipient mode.

Physiological and cognitive ergonomics lead to an embodiment in which the rate of information is controlled based on a number of factors including the number of questions or options, the information density of content, the experience and preferences of the device wearer, and the like. In the case of presenting text, the rate that the text is scrolled can not only dependent on maximum rates of eye movements and signals, but also on the context and content of the actual text. For example, if the text contains "links" (i.e., hyperlinks) to other content, scrolling can be slowed to provide an opportunity to select the link. Multiple links or questions within a small region of test can slow presentation rates further. Text that is enlarged (e.g., for emphasis) can result in more rapid scrolling once the enlarged text has been viewed. Scroll rates can be determined automatically, based on content or regulated by an individual when such indications are provided, for example by the content author.

Techniques can also be applied to avoid inadvertent activations. For example, a "link" that can be the subject of an action (i.e., that can be activated) may only be activated when within a specified region of the screen (e.g., the center). When a link is selected (i.e., a look occurs to text that is a hyperlink) scrolling can freeze to 1) indicate to the user that a link has been selected and/or 2) provide the user a better opportunity to activate the link via a go signal.

Predictive Control of the Resolution of Information Display

In further embodiments, intelligent control of the resolution of information display can be based on the measured gaze position of a user as well as predicting future gaze locations and subsequently "preparing" a region of a display for observation. Foveal rendering of high resolution images is biomimetic in the sense that the eye is constructed with high-resolution sensing in the foveal region. Humans have further evolved and/or are disposed to perceive and focus on the faces and eyes of another entity at a distance or in one's periphery.

The use of foveal rendering is understood to address numerous issues associated with rendering processes and data delivery to a display. This allows high resolution in the foveal region, and reasonably high rendering in the parafoveal region of a user's field of view, with lower resolution in one's peripheral region. Focusing resources on a high-resolution display can preserve power, computing assets and/or bandwidth in cases when display information is acquired from a remote device.

The ability to predict regions of a display that are destined to become the object of foveal observation can be made particularly during times when either smooth pursuit or saccadic eye movements are performed. During the smooth pursuit following of an object (e.g., pursuit object) an observer tends to follow and anticipate a uniform path. Sudden changes in an object's path are not consistent with the smooth pursuit mechanism. In the case of a virtual object, the path (and thus the anticipated gaze direction) is known. It is therefore possible to "keep ahead" of smooth pursuits, maintaining high-resolution display in the foveal region.

The ballistic nature of saccadic movement permits the saccadic landing region to be predicted a short time after saccadic launch. This allows the landing region to be "prepared" with high-resolution display rendering in time for the arrival of a user's gaze.

Introduction and Removal of Virtual Objects Based on Cognition

In another embodiment, steps can be taken to control whether objects that are introduced or modified within a display are presented in a fashion to either: 1) attract attention or 2) avoid distraction. During some phases of applications, it may be desirable to attract attention to an object or location. For example, if text is to be inserted at a specific location within a paragraph or a particular map location is to be enlarged for exploration, then it may be desirable to draw the eye back to the focal point of the action being performed (e.g., following an activation saccade).

On the other hand, if interactables are to be introduced in order to initiate a selection process (i.e., providing multiple targets for a voluntary saccade), then it may be desirable to introduce those interactables in a manner that avoids the generation of surveying saccades to each or all of the newly introduced objects. Design factors can be incorporated to introduce objects without attracting attention. This is referred to elsewhere as making objects appear "invisibly visible."

Broad categories of factors that can be used to control the degree of attention drawn to an object can be described by the simple terms: 1) what, 2) where, 3) when, and/or 4) how. The following sections describe how each of these categories of factors can be exploited to either attract attention or avoid distraction. They are important components in the formation of intuitive and visually comfortable eye signals by application designers.

1. The term "what" refers to the visual characteristics of one or more objects being introduced. Object structure can include one or more of the following characteristics: size, color, luminance, transparency, contrast compared with background, contrast within an object, structural complexity, and/or dynamic control.

The introduction of an object designed to attract attention can be large, bold in its colors, displayed with high luminance, opaque and presented with high contrast compared to background, containing a significant amount of high-contrast detail and/or with changing dynamics (e.g., brightness, color variation, movement, animation; see below). Any combination of these features can be used as a basis to design objects or interactables that are intended to attract the eye. Other factors include intended meaning, frequency of use, "importance" of associated actions, and grouping of actions can also influence object design.

On the other hand, the introduction of an object designed to avoid distraction, can be smaller, muted in coloration, displayed with low luminance, partially transparent, low in contrast compared with background, presented with few or even blurred internal/circumferential edges, and/or statically placed with relatively simple form. The simplest of object and interactable designs with muted colors can, for example, be reserved for associations with actions that are frequently displayed and/or used.

Graded levels of one or more of the visual characteristics (e.g., size, luminance, etc.) of an object can also be used to indicate "importance" or potential for being involved in an eye signal given the context and probabilistic nature of a sequence of eye signals.

2. The term "where" refers to the placement location of an object relative to one or more of the following: historical placement of the same or similar objects, overall display (including display edges and boundaries), adjacent objects (clustering), current gaze location, and objects or backgrounds that immediately precede current object placement.

Memory can play an extremely important role in determining whether a newly presented object attracts attention and, if exploratory saccades are evoked, whether eye movement is memory-guided (i.e., rapid). Objects previously seen on multiple occasions at a particular location tend not to attract further attention. This can be exploited by introducing frequently used objects and interactables repeatedly at the same location (i.e., throughout different activities and applications).

Spatial references also play an important role in an individual's determination as to whether a newly introduced object is "novel" (i.e., requiring attention) or not. Display edges and shapes and fixed-location display references provide spatial cues for where more "routine" versus novel information might appear. Application designers can take advantage of spatial cues to position objects, particularly those that are targets for memory-guided saccades, at locations that are readily identifiable based on such visual cues. For example, designers can select to display information content (pictures, video, text, etc.) in more central regions of a display and selectable interactables nearer peripheral edges.

In order to avoid exploratory saccades, objects with similar appearance and/or function can be spatially clustered, for example, along one or more sides of a display. This tends to avoid excessive surveying saccades "looking for" a particular menu selection. For example, all text editing functions (e.g., delete, replace, insert) can be placed within a particular region of a display. A memory-based saccade can be used to view this region. Even if a device wearer does not recall the precise location of a particular function, searching saccades can subsequently be restricted to the region.

Knowledge of the current gaze location of a device wearer also provides valuable input to either attract attention or avoid distraction during the introduction of new display objects. There is a strong tendency to maintain attention if changes occur within fine structural details when viewed within the foveal view of an observer. Thus, maintaining attention can be achieved by producing and/or modifying structural detail while viewing. On the other hand, reducing or eliminating (i.e., producing the gap effect) fine structure can generate a tendency to look to another location.

In contrast, changes in fine structure of an object go largely unnoticed within regions of a display that are not within the foveal field-of-view (i.e., parafoveal and peripheral views). This can be exploited by adding fine structure to objects or interactables or modifying existing object forms without attracting attention in regions of a display that are outside the foveal view of the device wearer. When gaze location changes, different regions of a display can subsequently be modified without attracting exploratory saccades. In this way, full screens can be progressively "updated" without distractions as a user views different regions. By careful design of menu objects and layout, it is also possible to minimize the potential for distraction while maintaining the ability to select from a diversity of context-sensitive menu options. This can be implemented via design by minimizing changes within gross object or interactable outlines and indicating differing selections within fine structures that are observable primarily within foveal views.

Along similar lines, by carefully choosing the location of objects, temporal differences during transitions between objects and/or the distinction between objects and a display background can be exploited to either enhance or suppress attention by the device user. If a newly introduced object is substantially different in size, shape, and/or central location compared with an object being replaced, then both the disappearance of the previous object and the introduction of the new object serve to attract attention. On the other hand, if the newly presented object is positioned such that it is superimposed on the previous object (i.e., minimizing the number of pixels that transition) the potential for distraction can be minimized.

3. The term "when" refers to the timing of the introduction of an object relative to one or more of the following: activation and other eye-signal temporal references, saccadic and other movements of the eye, and eye blink.

The introduction of objects or interactables that are "expected" based on the initial steps of an eye signal tends not to startle a device-wearer into generating exploratory saccades. This is particularly true if the user has repeatedly seen and/or used the sequence previously. Thus, application designers can repeatedly introduce interactables at consistent and expected times to improve comfort and performance.

A concept known as "change blindness" refers to techniques in which visual stimuli can be introduced into the field-of-view of an observer without being noticed. These techniques include altering during a flicker or distraction (e.g., during a so-called "mudsplash"), changing a background of an image while focus is on the foreground, introducing a change when a region is not under observation, or slowly changing color or shape (i.e., morphing) at a rate that is believed to challenge neural processing (i.e., related to attention span) mechanisms within the brain.

During a saccade, a device wearer is essentially "blind" (i.e., the visual cortex is not processing neural inputs for the purposes of perception). This time can be used to introduce new objects into (or remove old objects from) the visual field without drawing attention. In fact, using "change blindness," objects introduced when "blind" (e.g., during a saccade) will not even be perceived until they are specifically looked for within the foveal view. This provides an ideal opportunity to introduce objects and/or interactables at times.

Figure 20:
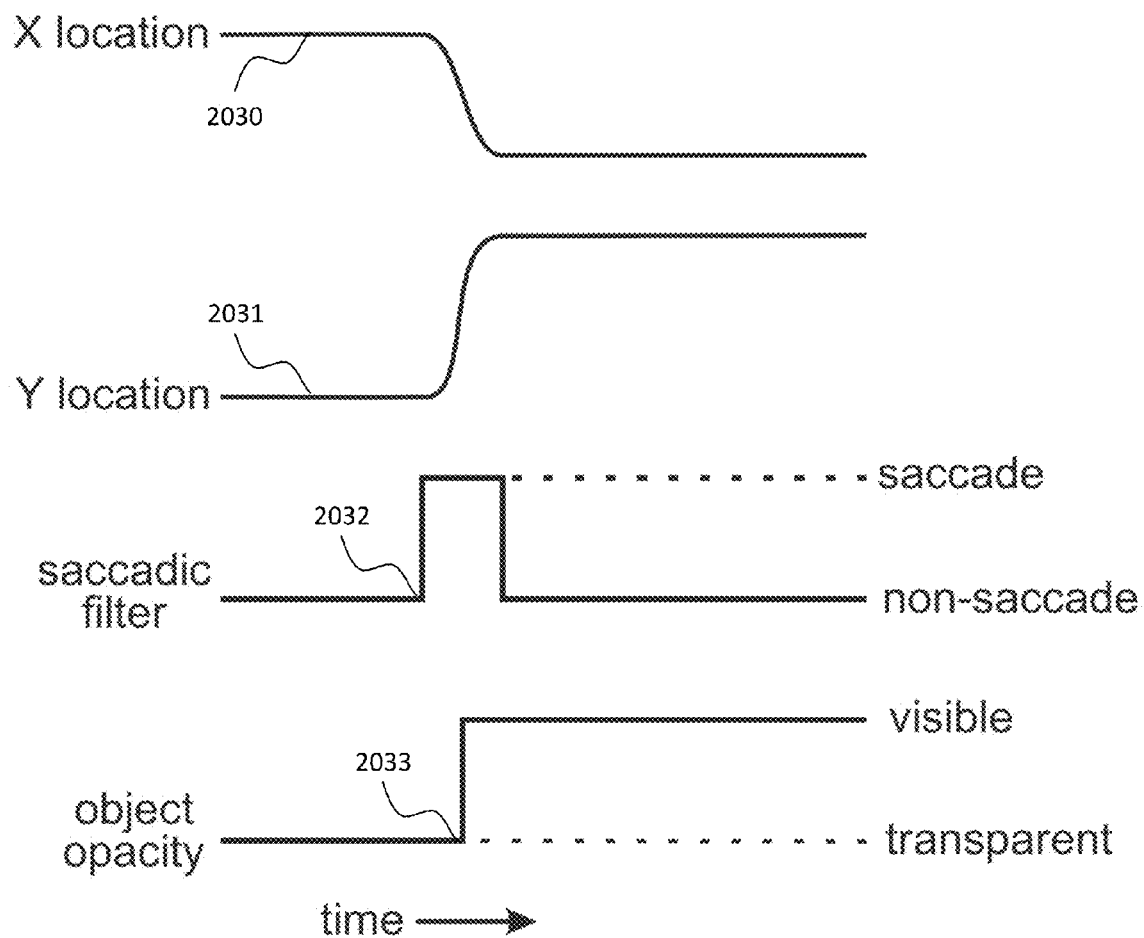
FIG. 20 illustrates the introduction of an object by rapidly changing transparency when the device user is blind during a saccadic eye movement.

FIG. 20 illustrates the time at which a new object is introduced via a step change in opacity during a saccade. The upper traces represent measured X (i.e., horizontal) 2030 and Y (i.e., vertical) 2031 gaze locations. When the initiation of a saccadic eye movement is detected at 2032, opacity is changed to a desired level during the time of the saccade at 2033. Similar timing consideration relative to the initiation of a saccade can be used to change one or more of the other primary characteristics of an object including color, contrast, luminance, detail, etc.

A similar strategy can be used to introduce objects without attracting attention during eye blinks (i.e., objects are introduced when the eye is closed). Conversely, an introduced object that is intended to attract attention can be displayed at times when a device user is clearly viewing the display, or between blinks and saccades.

4. The term "how" refers to the modulation or control of one or more of the following dynamic elements during the process of introducing one or more objects: size, color, luminance, transparency, structure detail, position (i.e., horizontal and/or vertical movement), and rotation.

The dynamics of the initial formation of an object designed to attract attention generally focuses upon a rapid introduction in the size, color, luminance, transparency, and/or structural details of the object. Once introduced, any or all of these elements can be modulated dynamically at a rate that is readily perceptible to most humans (i.e., at a repetition rate from approximately 0.2 to 5 seconds). In the case of modulating the luminance of an object, this would be perceived as "blinking" Modulating the size of an object would be perceived as "zooming" in and out. Dynamically modulating the position and/or rotation of an object is particularly effective in attracting attention because of neural circuitry designed to detect motions in the parafoveal and peripheral visual field. Dynamic control of the position and/or rotation of an object would be generally described by an observer as a "vibration."

Figure 21:
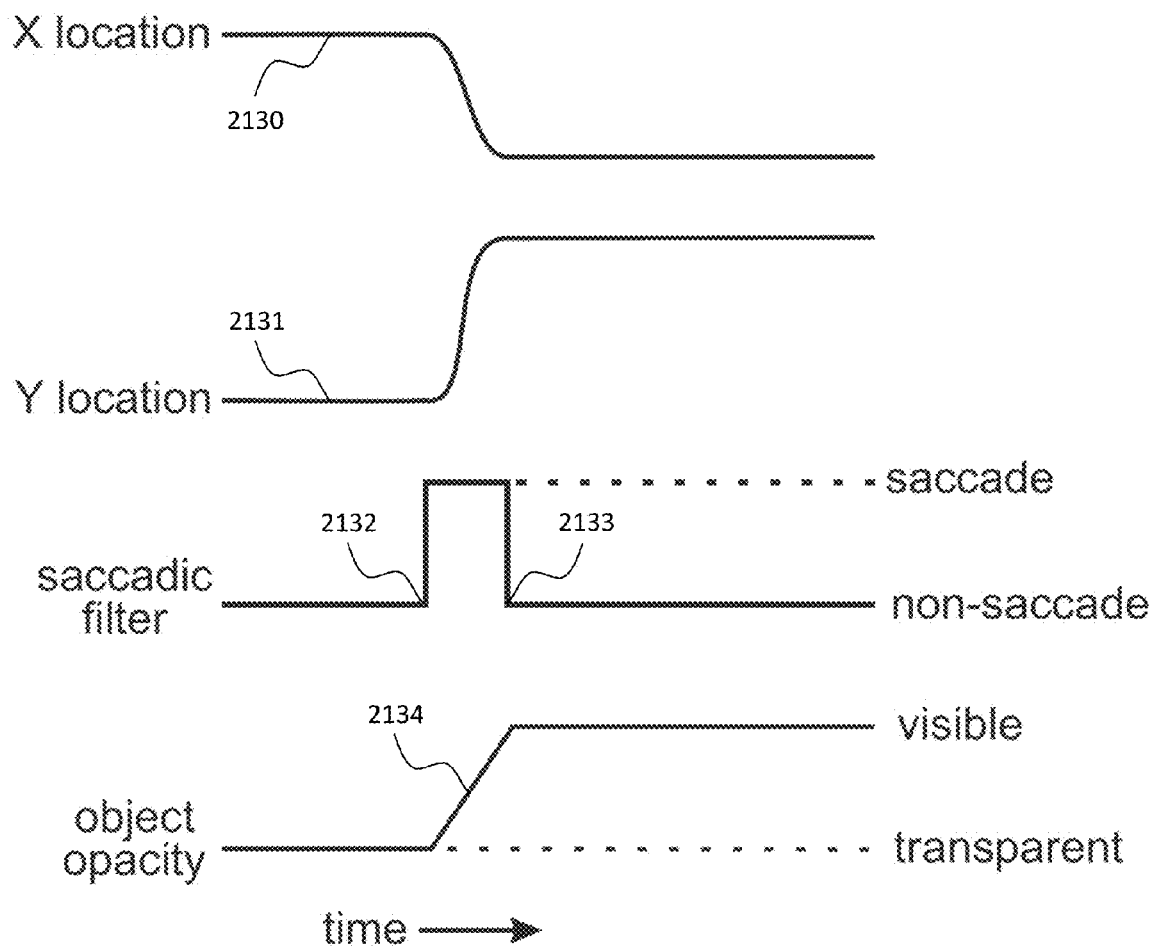
FIG. 21 illustrates the introduction of an object by gradually changing transparency when the device user is blind during a saccadic eye movement.

Key techniques to introduce objects without attracting attention (and subsequent exploratory saccades) include introducing one or more of the following dynamic elements: 1) gradually and/or 2) during periods when the device wearer is "blind." FIG. 21 illustrates an object display sequence that takes advantage of both of these principles. The upper traces represent measured X (i.e., horizontal) at 2130 and Y (i.e., vertical) at 2131 gaze locations. In this example, modulation of the object opacity is used to introduce the object into the field-of-view. The object is introduced in a graded fashion at 2134 (i.e., compared with the "step" change in transparency described previously), beginning at a time when a saccade is first detected at 2132 and finishing prior to the end of the saccade at 2133. Graded introduction can also be used to change other individual or multiple (i.e., simultaneous) characteristics of an object including color, contrast, luminance, detail, etc.

Compared with the attention span of an individual, the graded introduction of an object remains relatively rapid if restricted to the period of a single saccade. Another technique that takes advantage of "change blindness" is to introduce an object over a more prolonged period. Many visual illusions have been developed that are based on the gradual introduction of changes within images that are not generally perceived by an observer. Most illusions are based on changes that occur over several seconds. Changes that are designed to simply not attract attention (i.e., a lesser challenge) can be introduced over shorter time periods. Changes may or may not be chosen to be initiated during the time of a saccade.

Figure 22:
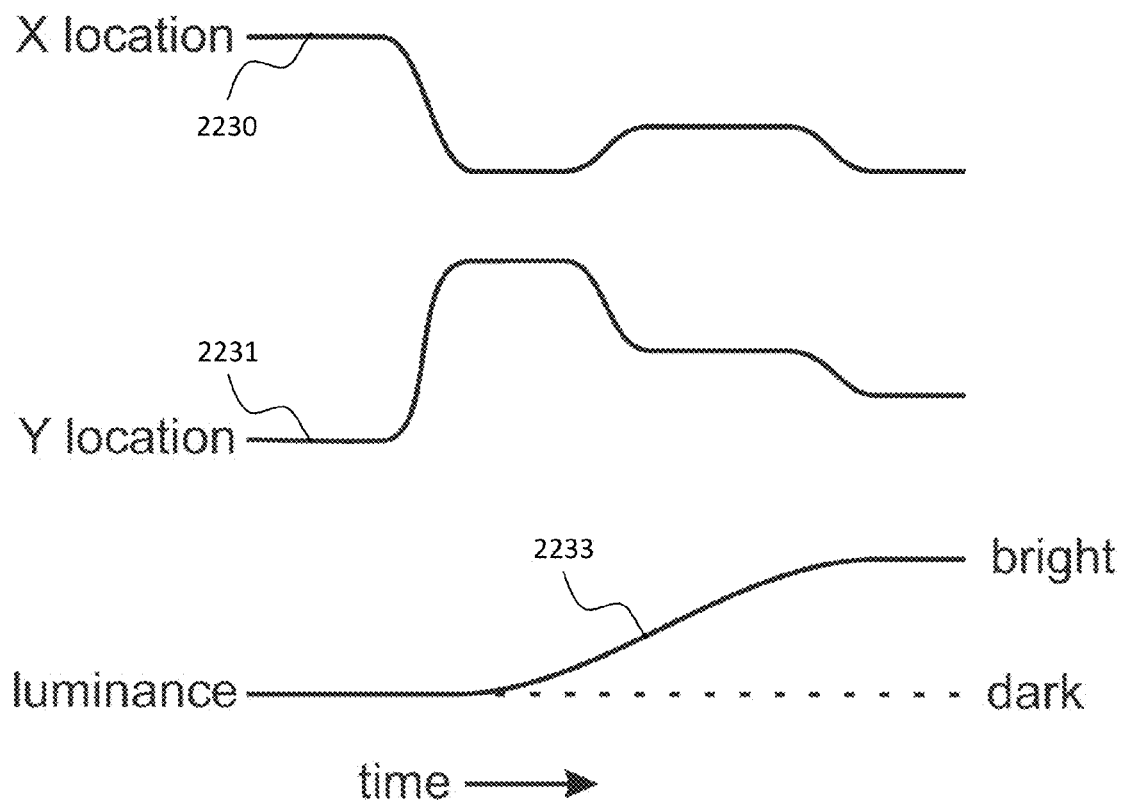
FIG. 22 illustrates the introduction of an object by slowly changing brightness.

An example of the time dependence of a gradual change is illustrated in FIG. 22. The upper traces represent measured X (i.e., horizontal) at 2230 and Y (i.e., vertical) at 2231 gaze locations. In this example, the luminance of an object is gradually increased at 2233 until it is clearly visible (i.e., when sought out) by an observer. This luminance profile 2233 also illustrates the introduction of a "non-linear" change in object characteristics. In this case, the beginning and end of the period change in luminance are modified at rates that are slower than the central portion of the luminance profile. This avoids sudden changes in the rate of change (analogous to "acceleration") of the luminance increase profile.

Transitioning the structural details of an object gradually over time is known in the art as "morphing." When done slowly, changes within morphed objects are not noticed. Morphing an object to make it available to a user (without generating distraction) can be performed starting from the display background or a prior object that occupied the same location. When, for example, an object is morphed from a relatively uniform background, there can be a progressive increase in structural detail.

On the other hand, morphing techniques with bold object characteristics can be employed to attract attention. For example, "growing" an object by making it increasingly large tends to attract a survey saccade. Moving an object over large distances (e.g., from the current eye gaze position toward a location where gaze is being directed, from the edge or center of a display area, etc.) can be used to specifically direct eye movement.

Another variant of the approach involving the modulated introduction of "invisibly visible" object characteristics is to introduce smaller amplitude changes in object features over several saccades and/or eye blinks. As described above, features (e.g., size, color, luminance, transparency) of an object can be introduced during "blind" periods such as during a saccade or blink. The use of multiple saccades and modulated feature introduction is illustrated in FIG. 23.

Figure 23:
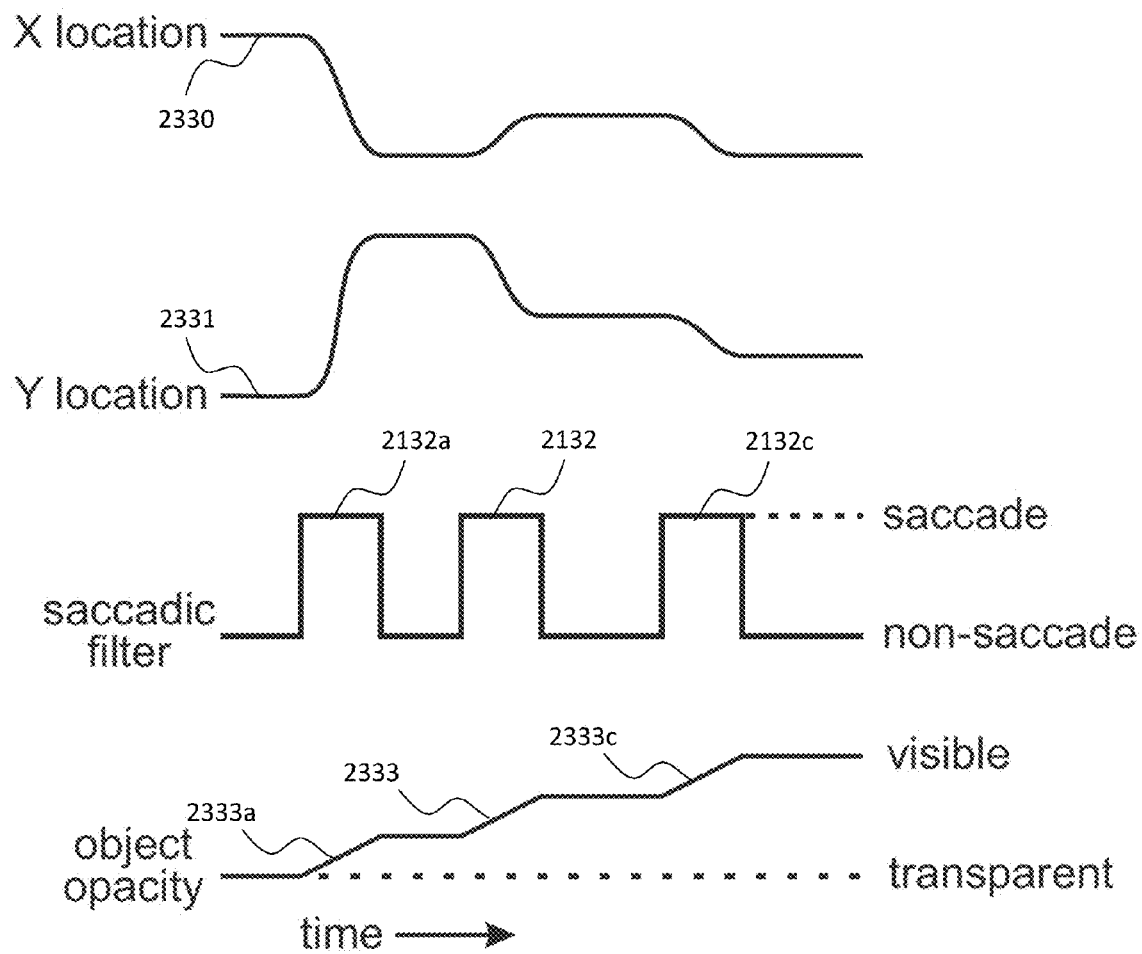
FIG. 23 illustrates the introduction of an object by changing transparency when the device user is blind during multiple saccadic eye movements.

The upper traces in FIG. 23 represent measured X (i.e., horizontal) at 2330 and Y (i.e., vertical) at 2331 gaze locations. In this example, object opacity is incrementally increased over the period of three saccades at 2332*a*, 2332*b*, and 2332*c*. A fully visible state is achieved over three corresponding time periods at 2333*a*, 2333*b*, and 2333*c*. More generally, any feature or combination of features can be introduced over any number of saccades, blinks, or periods when the device wearer looks well away from the display.

Many of the same strategies can also be used to control the disappearance of objects from a display. Whether an object is replaced by another object or is replaced by background, the timing and structuring of object removal (most frequently to avoid distracting saccades) can utilize the same principles and techniques employed to introduce new objects.

Machine Learning Approaches to Discerning User Intent

An example of an eye movement classification of intent that is particularly useful during the formation of eye signals is the determination of whether an eye movement is "purposeful." This is generally related to the distinction between physiological "involuntary" and "voluntary" eye movements. Involuntary eye movements are not under conscious control and therefore contribute little with respect to communicating with the eyes. Voluntary eye movements are under conscious control and thus can be used to convey purposeful intent in the formation of eye signals.

Knowledge of whether a particular eye movement is "purposeful" or not can, for example, be used to avoid inadvertent activations when performing eye signals. This can be implemented by adjusting (i.e., making more stringent) the criteria (e.g., target spatial locations, times) used to discern the execution of an activation sequence. A brief fixation on an activation interactable can be disregarded if eye movements appear non-purposeful. Conversely, if eye movements appear purposeful, then responses to gazing toward activation regions can, for example, be sped up; allowing eye signals to be executed more rapidly. It is even possible to reduce or eliminate some eye-signal sequences if it has already been discerned that "purposeful" eye movements are being made.

Further, determination of purposefulness can be informed by other sensed data. Examples of such sensory data include head movement, face movement, hand movement, and other quantifiable data. Further, context, as outlined, along with object-gaze specific context, can assist in determining purposefulness.

For robust classification of "purposeful" versus involuntary eye movements, a number of measures need to be considered simultaneously. These measures may include saccadic launch delays, peak saccadic velocities, angular distance covered by saccades, distance travelled during smooth pursuits, number of corrective saccades, fixation times, and the like. In other words, such classifications are generally multivariate. Classification approaches for such data can use: 1) statistical and 2) neural network methodologies.

Statistical approaches involve techniques well-known in the art. Examples of such approaches include linear classifiers, quadratic classifiers, and Bayesian statistics. Generally, supervised learning (i.e., where data sets are available that correctly identify outcomes) can be used for machine learning. Training and validation data sets can, for example, be collected by having the device wearer indicate whether eye movements are "purposeful" (e.g., by pressing a switch) in real time as eye signals are performed. A typical and easy-to-use setup for acquiring such data involves holding down a button on a computer mouse as purposeful eye movements are made. Such data sets with known outcomes are then typically divided onto sets used for training (i.e., machine learning) and those used for validation.

Similarly, data sets with correctly identified outcomes can also be used for the training and validation of neural network or deep learning classification approaches. Methods for training neural networks, such as back-propagation, are well-known in the art. The application of neural networks with a large number of intermediate (or so-called "hidden") layers and interconnections (in the range of millions to billions) are often referred to as "deep learning." These are ideally suited to discerning the intent of a user based on eye movement patters and other sensory inputs.

When using many artificial intelligence (AI) or neural network-based classification approaches, it is usually difficult to ascertain factors such as the relative importance or interactions among different inputs or to insert probabilistic information to improve the network. This can be disadvantageous in some situations. However, once trained, a neural net-based implementation can be extremely fast, and both memory- and power-efficient. Neural nets can also be readily implemented directly in firmware logic (within, for example, an FPGA) without utilizing central processing unit (CPU) resources.

Figure 24:
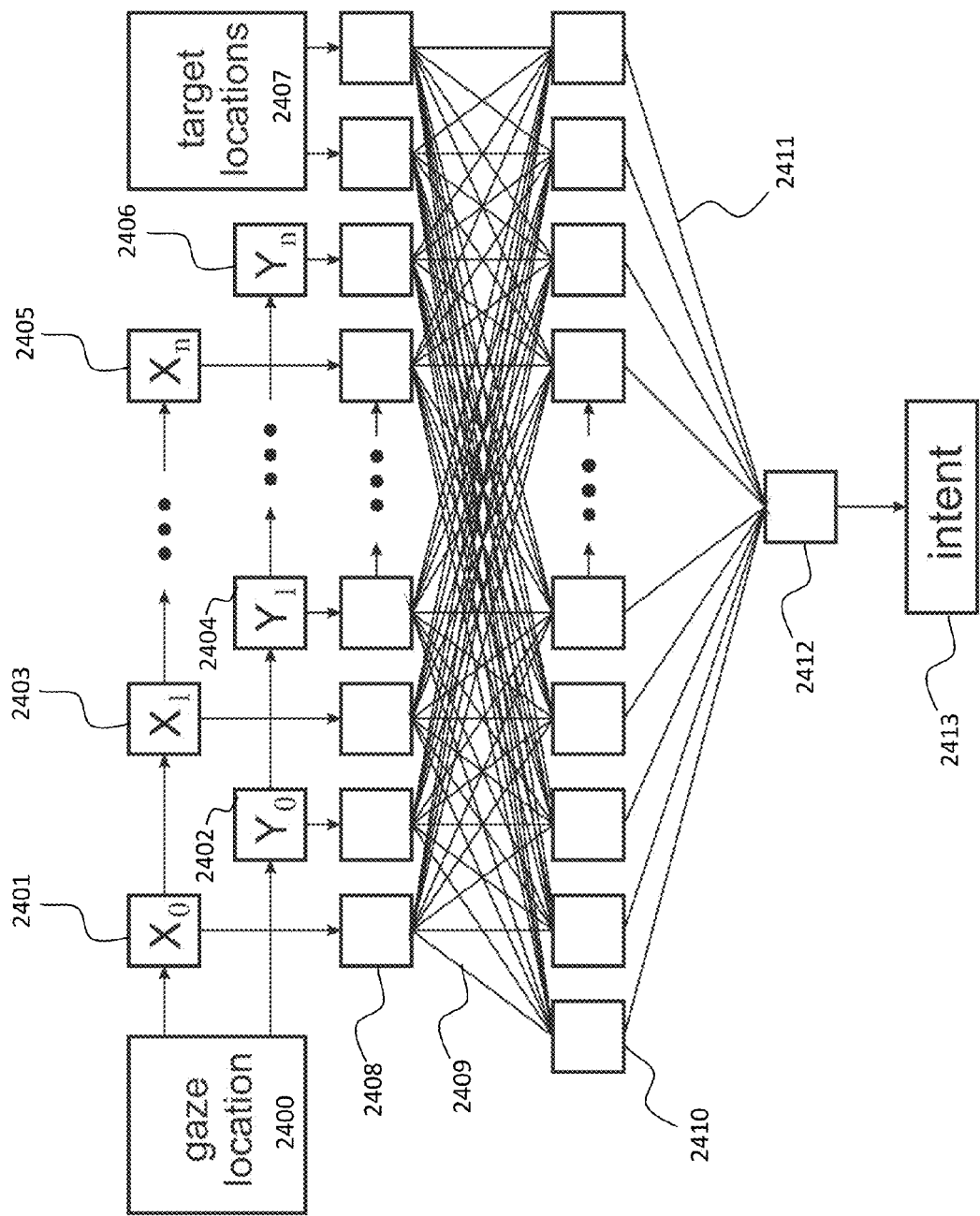
FIG. 24 shows the control of time-series positional data as input to a neural net that determines user intent.

FIG. 24 shows an example of a neural network that algorithmically transforms gaze locations 2400 and other inputs 2407 into user intent at 2413. Measured gaze locations 2400 are transferred to a first-in first-out (FIFO) buffer of "n" locations $(X_0, Y_0)$, $(X1, Y1)$, ... $(X_n, Y_n)$. Coordinate $X_0$ 2401, $Y_0$ 2402 represent a most recently acquired gazed location. When a new gaze location is acquired, the values previously stored as $X_0$ 2401 and $Y_0$ 2402 are transferred to coordinate $X_1$ 2403 and $Y_1$ 2404. This transfer process is repeated within the FIFO buffer until the values in the final coordinate $X_n$ 2401 and $Y_n$ 2402 are discarded. Additional inputs including target locations for eye signals 2407 may also be supplied to the neural network.

In the case of the network illustrated in FIG. 24 gaze coordinates ($X_i$, $Y_i$) are shown as the primary inputs to the neural net. This would be appropriate for gaze coordinates that are determined at a constant sampling rate. In the case when non-uniform sample rates are utilized or when sampled data are transformed into eye movements as described below, then the times, $T_i$, at which measurements are made can be included as inputs ($X_i$, $Y_i$, $T_i$) to the neural network.

This exemplary network is made up of an input layer 2408. This input layer 2408 is fully interconnected at 2409 with an intermediate layer 2410. This intermediate layer 2410 is, in turn, fully interconnected at 2411 with a single node (in this example) representing an output layer 2412. The interconnections 2409, 2411 are key components of the algorithm, representing weight coefficients that carry values from one layer to the next. The final output for this simple representation is a value 2413 representing some form of intent such as "purposefulness."

The most accurate classification schemes for an individual are based on data and training from the individual. This arises as a result of variations among individuals in factors such as precise neural pathways controlling eye movements, muscle strength and anatomy around the eye. Prior to training based on an individual, it is possible to use "generic" classification schemes that have been trained based on populations of individuals. Once an individual's data have been used to train a classification approach (e.g., statistical or neural network) the coefficients associated with the individual can become a part of a calibration package that is retrieved and re-loaded for each individual when a device is re-mounted.

In an exemplary embodiment, the primary inputs to a classification process to discern "purposeful" user intent are the coordinates of eye gaze locations. In order to take into account sequences of eye movements as well as pauses, velocities, and accelerations (i.e., that can be derived from sequences of eye movements), the coordinates of eye locations measured in images acquired at times leading up to the current time can be included as inputs.

In order to avoid aliasing, particularly during rapid saccadic eye movements, frame rates of acquired images to determine eye locations need to be in the range of hundreds of frames per second. A total number of inputs for classification can also take into account the "attention span" of actions associated with intent. For example, approximately one second or more of such data may be used to discern a "purposeful" action. Thus, when data are expressed using a constant sample rate, the total number of network inputs associated with gaze locations is equal to the sample rate multiplied by the "attention span" multiplied by two, the number of coordinates (X, Y) used to represent gaze locations.

Other inputs can (optionally, and/or when available) be included in classification calculations to discern if purposeful eye movements are being performed. The locations of objects within a user's field-of-view, expressed relative to gaze coordinates, can be discriminating inputs. The coordinates of selectable interactables as potential targets of purposeful eye movements are particularly valuable. Conversely, the locations of objects in the field-of-view that are not targets for activation are more likely to be explored by surveying eye movements. Other inputs to help discern if purposeful eye movements are taking place include the size and changes in pupil geometry (e.g., constricting or dilating), head movements, and the like.

Predictive and Structured Deep Learning Networks

So-called "deep learning" machine learning approaches utilize a large number of hidden layers and associated weights or synaptic connections. Deep learning networks use a cascade of nonlinear processing units that can represent different levels of abstraction. A large number of different deep learning architectures have been developed including convolutional deep networks, deep Boltzmann machines, deep kernel machines, and deep Q-networks. Deep learning networks have been applied to computer vision, speech recognition, bioinformatics, and a number of other fields.

The use of deep learning approaches to eye signals can be classified as a "time series" data analysis. In other words, eye signals can be recognized from a series of (X, Y) positions of one or both eyes measured over time. Speech recognition is also a time series classification problem. Thus, mathematical and classification approaches used in speech recognition can generally be applied to eye signal recognition with the obvious distinction that speech is generally recognized from a single audio data channel (usually converted to a Fourier series) whereas eye locations are represented by at least two (in the case of a single eye) or four (in the case of both eyes) values (representing horizontal and vertical position) at each time. This distinction can readily be handled by the input layers of a deep network.

Time-series neural network analyses can be applied to perform 1) recognition and/or 2) prediction. In the case of eye signal analyses, both of these capabilities can be utilized. The recognition of a series of eye movements to indicate an action or intent of the device wearer is key to the eye signal language. The ability to predict or project forward in time (even if only a fraction of a second) has a number of practical and enhanced user-experience consequences:

By projecting anticipated locations of eye movements, a particular "region-of-interest" (ROI) can be specified within camera images. Only this ROI can initially be transferred from the camera to one or more processors for analysis, saving power and resources.

During some predictable eye movements (e.g., saccades), it may be possible to turn cameras off for short periods, saving power.

Algorithms that search for the location(s) of one or both eyes can first search at such projected locations, saving power and computational resources.

The display of information to the user can be modified to anticipate eye movements. For example, the target virtual object (i.e., "interactable") of a saccadic eye movement can be replaced or removed from the display, and other objects introduced to the display prior to a saccadic landing. The replacing of a landing site with a thumbnail image of objects that have just been viewed uses the principle of a "familiar" scene (described above) that does not need to be recalled from long-term memory.

Alternatively, the removal of a target object utilizes the so-called "gap effect" to "release" processing by the visual cortex so that the eye can move on to the next viewable object more rapidly.

It is also possible to predict an eye signal series of actions (much like predictive text entry when using a keyboard) that can subsequently be activated by a single, simple movement.

The "preparation" of a display area in anticipation of a saccadic landing is an important component to "speed-up"

the use of the eye-signal language. The ability to project forward or anticipate events into the future can be applied in a number of additional situations.

For example, movement of the eye lids and/or eye lashes can be used to anticipate that a blink is about to occur. As a blink is initiated, the system can anticipate that the user will be functionally blind for the duration of a blink (normally from 0.3 to 0.4 seconds). During this time, power can be conserved by reducing frame rate and/or interactables and/or other objects can introduced in a manner that does not attract attention. Furthermore, the functional ability to select or activate within the eye-signal language can be placed on "pause." This mode can be used to adjust timing considerations for certain operations.

Smooth pursuits are much slower than saccades (i.e., taking more time). Thus, unless the system is aware that the movement of a tracked object has stopped, one can anticipate that smooth pursuits will continue for some time. During this time, the system can "suppress" user-selectable options associated with saccadic or other forms of eye movements.

Oscillations, tremors, and other forms of smaller eye movements have characteristic repeat-patterns (that may be specific to an individual). Once such a repeat-pattern has been recognized, it is possible to project forward in time the contribution of this pattern to the overall position of the eye. By projecting (and "subtracting out") the contribution of such involuntary (i.e., not purposeful) oscillations to a measured eye location, a more accurate assessment of any purposeful component of an eye motion can be determined.

Although not strictly a forward projection in time, the spatial distortion in the measurements of extreme eye location (i.e. left-right, up-down) due to the three-dimensional structure of the eye when monitored by a two-dimensional imaging system can be "predicted" based on the location of the eye. Once again, spatial distortions produced during such movements can be "subtracted" from measured positions to more accurately determine purposeful components.

The ability to project forward in time can be performed using neural network or more traditional analytic approaches based on measured directions and velocities. Repeating for emphasis, the ability to project forward and anticipate eye signals and other events by even the smallest amount (tens to hundreds of milliseconds) can completely transform the comfort level of a user experience by linking eye signals more directly to actions. In an analogous situation, it is "uncomfortable" to watch a video of the mouth of a person speaking when the sound from that speaker is delayed, even if only by a fraction of a second.

A particular advantage using deep learning to discern eye signals is the relatively limited number of degrees of freedom or "repertoire" of eye movements. As described above, the eyes are controlled by six muscles that can apply contractile forces. This anatomical constraint, coupled with physiological and neurological processing limitations (also described above) places boundaries on the types and ranges of eye movements that are possible in humans. Thus, it is possible to "train" modestly-sized deep networks toward the identification of the full repertoire of such eye movements.

Another advantage of the use of neural networks for eye signal determination is the continuous ability to note successful series of eye movements that lead to activations and identify "mistakes." Inadvertent activation or "mistakes" can be recognized as a subsequent series of eye movements that are executed to "undo" or correct an action. Thus, eye movement patterns that produce inadvertent activations or, conversely, patterns that produce intended actions are readily and continuously available for continuous neural net training (i.e., feedback).

In additional embodiments, similar classification approaches can be used to discern other aspects of the "intent" of a user. Such classification outputs can include "salience" (that can be further split into interest and importance), disinterest, wanting to "remember" what is being looked at (i.e., Personal Augmented Memory [PAM]), dislike, happiness or anger (e.g., during game play), etc. In this case, additional inputs to provide additional discriminating power to classification scheme(s) can be made available. These include time of day, date, user location (e.g., outdoors, in a bedroom), activities (e.g., driving, watching television), movements of the head as well as the rest of the body, and so on. Data sets for training and validation may include a user reporting activities and/or intents while performing activities with various intents.

In yet further additional embodiments, similar classification approaches can be used to discern other aspects of the "state-of-mind" of a user. The distinction being drawn between "state-of-mind" and "intent" described previously is the more passive or recipient nature of the "state-of-mind" classifications. However, this distinction is not a rigid one as, for example, one can be generally happy during game play (where eye movements can be reflective of such a state-of-mind) or one can respond the display of an image as making one happy. "State-of-mind" outcomes can include fatigue, fear, phobia, cognitive load, stress, attractiveness, etc. Once again, data sets for training and validation may consist of a user reporting states-of-mind while viewing different scenes and images, and/or participating in different activities.

Structuring of such larger networks can, for example, be based on context. A portion of a network can be made more responsible for discerning intent when a particular menu selection is displayed or when looking at a particular class of objects. Having a network "know" what is being observed by the device user, allows for a more structured and/or faster neural net training as well as deep learning results that are more robust, leading to faster and more accurate responses to eye signals.

Figure 25:
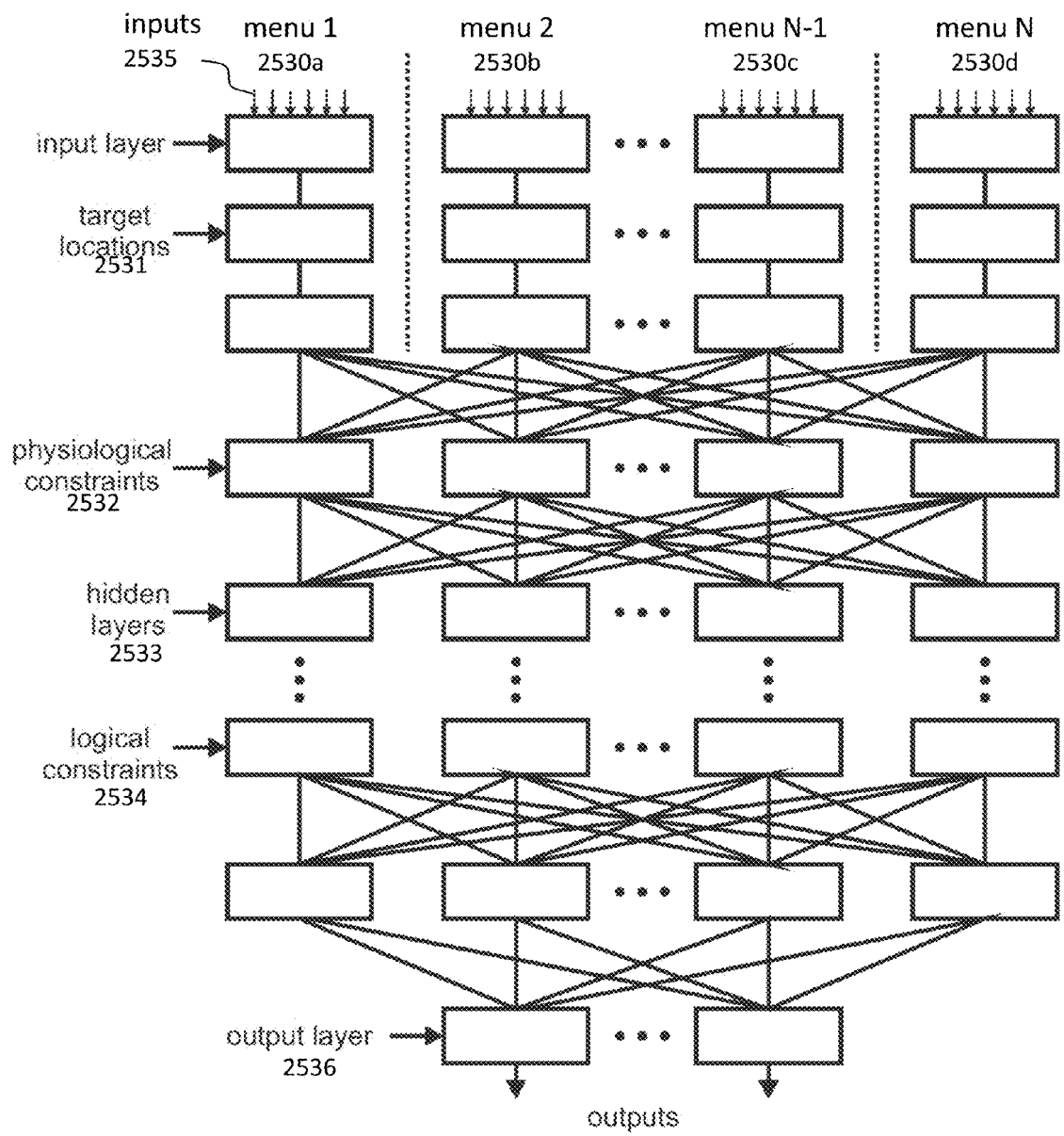
FIG. 25 shows an example of a segmented neural network where initial hidden layers are divided to individually address each of the eye-signal language menus.

FIG. 25 is an example of a deep learning (or so-called "deep belief") network in which known quantities are specifically encoded in network regions and specific network layers. In the case of eye signals, displayed eye signal menus are known to the system. Thus, specific regions of a deep neural network can be devoted to each possible menu. Four regions 2530a, 2530b, 2530c, 2530d within initial network layers are shown to perform initial processing on distinct menus. Furthermore, the target (e.g., interactable) locations 2531 within each eye signal menu are known and can be supplied to the network. In addition, the movement profiles of key elements such as pursuit objects are known to the system. These locations can be also supplied to the network for enhanced training and robustness.

Segmented regions 2530a, 2530b, 2530c, 2530d can be combined with more abstracted or general hidden layers 2533 within the network. In further embodiments, the physiological and anatomical limitations 2532 of eye movements (described above) can be used within network layers to place bounds on learning profiles and aid in classification (e.g., smooth pursuit versus saccadic movements). At deeper levels of abstraction, additional boundaries or constraints 2534 can be placed on specific outcomes. For example, it is not possible for a device wearer to signal more than one distinct process or to be classified as both "happy" and "sad" at the same time. Ultimately, the network transforms inputs 2535 including eye movements into outputs 2536 representing the intents and conditions of the device wearer.

Distribution of Machine Learning Computing Resources

In general, wearable computing places restrictions on local-available computing resources. This arises as a result of device power requirements, physical size and placement restrictions, heat dissipation, and so on. Thus, it may be necessary to perform some or all of the processing associated with classification and prediction using one or more remote processors. Depending on the distribution of computing resources and response times required for comfortable operation, the distribution of processing tasks can be performed in a variety of ways.

Neural net approaches can be broken into stages, where one or more stages can be performed remotely. For example, deep learning approaches to identifying eye locations from images could be performed locally in order to avoid time delays in acquiring results, particularly at high frame rates. Determined eye locations could subsequently be fed to remote processing resources in order to discern user intent. Such outcomes (e.g., user fatigue) are typically not as temporally constrained.

It is also possible to distribute deep learning sub-tasks to a variety of local and remote processing units. Some of these computing resources can involve a hybrid mix of multiple processing units, graphical processing units (GPUs) and embedded processing such as FPGAs and ASICs.

Cloud-based approaches may also include access to information specific to individual device users. For example, calibrations and performance characteristics based on the specific anatomy and physiology of a user, as well as user preferences (e.g., typical response times, desired screen complexity) can be included within cloud-based classification and prediction approaches. This also permits a device user to employ any set of hardware (if desired) without need for re-calibration or other setup processes.

Machine Learning Inputs and Architecture

In order to optimize neural net performance, input data should ideally be transformed into a minimal form that contains all essential, but non-redundant, information. This is analogous to converting input data into sets of independent coordinates.

A key to this transformation is the observation that the eye performs specific movements where the pathways produced by these eye movements are generally linear (i.e., gaze patterns generally traverse straight lines). As previously described, saccadic movements are ballistic, with not only linear pathways, but also well-defined velocity profiles. Similarly, when smooth pursuits are used to track or follow (real or virtual) objects that travel along a linear path, eye gaze movements are repeatedly linear. Thus, expressing eye locations as a series of linear movements is consistent with both accurately representing the majority of eye movement pathways and the biology of eye movements.

Eye locations can be determined from images that have been acquired at given times. The positions of the eye at times when images are acquired does not necessarily correspond with the launch or destination locations of eye movements. Rather, eye locations are "sampled" at known times and eye movements must be inferred from these samples. As long as imaging is performed at a sufficient rate (i.e., governed by principles that include the Nyquist sampling theorem), eye movements can be inferred from these sampled data.

Figure 26A:
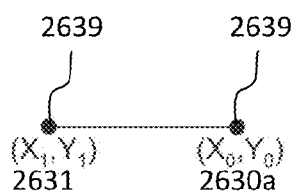
FIGS. 26A-26G illustrate steps to transform a series of sampled eye positions into a series of eye movements.
Figure 26B:
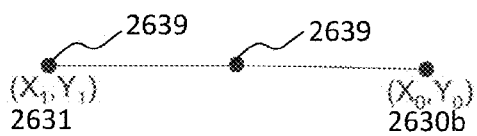

Algorithmically, a method to transform sampled data into a series of movements and fixations as shown in FIGS. 26A-26G. As illustrated in FIG. 26A, measured eye gaze positions are represented by solid circles 2639. The coordinates corresponding to the location of an eye can be represented as $(X_i, Y_i)$ where the most recently acquired image is denoted $(X_0, Y_0)$ 2630a. As shown in FIG. 26B, when the coordinates of an eye location from a new image are acquired $(X_0, Y_0)$ 2630b, a determination is made as to whether the new position is located along a line (within a tolerance) defined by the previous point $(X_1, Y_1)$ 2631c and its predecessor (not shown in FIG. 26B). If so, then the current linear pathway is extended to the current position and analysis proceeds to consider the next frame.

Figure 26C:
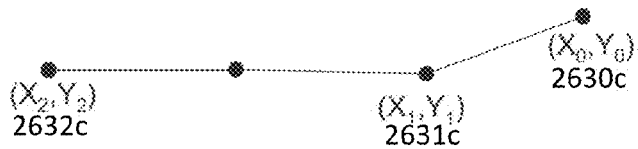
Figure 26D:
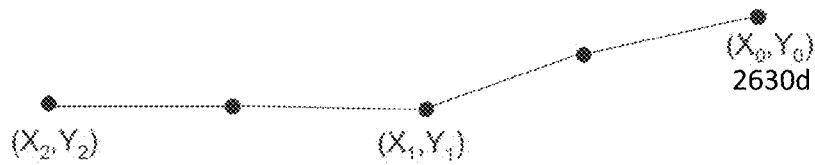
Figure 26E:
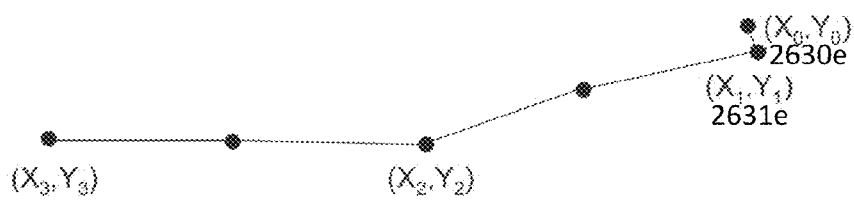

FIG. 26C illustrates the situation when a newly acquired eye gaze location $(X_0, Y_0)$ 2630c is not on a straight line compared with its predecessors, $(X_1, Y_1)$ 2631c and $(X_2, Y_2)$ 2632c. The termination of the previous line $(X_1, Y_1)$ 2631c is registered along with a time, $T_1$, since a previous event, and a search for a new line is begun. FIG. 26D illustrates an extension of this new line to a newly acquired eye location $(X_0, Y_0)$ 2630d.

Figure 26F:
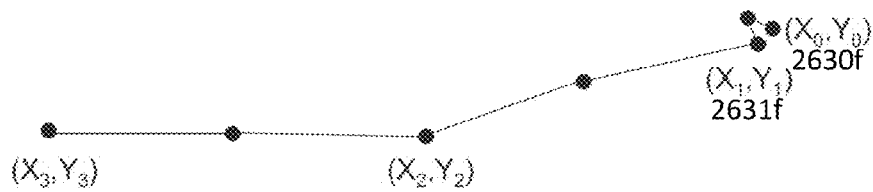
Figure 26G:
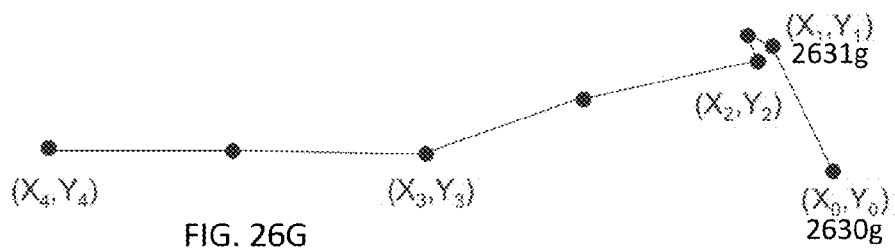

An exception to determining when a new sample point is on a linear pathway is when the gaze distance travelled between images is zero (within some tolerance). Physiologically, this represents an eye "fixation" and is determined in FIG. 26E based on measurements of the distance between the gaze location within the most recently acquired frame $(X_0, Y_0)$ 2630e and its predecessor $(X_1, Y_1)$ 2631e. In this case, the end of a linear eye movement $(X_1, Y_1)$ 31e is registered and the fixation (around a stationary location, $(X_1, Y_1)$ 2631e) is begun. As illustrated in FIG. 26F, there can be continued measurements of eye locations $(X_0, Y_0)$ 2630f around the fixation point $(X_1, Y_1)$ 2631f. When movement (within some tolerance) away from a point of fixation occurs, the fixation duration $T_1$ and location $(X_1, Y_1)$ 2631g of the fixation are recorded and the search for a new line that includes $(X_0, Y_0)$ 2630g is begun. This is illustrated in FIG. 26G.

Whenever the pathway deviates to a new line or escapes from a fixation, the new event is stored in a first-in, first-out (FIFO) buffer. This buffer contains time $T_i$ and coordinate location $(X_i, Y_i)$ terminating the line or fixation. A fixation can be identified by the fact that the coordinate location $(X_i, Y_i)$ is the same (within a tolerance) as a previous event. The FIFO buffer can be used as an input to a neural network.

Figure 27:
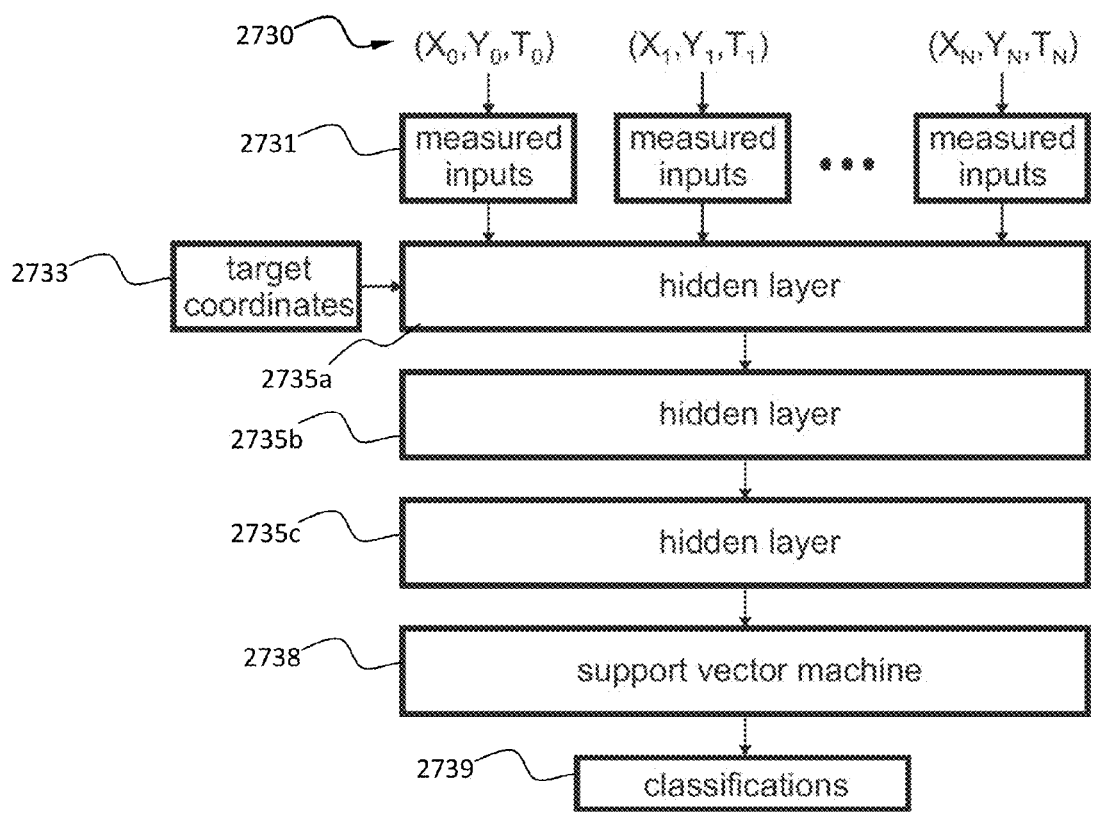
FIG. 27 illustrates a neural network architecture that can transform time-series eye movements into user states including intent.

FIG. 27 is an example of the architecture of a neural network that can be used to discern intent from series of eye movements. N+1 events are provided as inputs 2730 to a neural network where each event is represented as a cluster of two-dimensional coordinates and time $(X_i, Y_i, T_i)$. N can be selected to ensure that a sufficient number of eye movements and fixations are included to determine any eye intent (e.g., the most recent 16 movements or fixations). If N is chosen to be excessive, the network does learn to ignore distant historical events but processing resources are wasted in this instance.

FIG. 27 illustrates the use of three hidden layers 2735a, 2735b, 2735c to classify the time series $(X_i, Y_i, T_i)$ inputs. The known coordinates of eye target locations 2733 (e.g., of interactables) within displayed menus, the identity of menus and any other known information can be supplied as inputs 2733 to the decision process. A support vector machine 2738 is an exemplary embodiment of a machine learning approach to determine the most likely intent(s) of the device wearer. The output of the process can be a null indicating "no action" or a set of one or more intents and/or conditions 2739 of the device wearer. Intents can, for example, include the activation of an intended action (i.e., a binary classification). Simultaneously determined conditions can include a user state (i.e., generally classified over a continuous range) such as cognitive load or a degree of fatigue.

OTHER PUBLICATIONS

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

Jin Z, and A Reeves. (2009). Attention release in the saccadic gap effect. Vision Research 49: 2045-2055.

Purves D, Augustine G J, Fitzpatrick D, et al., editors. Neuroscience. 2nd edition. Sunderland (Mass.): Sinauer Associates; 2001. Types of Eye Movements and Their Functions. Available from: http://www.ncbi.nlm.nih.gov/books/NBK10991/

Thumser Z C, N L Adams, A J Lerner, and J S Stahl. (2010). Probing the mechanism of saccade-associated head movements through observations of head movement propensity and cognition in the elderly. Exp Brain Res. 202(4):903-13.

Applicant(s) believe(s) that the material incorporated by reference herein is "non-essential" in accordance with 37 CFR 1.57, because it is referred to for purposes of indicating the background of the systems and methods herein. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method for providing a graphical user interface to determine intent of a user based at least in part on movement of an eye or eyes of the user, the method comprising:
    displaying a plurality of menu items on a display;
    identifying, with a detector, when at least one eye of the user is directed at a first menu item of the plurality of menu items;
    identifying, with the detector, a saccade of the at least one eye of the user from the first menu item towards an activation icon on the display;
    confirming, with the detector, that the saccade of the at least one eye of the user is completed to within a predetermined distance from a location of the activation icon; and
    initiating performance of one or more actions in relation to the first menu item,
    wherein a visual confirmation is presented on the display indicating that the at least one eye of the user has completed the saccade to within the predetermined distance from the location of the activation icon, wherein the visual confirmation comprises replacing the activation icon with an icon corresponding to the first menu item.

2. The method of claim 1, wherein a visual confirmation is presented on the display indicating that the at least one eye of the user is directed at the first menu item.

3. The method of claim 2, wherein the visual confirmation comprises one of the group consisting of presenting a border at least partially around the first menu item, changing brightness of the first menu item, changing color of the first menu item, adding an indicator in a region of the first menu item, and adding imagery on the display that augments the first menu item.

4. The method of claim 1, wherein the plurality of menu items comprise a plurality of images, wherein the first menu item is one of the plurality of images, and wherein the action comprises replacing the plurality of images on the display with an image corresponding to the first menu item.

5. The method of claim 1, wherein the icon comprises one of the group consisting of a thumbnail of the first menu item, a representation of the first menu item, a likeness of the first menu item, an image of the first menu item, and a portion of the first menu item.

6. The method of claim 1, wherein the one or more actions comprise identifying the first menu item from a database of object templates.

7. The method of claim 1, wherein the one or more actions comprise purchasing an item corresponding to the first menu item.

8. The method of claim 1, wherein the one or more actions comprise retrieving first menu item information related to the identified first menu item from one or more databases of information about identified objects.

9. The method of claim 8, wherein the one or more actions further comprise displaying the first menu item information on the display.

10. The method of claim 8, wherein the one or more actions action further comprise performing one or more additional actions related to the first menu item information.

11. The method of claim 10, wherein the one or more additional actions comprise sending information regarding an identity of the user to a processor that is operatively coupled to the identified first menu item.

12. The method of claim 1, wherein the performance of the one or more actions is initiated within less than 250 milliseconds after the saccade is completed within the predetermined distance from the location of the activation icon.

13. The method of claim 1, wherein the performance of the one or more actions is initiated within less than 200 milliseconds after the saccade is completed within the predetermined distance from the location of the activation icon.

14. The method of claim 1, wherein the one or more actions comprise launching an application associated with the first menu item.

15. The method of claim 1, wherein the plurality of menu items comprise icons associated with respective applications.

16. The method of claim 1, wherein the activation icon is presented at a fixed location on the display independent from a field on the display including the plurality of menu items.

17. The method of claim 1, wherein each of the plurality of menu items is associated with a different action and wherein the one or more actions comprises initiating performance of an action associated with the first menu item that is different than actions performed by other menu items of the plurality of menu items.

18. A system for providing a graphical user interface to determine intent of a user, the system comprising:
- a detector configured to monitor movement of at least one eye of the user;
- an electronic display operatively associated with the detector;
- a processing unit operatively coupled to the detector and electronic display; and
- a module stored in memory, the module to configure the processing unit to:
  - display a plurality of menu items on the display;
  - identify when at least one eye of the user is directed at a first menu item of the plurality of menu items on the display;
  - identify a saccade of the at least one eye of the user from the first menu item towards an activation icon on the display;
  - confirm that the saccade of the at least one eye is completed to within a predetermined distance from a location of the activation icon on the display; and
  - initiate performance of one or more actions in relation to the first menu item including presenting a visual confirmation on the display indicating that the at least one eye of the user has completed the saccade to within the predetermined distance from the location of the activation icon, wherein the visual confirmation comprises replacing the activation icon with an icon corresponding to the first menu item.

19. The system of claim 18, wherein the module further is to configure the processing unit to provide visual confirmation on the display that the at least one eye of the user is directed at the first menu item.

20. The system of claim 18, wherein the module is to configure the processing unit to initiate performance of the one or more actions within less than 250 milliseconds after the saccade is completed within the predetermined distance from the location of the activation icon.

21. A system for providing a graphical user interface to determine intent of a user, the system comprising:
- a detector configured to monitor movement of at least one eye of the user;
- a processing unit operatively coupled to the detector and a display; and
- a module stored in memory, the module to configure the processing unit to:
  - display a plurality of menu items on the display;
  - identify when at least one eye of the user is directed at a first menu item of the plurality of menu items at a first location on the display;
  - identify a saccade of the at least one eye of the user from the first menu item towards an activation icon at a second location on the display;
  - confirm that the saccade of the at least one eye is completed to within a predetermined distance from the second location of the activation icon; and
  - initiate performance of one or more actions in relation to the first menu item, the one or more actions comprising replacing the activation icon at the second location with an icon corresponding to the first menu item.

22. The system of claim 21, wherein initiating performance of the one or more actions further comprises initiating an action associated with the first menu item.

23. The system of claim 21, wherein the icon comprises one of the group consisting of a thumbnail of the first menu item, a representation of the first menu item, a likeness of the first menu item, an image of the first menu item, and a portion of the first menu item.

24. A method for providing a graphical user interface to determine intent of a user, the method comprising:
- displaying a plurality of menu items on a display;
- identifying, with a detector, when at least one eye of the user is directed at a first menu item of the plurality of menu items at a first location;
- identifying, with the detector, a saccade of the at least one eye of the user from the first location towards an activation icon at a second location on the display;
- confirming, with the detector, that the saccade of the at least one eye of the user is completed from the first menu item to within a predetermined distance from the second location of the activation icon; and
- initiating performance of one or more actions in relation to the first menu item, the one or more actions comprising replacing the activation icon at the second location with an icon corresponding to the first menu item.

25. The method of claim 24,
wherein the menu items comprise a plurality of images, wherein the first menu item is a first image of the plurality of images; and
wherein the one or more actions further comprise presenting an image of the first image on the display.

26. The method of claim 24, wherein initiating performance of the one or more actions further comprises initiating an action associated with the first menu item.

27. The method of claim 24, wherein the icon comprises one of the group consisting of a thumbnail of the first menu item, a representation of the first menu item, a likeness of the first menu item, an image of the first menu item, and a portion of the first menu item.

28. The method of claim 24, wherein the one or more actions comprise launching an application associated with the first menu item.

* * * * *